United States Patent
Tsuda et al.

[11] Patent Number: 6,097,458
[45] Date of Patent: Aug. 1, 2000

[54] REFLECTOR, REFLECTIVE LIQUID CRYSTAL DISPLAY INCORPORATING THE SAME AND METHOD FOR FABRICATING THE SAME

[75] Inventors: Kazuhiko Tsuda; Koji Taniguchi; Makoto Shiomi, all of Tenri, Japan

[73] Assignee: Sharp Kabushiki Kaisha, Osaka, Japan

[21] Appl. No.: 08/763,484

[22] Filed: Dec. 11, 1996

[30] Foreign Application Priority Data

Dec. 11, 1995 [JP] Japan ................................... 7-322028
Oct. 17, 1996 [JP] Japan ................................... 8-275150

[51] Int. Cl.⁷ ........................ G02F 1/1335; G02F 1/1339
[52] U.S. Cl. ........................... 349/113; 349/96; 349/106; 349/117; 349/156
[58] Field of Search ..................... 349/113, 96, 106, 349/117, 156

[56] References Cited

U.S. PATENT DOCUMENTS

| | | | |
|---|---|---|---|
| 4,431,272 | 2/1984 | Yazawa et al. | 350/336 |
| 4,456,336 | 6/1984 | Chung et al. | 350/338 |
| 4,519,678 | 5/1985 | Komatsubara et al. | 350/338 |
| 5,204,765 | 4/1993 | Mitsui et al. | 359/70 |
| 5,408,344 | 4/1995 | Takiguchi et al. | 359/40 |
| 5,418,635 | 5/1995 | Mitsui et al. | 359/87 |
| 5,500,750 | 3/1996 | Kanbe et al. | 359/58 |
| 5,610,741 | 3/1997 | Kimura | 359/113 |
| 5,612,803 | 3/1997 | Yamada et al. | 349/188 |
| 5,619,356 | 4/1997 | Kozo et al. | 349/99 |
| 5,684,551 | 11/1997 | Nakamura et al. | 349/99 |
| 5,691,791 | 11/1997 | Nakamura et al. | 349/113 |
| 5,739,889 | 4/1998 | Yamada et al. | 349/156 |
| 5,751,382 | 5/1998 | Yamada et al. | 349/12 |
| 5,784,134 | 7/1998 | Fujimori et al. | 349/84 |
| 5,796,455 | 8/1998 | Mizobata et al. | 349/116 |
| 5,805,252 | 9/1998 | Shimada et al. | 349/113 |
| 5,841,496 | 11/1998 | Itoh et al. | 349/113 |
| 5,847,789 | 12/1998 | Nakamura et al. | 349/99 |

FOREIGN PATENT DOCUMENTS

| | | |
|---|---|---|
| 51-86395 | 7/1976 | Japan . |
| 4-243226 | 8/1992 | Japan . |
| 7-181481 | 7/1995 | Japan . |
| 9-80426 | 3/1997 | Japan . |

*Primary Examiner*—Kenneth Parker
*Assistant Examiner*—Julie Ngo
*Attorney, Agent, or Firm*—David G. Conlin; David A. Tucker; Dike, Bronstein, Roberts & Cushman, LLP

[57] ABSTRACT

A reflector including a substrate and a thin metal film is provided. The substrate defines a plurality of randomly arranged, curved, surface deformity portions, each having an asymmetric cross section. Typically, the surface deformity/substrate structure is formed by creating curved pieces of resist material on a substrate, and thereafter, tilting and heating the substrate. Alternatively, a photoresist process utilizing an ion, or an electron beam without heating, can be used. The metal film is coated onto the surface of the substrate and onto the curved, surface deformities located thereon, such that light incident from a given direction is reflected over a wide range, but most intensely in particular directions. Further, a liquid crystal display is provided in which the reflector just mentioned is used as a lower substrate. An upper glass substrate is provided, and a liquid crystal display medium is interposed between the reflector and the upper glass substrate. In some embodiments, the liquid crystal display medium includes a matrix of polymer walls formed either by light irradiation using a mask, or by cooling a mixture of liquid crystal material, and a polymerizable precursor to separate phases prior to light irradiation. In addition, a phase plate, a polarizer, an insulating layer, display electrodes and/or color filters may be utilized in association with the liquid crystal display. Also, the liquid crystal material, the surface of the reflector substrate, and/or the thin metallic film may be divided into areas corresponding to individual pixels.

33 Claims, 48 Drawing Sheets

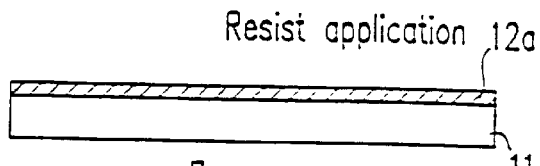
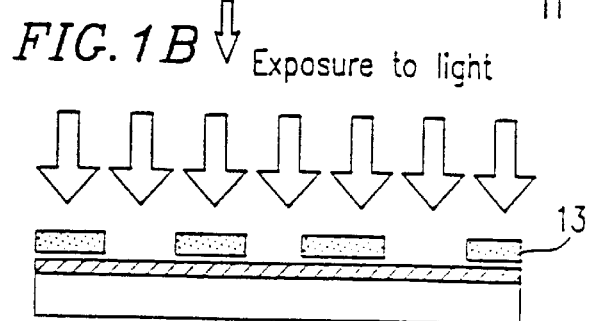
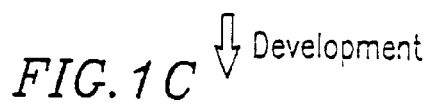
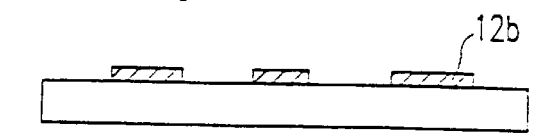
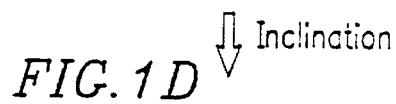
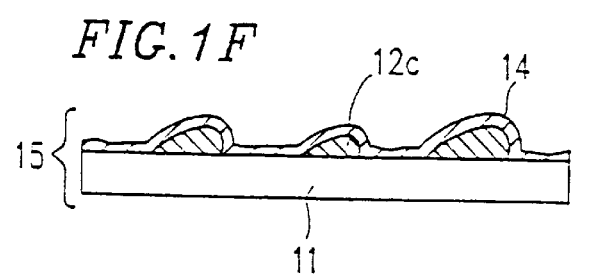

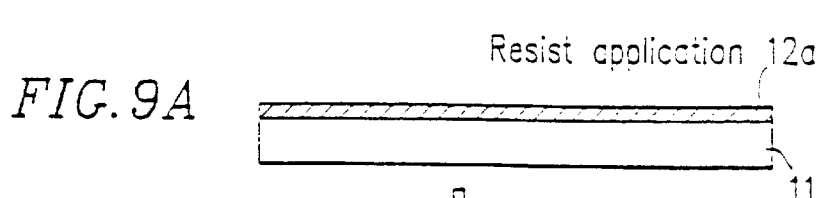
FIG. 9A  Resist application 12a
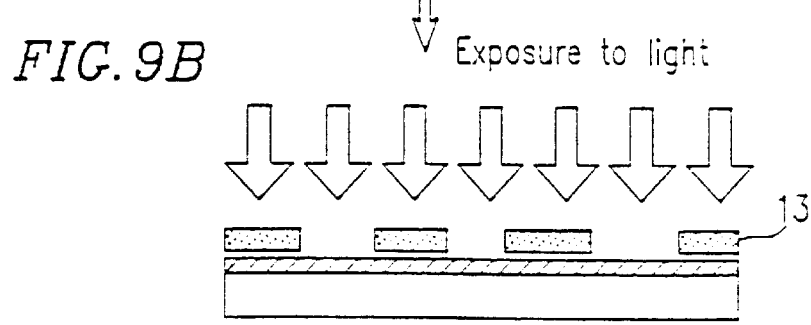
FIG. 9B  Exposure to light
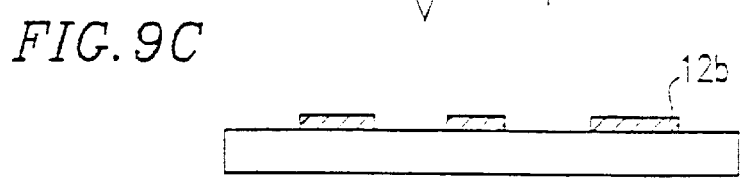
FIG. 9C  Development
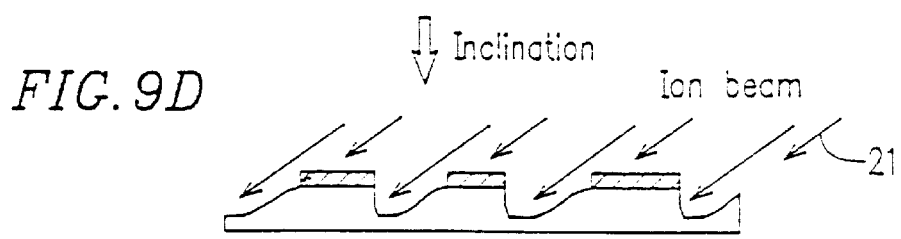
FIG. 9D  Inclination  Ion beam
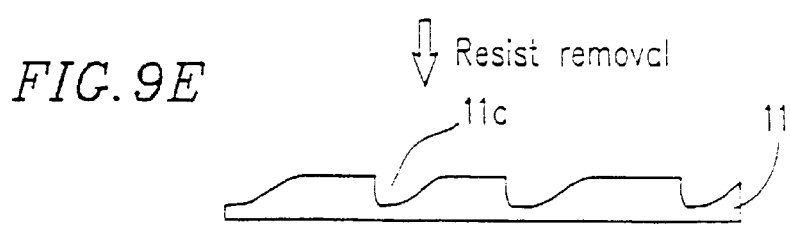
FIG. 9E  Resist removal
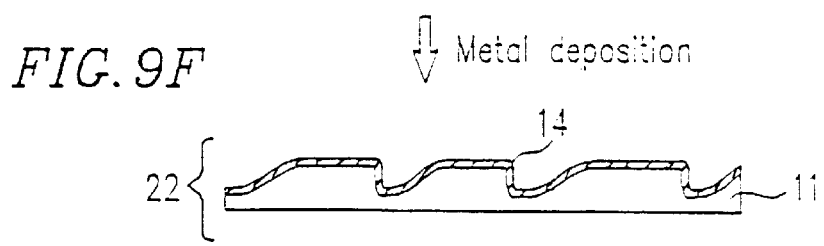
FIG. 9F  Metal deposition

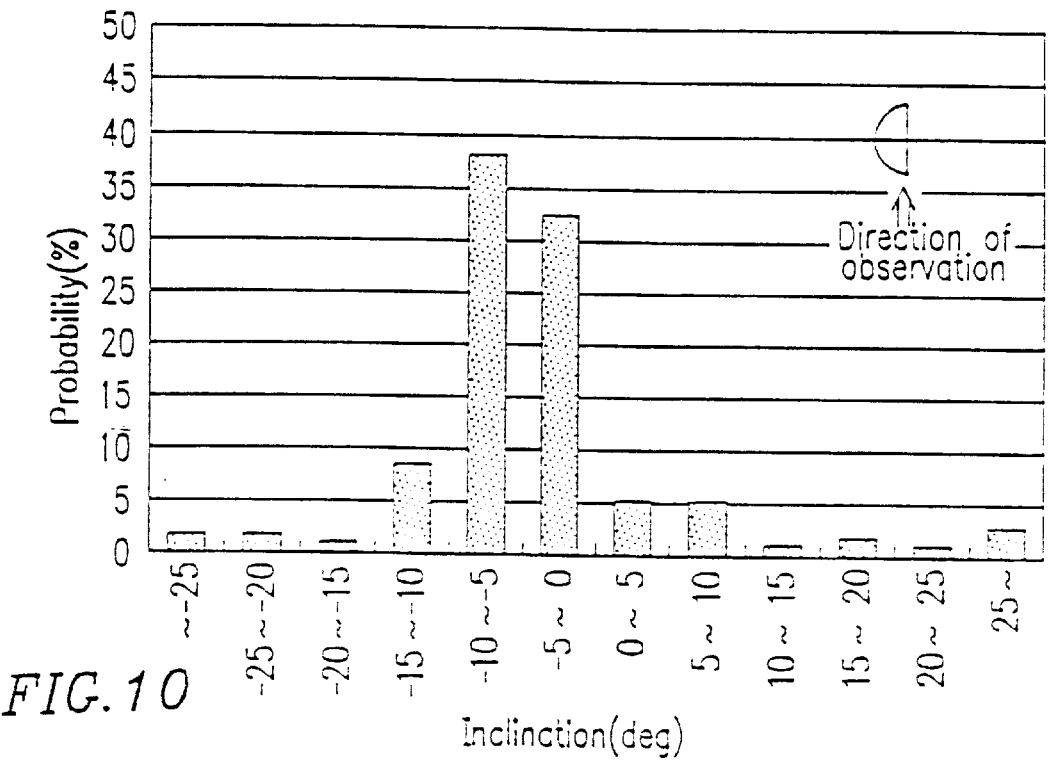
FIG.10
FIG.11
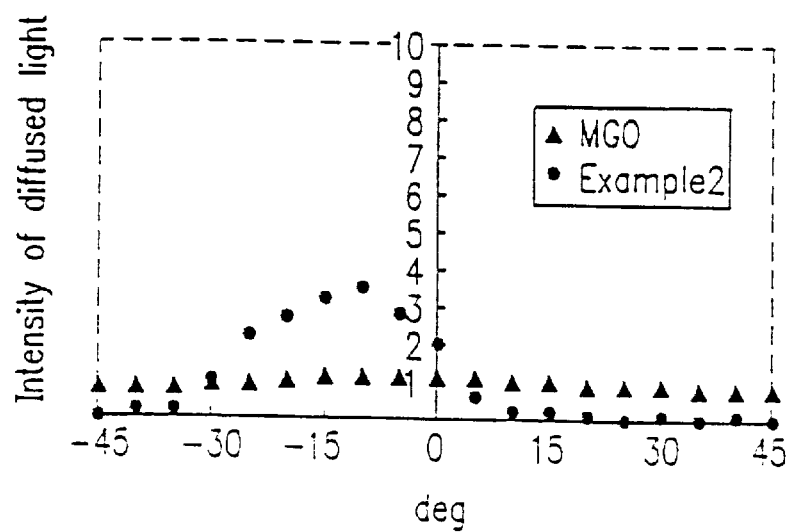

↓ EB irradiation

↓ Development

⇩

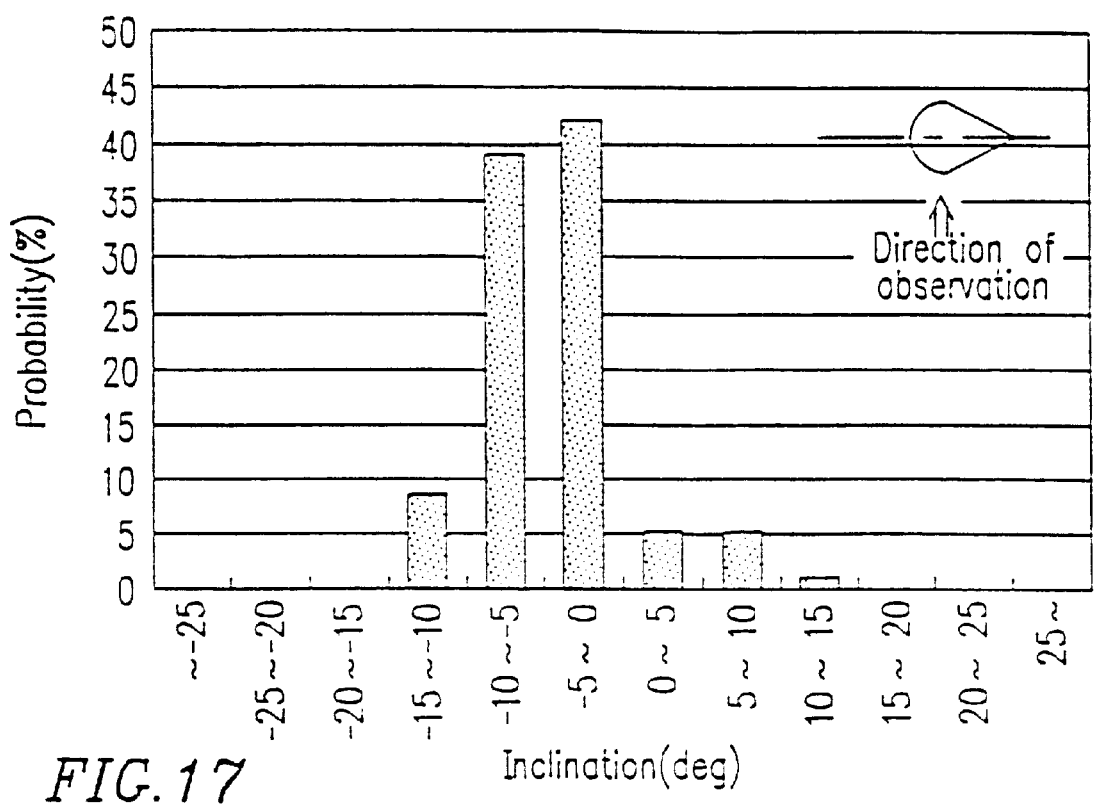
FIG.17
FIG.18
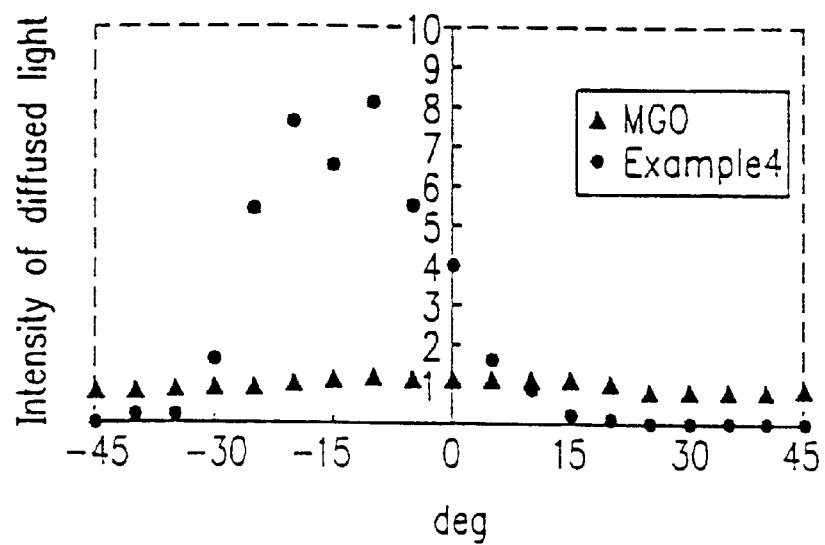

FIG.23A Plan view — Contour line
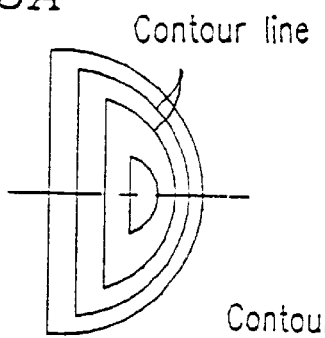
FIG.23B Cross-sectional view — Contour line
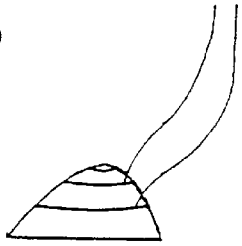
FIG.23C Plan view — Contour line
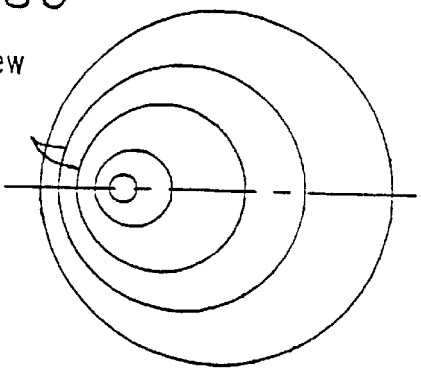
FIG.23D Cross-sectional view — Contour line
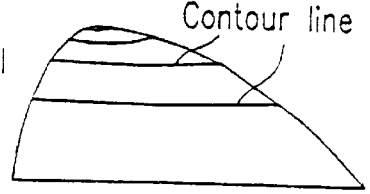
FIG.23E Plan view — Contour line
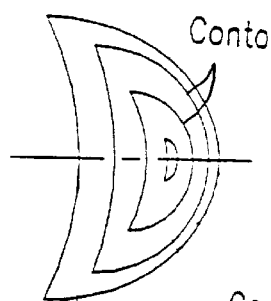
FIG.23F Cross-sectional view — Contour line
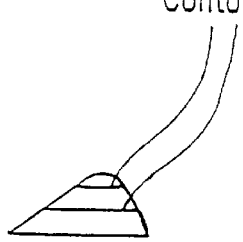

C' Light-blocking region

Light-blocking region

• Comparative example
○ Example 6

- Comparative example
- Example 8

Light-blocking region

Light-blocking region

- Comparative example
- Example 12

• Comparative example
○ Example 13

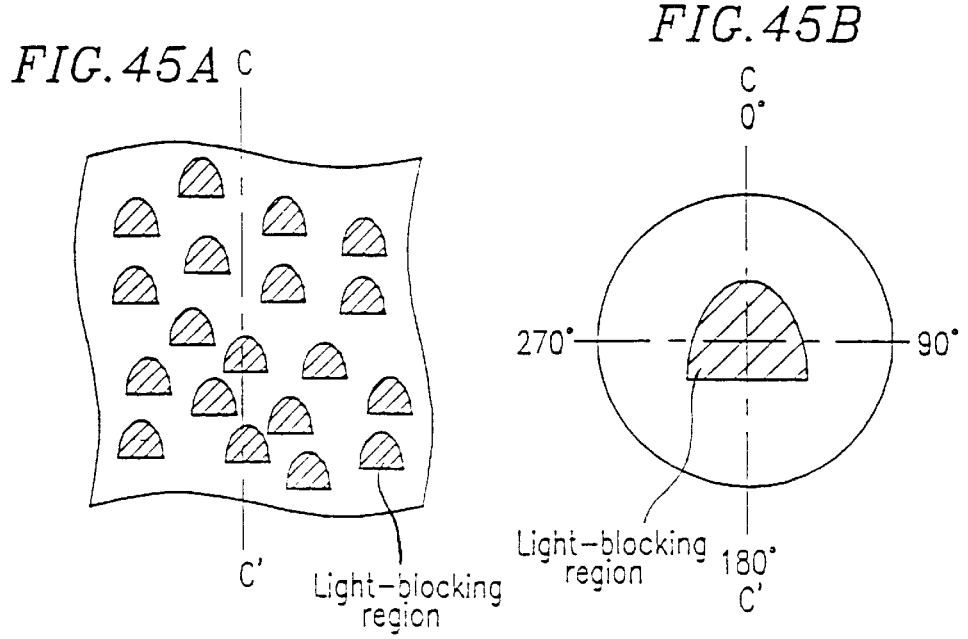
FIG. 45A
FIG. 45B
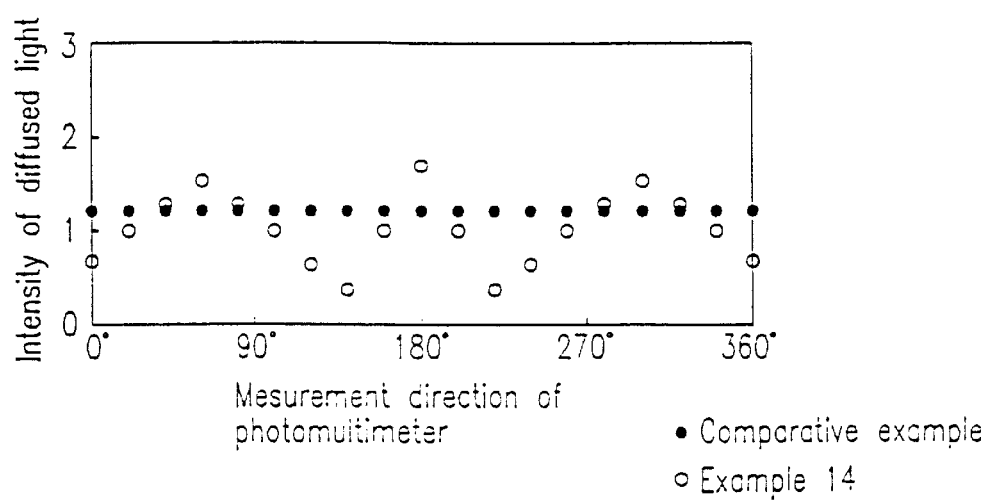
FIG. 46
• Comparative example
○ Example 14

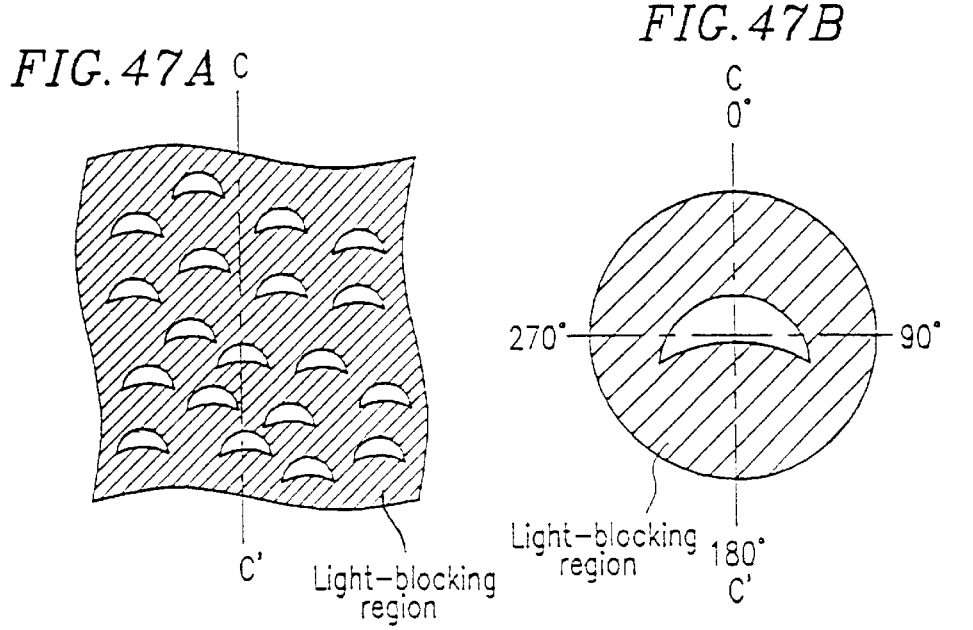
FIG. 47A
FIG. 47B
Light-blocking region
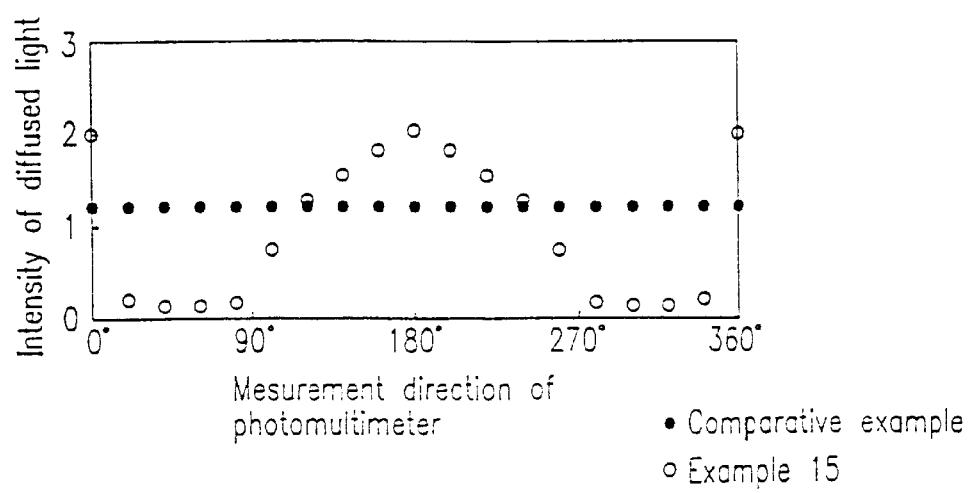
FIG. 48
Intensity of diffused light vs. Mesurement direction of photomultimeter
• Comparative example
○ Example 15

Input pen

Pen-based input system including reflective liquid crystal display device

Substrate
Monomer-rich isotropic phase
Liquid crystal drop
Ridgid Portion
Reflector
Pixel Portion

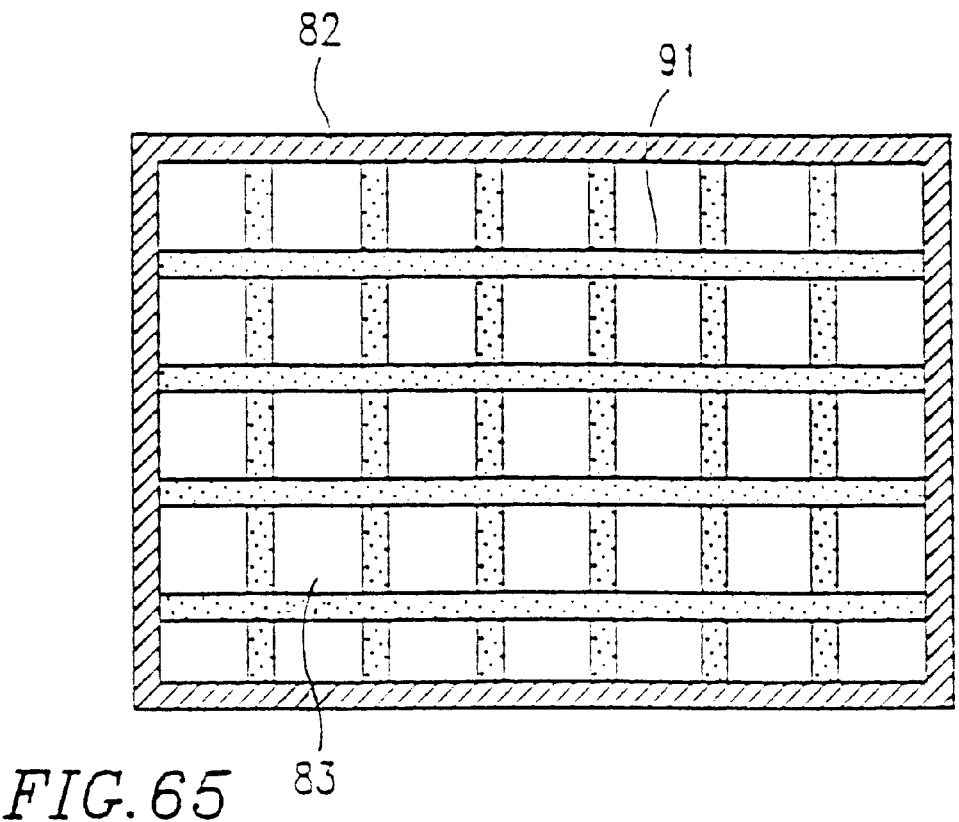
FIG.65
FIG.66
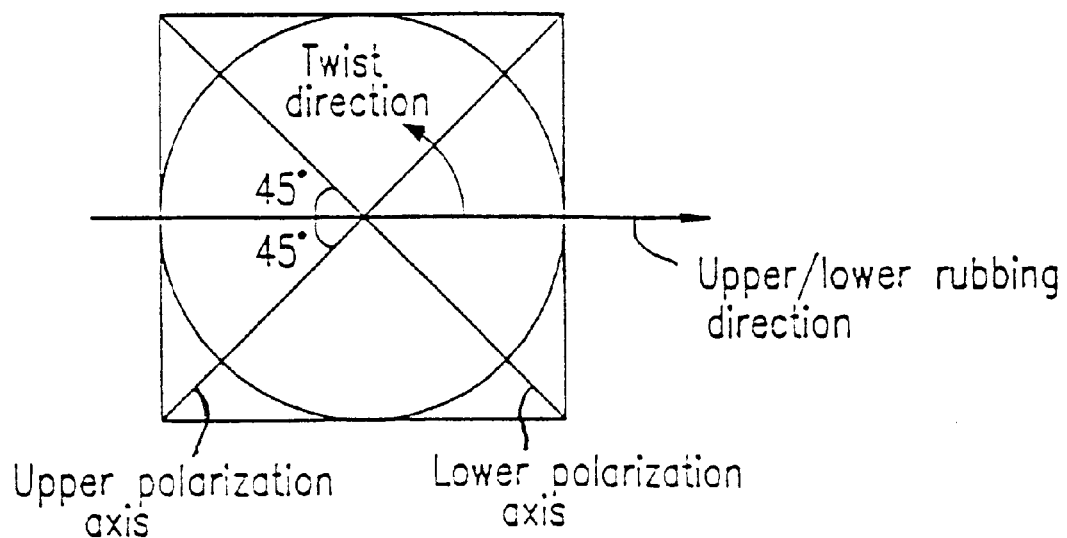

Symmetric axis

Symmetric axis

REFLECTOR, REFLECTIVE LIQUID CRYSTAL DISPLAY INCORPORATING THE SAME AND METHOD FOR FABRICATING THE SAME

BACKGROUND OF THE INVENTION

1. Field of the Invention

The present invention relates to a reflector used in a reflective liquid crystal display device or the like, a reflective liquid crystal display device using such a reflector and a method for fabricating such a reflective liquid crystal display device.

2. Description of the Related Art

The most important characteristic for a reflective liquid crystal display device is the brightness of a display. Therefore, regardless of the display modes, it is important to design a reflector which efficiently reflects ambient light and to develop a method for fabricating such a reflector with high repeatability.

Japanese Laid-Open Patent Publication No. 4-243226 discloses a method for fabricating a reflector having concave/convex portions of a photoresist. According to the method, cylindrical portions are formed on a substrate by developing a photoresist thereon. Then, the cylindrical portions on the substrate are heated to be melted and deformed, thereby forming the concave/convex portions which provide the resultant reflector with a capability of diffusing light incident thereon. This method will be described in detail in the Comparative Example below.

A display such as a display panel of a portable communication apparatus is likely to be viewed from a direction which is normal to the display panel. In such a case, light diffused in other directions (e.g, light reflected in a horizontally inclined direction) is wasted.

According to the above method disclosed in Japanese Laid-Open Publication No. 4-243226, the concave/convex portions are formed by "isotropically" deforming the cylindrical portions on the substrate. Therefore, each of the resultant concave/convex portions has a circular shape as viewed from above, and is concentric with the original cylindrical portion. Due to such a configuration of the concave/convex portions, the intensity distribution of the reflected light is symmetric about an axis normal to the substrate. When such a reflector is used in a reflective liquid crystal display device, light is reflected/diffused in all directions including directions irrelevant to the viewing angle of a user. In other words, such a reflective liquid crystal display device cannot sufficiently utilize light incident thereupon.

In many cases, a reflective liquid crystal display device is used as a display portion of a portable communication apparatus. In many of such cases, an "input pen" (a pen-type input device for inputting data to a pen-based input system) is employed as a means for inputting data. When a user inputs data via the input pen, the display screen is pressed down with the pressure applied thereto by the user via the input pen. The liquid crystal layer in the display panel is thus partially flattened out, thereby causing a disturbance in images on the display. In order to solve such a problem, it is effective to provide a polymer matrix in the liquid crystal layer between a pair of substrates so as to support the liquid crystal cell. However, it is difficult to arrange the polymer matrix into a desired pattern, and portions of the polymer matrix may therefore be undesirably located within a pixel region, thereby weakening the contrast of the display.

SUMMARY OF THE INVENTION

According to one aspect of this invention, a reflector includes at least a substrate and a thin metal film. A plurality of surface deformity portions are formed between the substrate and the thin metal film and have asymmetric cross sections, thereby reflecting light from the thin metal film toward particular directions.

In one embodiment of the invention, the surface deformity portions include at least one of convex portions and concave portions.

In another embodiment of the invention, each of the cross sections of the surface deformity portions has a profile inclined with respect to the substrate. An inclination distribution of the profile along an axis on the substrate is asymmetric. An average inclination distribution of all the surface deformity portions is asymmetric as viewed from the axis on the surface of the substrate.

In still another embodiment of the invention, the cross sections of the surface deformity portions have curved portions, and the thin metal film located on the curved portions reflects the light toward the particular directions.

In still another embodiment of the invention, the surface deformity portions include further cross sections taken along a plane which is parallel to the substrate, and each of the further cross sections has a shape different from a circle and any one of equilateral polygons having more than four sides.

In still another embodiment of the invention, the further cross sections of the surface deformity portions are symmetric.

In still another embodiment of the invention, the surface deformity portions are randomly arranged on the substrate and are oriented toward the same direction.

In still another embodiment of the invention, the surface deformity portions are arranged so that an axis, with respect to which the further cross sections of the surface deformity portions are symmetric, is parallel to a vertical direction of the substrate.

According to another aspect of the invention, a reflective liquid crystal display device includes: a substrate; the reflector mentioned above; and a display medium including a liquid crystal material, the display medium being interposed between the substrate and the reflector.

In one embodiment of the invention, the display medium includes polymer walls dividing the liquid crystal material into a plurality of portions corresponding to a plurality of pixels which perform a display.

In another embodiment of the invention, an insulating layer and a transparent electrode layer are formed on the reflector.

In still another embodiment of the invention, the reflector has ridged portions surrounding each of the plurality of pixels.

In still another embodiment of the invention, the thin metal film of the reflector is patterned to comprise a plurality of metal portions each corresponding to one of the plurality of pixels.

In still another embodiment of the invention, adjacent metal portions are connected to each other, and connecting portions between the adjacent metal portions are formed of a transparent conductive material.

In still another embodiment of the invention, adjacent metal portions are connected to each other, and connecting portions between the adjacent metal portions are formed of the thin metal film.

In still another embodiment of the invention, the metal portions of the thin metal film are arranged in rows and columns, and adjacent metal portions in each row or column are connected to each other, such that the rows or the columns of the metal portions serve as display electrodes.

In still another embodiment of the invention, the reflective liquid crystal display device further includes an alignment film formed on the reflector including the thin metal film. The thin metal film is patterned to comprise a plurality of metal portions arranged in rows and columns, and adjacent metal portions in each row or column are connected to each other.

In still another embodiment of the invention, the display medium includes an STN liquid crystal material, thereby displaying a high contrast image in predetermined viewing directions. The predetermined viewing directions coincide with the particular directions toward which the reflector reflects the light.

In still another embodiment of the invention, the reflective liquid crystal display device further includes a touch panel through which data is input using a pen-type input device.

In still another embodiment of the invention, the predetermined viewing directions are arranged to include an actual viewing direction from which a user views the reflective liquid crystal display device when the data is input using the pen-type input device.

In still another embodiment of the invention, the reflective liquid crystal display device further includes a phase plate and a polarizer. The liquid crystal material includes uniaxially aligned liquid crystal molecules and has such characteristics that a high contrast image is displayed in predetermined viewing directions. The predetermined viewing directions are made to coincide with the particular directions toward which the reflector reflects the light.

In still another embodiment of the invention, a retardation $\Delta n_1 d_1$ of the liquid crystal layer and a retardation $\Delta n_2 d_2$ of the phase plate are set to satisfy the following relationship when the display appears dark:

$$\frac{|\Delta n_1 d_1 - \Delta n_2 d_2|}{\lambda} = \frac{m}{2} + \frac{1}{4} (m = 0, 1, 2, \ldots)$$

where the liquid crystal layer has a refractive anisotropy of $\Delta n_1$ and the thickness of $d_1$, and the phase plate has a refractive anisotropy of $\Delta n_2$ and the thickness of $d_2$.

In still another embodiment of the invention, the retardation $\Delta n_1 d_1$ of the liquid crystal layer and the retardation $\Delta n_2 d_2$ of the phase plate are set to satisfy the following relationship when the display appears bright:

$$\frac{|\Delta n_1 d_1 - \Delta n_2 d_2|}{\lambda} = \frac{m}{2} (m = 0, 1, 2, 3, \ldots)$$

In still another embodiment of the invention, a twist angle of the STN liquid crystal material is in a range of about 180° to 270°.

In still another embodiment of the invention, the reflective liquid crystal display device further includes color filters.

In still another embodiment of the invention, the color filters have a UV transmittance of 30% or more.

According to still another aspect of the invention, a method of fabricating a reflector includes the steps of: forming surface deformity portions on a substrate, the surface deformity portions having asymmetric cross sections; and forming a thin metal film on the substrate to cover the surface deformity portions. The thin metal film reflects light incident thereon toward particular directions.

In one embodiment of the invention, the step of forming the surface deformity portions includes the steps of: patterning the resist film into a plurality of tiny portions; and deforming the tiny portions to have the asymmetric cross sections.

According to still another aspect of the invention, there is provided a method of fabricating a reflective liquid crystal display device including a reflector, a substrate opposed to the reflector and a display medium interposed between the reflector and the substrate. The reflector is fabricated by the method mentioned above.

In one embodiment of the invention, the display medium includes a liquid crystal material and polymer walls dividing the liquid crystal material into a plurality of portions corresponding to a plurality of pixels.

In another embodiment of the invention, the method of fabricating a reflective liquid crystal display device further includes the step of forming a transparent electrode layer on the reflector. The polymer walls are formed by light irradiation using the transparent electrode layer as a mask.

In still another embodiment of the invention, the method of fabricating a reflective liquid crystal display device further includes the step of patterning the thin metal film to be divided into a plurality of metal portions corresponding to the pixels. The polymer walls of the display medium are formed by light irradiation using the metal portions as a mask.

In still another embodiment of the invention, the method of fabricating a reflective liquid crystal display device further includes step of gradually cooling a mixture containing the liquid crystal material and a polymerizable precursor to separate phases of the mixture, prior to a light-irradiation process, thereby forming the polymer walls.

Thus, the invention described herein makes possible the advantages of (1) providing a reflector having an excellent reflection characteristic, (2) a reflective liquid crystal display device using such a reflector which can provide a bright display of images, (3) a method for fabricating such a reflective liquid crystal display device, (4) a reflective liquid crystal display device which can provide a bright display of images particularly in a viewing angle of a user inputting data with an input pen, and (5) a reflective liquid crystal display device which is well-fortified against pressure applied thereto by the user via the input pen.

These and other advantages of the present invention will become apparent to those skilled in the art upon reading and understanding the following detailed description with reference to the accompanying figures.

BRIEF DESCRIPTION OF THE DRAWINGS

FIGS. 1A to 1F are cross-sectional views illustrating a fabrication process of a reflector according to Example 1.

FIGS. 9A to 9F are cross-sectional views illustrating a fabrication process of a reflector according to Example 2.

FIG. 10 is a graph showing the inclination distribution of the reflector according to Example 2.

FIG. 11 is a graph showing the reflection characteristic of the reflector according to Example 2.

FIG. 17 is a graph showing the inclination distribution of the reflector according to Example 4.

FIG. 18 is a graph showing the reflection characteristic of the reflector according to Example 4.

FIGS. 23A to 23F each show an exemplary shape of a concave/convex portion applicable to the present invention, wherein: FIGS. 23A, 23C and 23E are plan views showing the concave/convex portions; and FIG. 23B, 23D and 23F are cross-sectional views showing the concave/convex portions.

FIG. 45A is a plan view schematically showing a photomask used in Example 14; and FIG. 45B is an enlarged view of the photomask.

FIG. 46 is a graph showing the reflection characteristic of a reflector according to Example 14.

FIG. 47A is a plan view schematically showing a photomask used in Example 15; and FIG. 47B is an enlarged view of the photomask.

FIG. 48 is a graph showing the reflection characteristic of a reflector according to Example 15.

FIG. 52 is a schematic iso-contrast diagram showing a desirable reflection characteristic for a portable communication apparatus or the like.

FIG. 54 is a schematic iso-contrast diagram showing a desirable reflection characteristic for a lap-top computer, a palm-top (hand-held) computer or the like.

FIG. 65 is a plan view showing the reflective liquid crystal display device according to Example 23.

FIG. 66 shows the arrangement of rubbing directions of the alignment films and polarization axes of the polarizing films in the reflective liquid crystal display device including a 180°-twisted STN liquid crystal layer according to Example 24.

DESCRIPTION OF THE PREFERRED EMBODIMENTS

Figure 2:
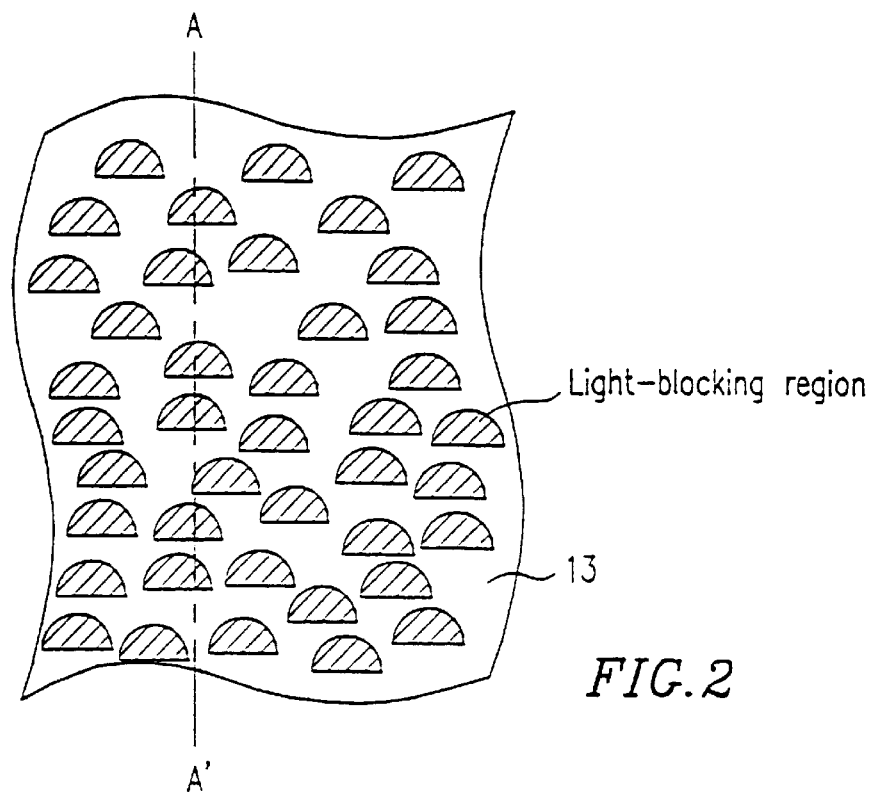
FIG. 2 is a plan view schematically showing a photomask used in the fabrication process shown in FIG. 1B.

Hereinafter, the present invention will be described by way of illustrative examples with reference to the accompanying figures.

EXAMPLE 1

FIG. 1F is a cross-sectional view showing a reflector 15 according to Example 1 of the present invention. The reflector 15 includes convex portions 12c of a resist provided on a glass substrate 11. A thin metal film 14 is provided so as to cover the convex portions 12c and the glass substrate 11.

The fabrication processes of the reflector 15 will now be described with reference to FIGS. 1A to 1F.

First, as shown in FIG. 1A, a resist material (e.g., "OFPR-800": Tokyo Ohka Kogyo Co, Ltd.) is spin-coated on one surface of the 1.1 mm-thick glass substrate (e.g., "7059": Corning Inc.) 11 at, preferably, about 500 to 3000 rpm. In the present example, the resist material is applied onto the substrate for about 30 seconds while spinning the glass substrate 11 at about 3000 rpm, thereby forming about a 0.5 $\mu$m-thick resist film 12a on the glass substrate 11.

The substrate is pre-baked for about 30 minutes at about 100° C. Then, a photomask 13 including a plurality of semi-circular light-blocking regions disposed at random positions as shown in FIG. 2 is placed over the glass substrate 11, as shown in FIG. 1B. Then, the substrate is exposed to light and developed with a developing solution (e.g., NMD-3: Tokyo Ohka Kogyo Co., Ltd.) (2.38%). Thus, as shown in FIG. 1C, portions of the resist film 12a which are not exposed to light form minute semi-circular portions 12b on the glass substrate 11. It should be noted that the light-transmitting regions in the photomask 13 are shown as small rectangular blocks in FIG. 1B. The shape of each minute semi-circular portion 12b formed on the glass substrate 11 as viewed from above corresponds to the light-blocking region in the photomask 13 shown in FIG. 2.

Then, as shown in FIG. 1D, the substrate is inclined in such a manner that the diameter side of each semi-circular portion 12b is located lower than the arc thereof. In the present example, the substrate is inclined by 90°. The inclined substrate is subjected to a heat treatment at about 120 to 250° C. In the present example, the substrate is subjected to a heat treatment at about 250° C. for 30 minutes. As a result, as shown in FIG. 1E, surfaces of the semi-circular portions 12b become smooth and rounded, thereby forming asymmetric convex portions 12c. As described in detail below, the inclination distribution of the asymmetric convex portions 12c is deviated. The substrate is then gradually cooled and cured. When viewed from the normal to the substrate (i.e., as an elevational view), each asymmetric convex portion 12c has a semi-circular shape as an influence of the pattern of the photomask 13. As can be seen from FIG. 1E, the diameter (lower) side of the asymmetric convex portion 12c is thicker than the arc thereof. The upper periphery of the vertical cross section of the asymmetric convex portion 12c is curved.

Then, as shown in FIG. 1F, the thin metal film 14 is formed on the entire surface of the reflector 15. As the thin metal film 14, Al, Ni, Cr, Ag or the like can be used. Preferably, the thin metal film 14 is formed to be about 0.01 to 1.0 μm thick. In the present example, the thin metal film 14 is formed by vacuum evaporation of Al. The reflector 15 is thus obtained. It should be noted that FIG. 1F is a cross-sectional view of the asymmetric convex portions 12c of the reflector 15 taken in a direction corresponding to the line A-A' in FIG. 2.

Figure 3A:
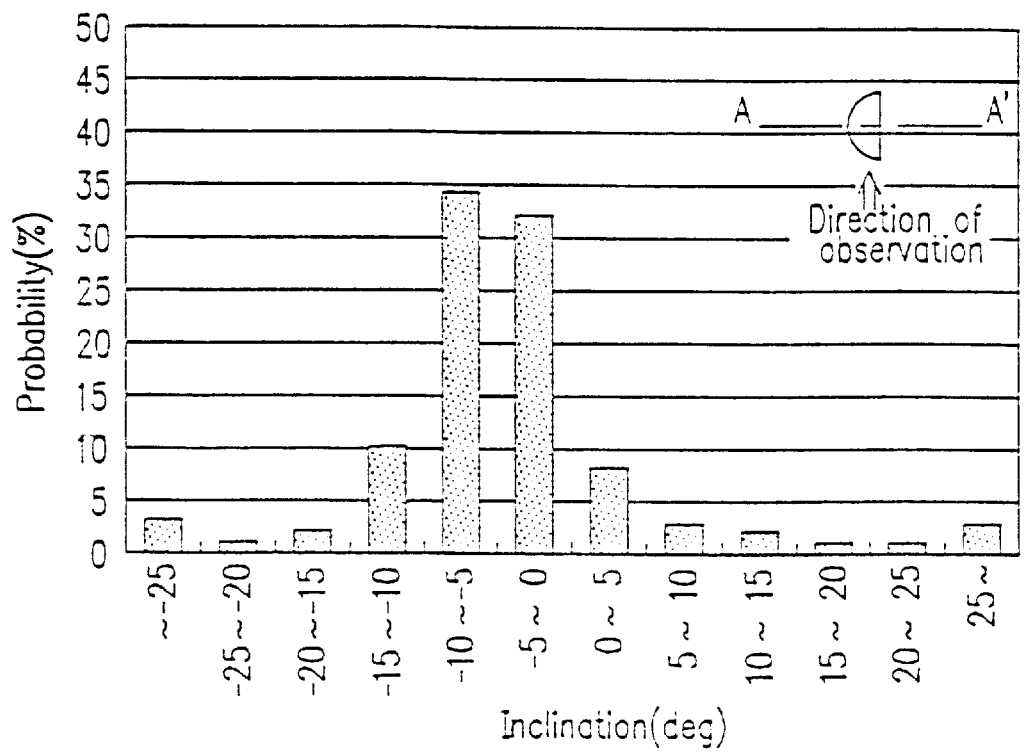
FIG. 3A is a graph showing an inclination distribution of the surface of the reflector according to Example 1.
Figure 3B:
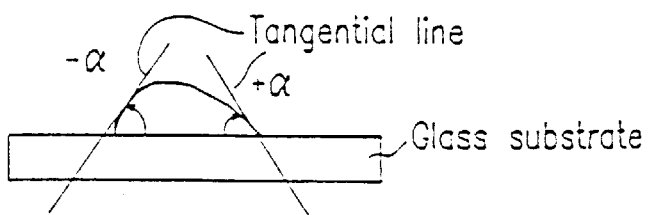
FIG. 3B is a schematic diagram showing the cross section of a convex portion on the reflector according to Example 1 and tangential lines to the surface of the reflector.

FIG. 3A shows the inclination distribution of the surface of the above-described reflector 15. Herein, the inclination of the surface of the reflector 15 represents an angle between the surface of the substrate 11 and a tangential line to the surface of the convex portions 12c. The inclination distribution is measured using an interference microscope in a direction perpendicular to the diameter side of the asymmetric convex portions 12c. FIG. 3B is a cross-sectional view showing one asymmetric convex portion 12c taken in a direction corresponding to the line A-A' in FIG. 2. In FIG. 3B, the angle α between the surface of the substrate 11 and the tangential line to the surface of the asymmetric convex portion 12c is indicated as +α when the tangential line is inclined clockwise with respect to the substrate surface and as −α when inclined counterclockwise with respect to the substrate surface. It is assumed throughout the specification that the measurement is conducted in this manner.

As can be seen from FIG. 3A, the inclination distribution of the convex portions of the reflector 15 is deviated.

Figure 4:
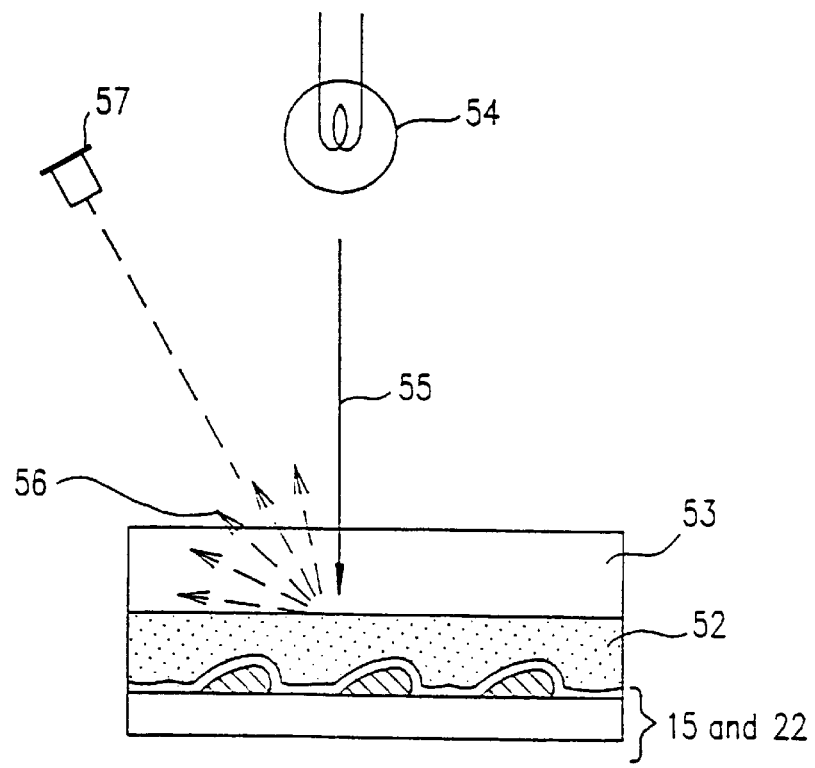
FIG. 4 is a schematic diagram showing the measurement of the reflection characteristic of the reflectors of Examples 1, 2, 4 and the Comparative Example.

FIG. 4 is a schematic diagram showing how the reflection characteristic of the reflector 15 is measured. It is assumed herein that the reflector 15 is incorporated in a liquid crystal display device.

It is contemplated that the liquid crystal display device incorporating the reflector 15 includes the reflector 15 as a lower substrate, an upper glass substrate 53 and a liquid crystal layer interposed therebetween. The reflector 15 is provided so that the convex portions thereof are in contact with the liquid crystal layer. The refractive indices of the liquid crystal layer and the glass substrate 53 are both about 1.5. For a measurement purpose, a UV-curable adhesive 52 having substantially the same refractive index of about 1.5 is substitutionally used in place of the liquid crystal layer. The reflector 15 thus adheres to the upper glass substrate 53 with the adhesive 52, thereby forming a cell.

Light 55 emitted from a light source 54 is made to be incident upon the above cell in a direction normal to the substrate 53. The incident light 55 is reflected by the reflector 15 and the intensity of the reflected light 56 is measured by a photomultimeter 57 at different directions inclined from the substrate normal. The reflection characteristic of the reflector 15 is thus measured.

Figure 5:
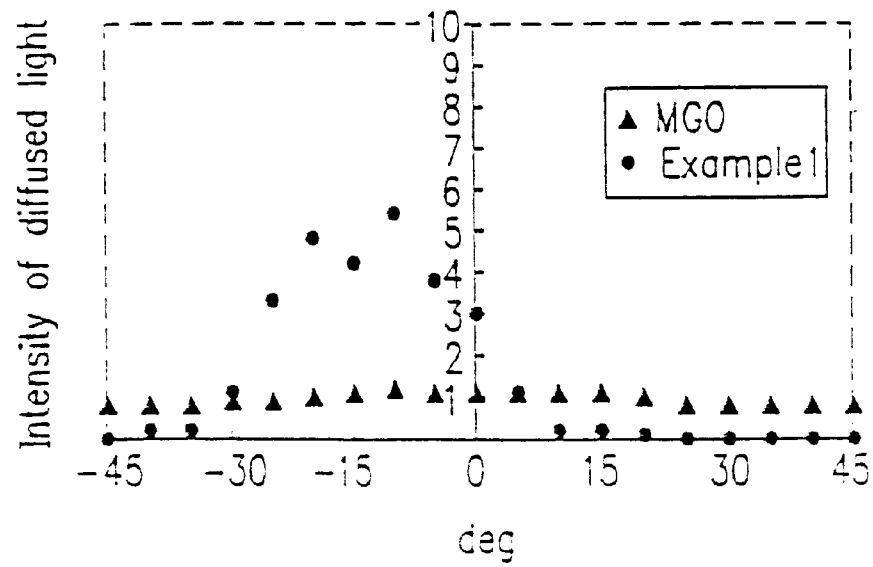
FIG. 5 is a graph showing the reflection characteristic of the reflector according to Example 1.

FIG. 5 shows the reflection characteristic of the reflector 15 based on the result of the measurement. The x-axis represents the measurement: angle of the photomultimeter 57 with respect to the normal to the substrate, whereas the y-axis represents the intensity of the reflected light 56. In FIG. 5, circular dots represent the reflection characteristic of the reflector 15 of Example 1 of the present invention, whereas triangular dots represent that of a standard white plate of MgO (magnesium oxide). In FIG. 5, the intensity of the reflected light is normalized with the intensity of light reflected by the standard white plate in the normal direction being 1.

As can be seen from FIG. 5, the intensity of light reflected by the standard white plate (as shown by the triangular dots) is substantially the same (and low) at any viewing angle direction. On the other hand, the reflector 15 of Example 1 (as shown by the circular dots) exhibits a high reflected light intensity in the inclination range (from the normal to the substrate) of about −30 to +5° (more particularly in the inclination range of about −25 to 0°). It is also confirmed that a similar result is observed at an interface between the reflector 15 and an actual liquid crystal layer.

Figure 8:
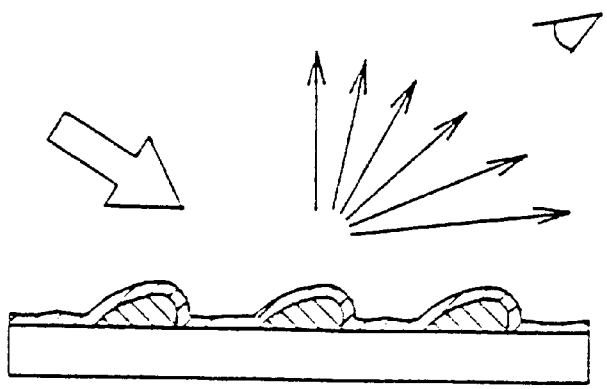
FIG. 8 is a schematic diagram showing a direction at which a very bright display is provided by the reflector according to Example 1 when light is incident on the reflector in a direction inclined from a direction normal to the substrate.
Figure 6:
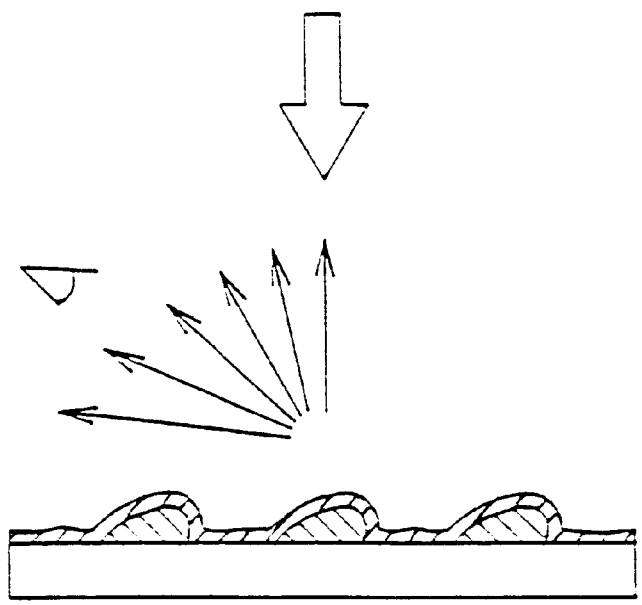
FIG. 6 is a schematic diagram showing a direction at which a very bright display is provided by the reflector according to Example 1.
Figure 7:
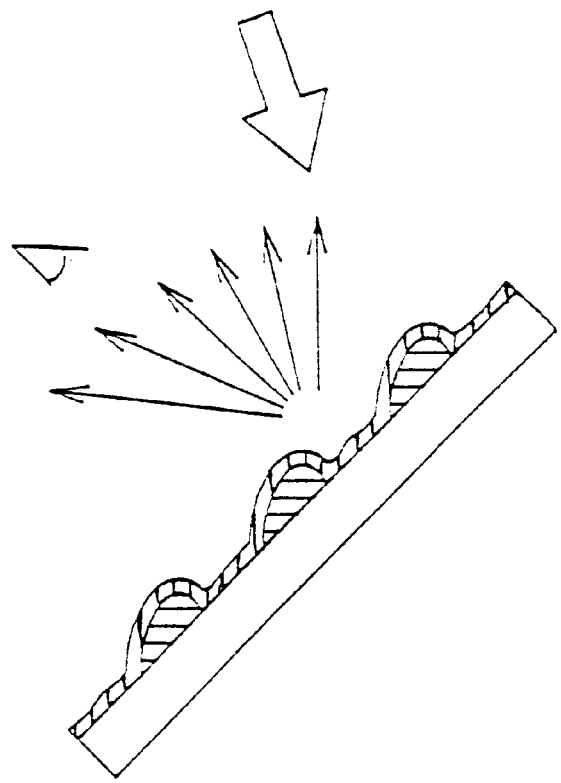
FIG. 7 is a schematic diagram showing a direction at which a very bright display is provided by a display of a lap-top computer or the like employing the reflector according to Example 1.

As shown in FIG. 6, when light is incident upon the reflector in a direction normal to the reflector, the concave/convex portions of the reflector 15 reflect light toward particular directions (in the viewing angle), thereby providing a highly-bright display of images. Moreover, when the concave/convex portions are shaped so as to reflect light incident thereupon in directions shown in FIGS. 7 and 8, a highly-bright display of images can be viewed from the viewing angle with light being incident upon the reflector in a direction inclined from the substrate normal.

In order to obtain the deviation in the distribution of angles between the substrate surface and the surface of the convex portions, the substrate is inclined while being heated in Example 1, though, the present invention is not limited thereto. For Example, hot air can be applied to the semi-circular portions 12b on the substrate or the substrate can be rotated so as to generate a centrifugal force onto the semi-circular portions 12b on the substrate.

EXAMPLE 2

Example 2 of the present invention provides a method for shaping a reflector into a desired shape without any heat treatment.

The fabrication processes of a reflector 22 of Example 2 will now be described with reference to FIGS. 9A to 9F.

First, as shown in FIG. 9A, a resist material (e.g., "OFPR-800": Tokyo Ohka Kogyo Co., Ltd.) is spin-coated on one surface of a 1.1 mm-thick glass substrate (e.g., "7059": Corning Inc.) 11 at, preferably, about 500 to 3000 rpm. In the present example, the resist material is applied onto the surface for about 20 seconds while spinning the glass substrate 11 at about 500 rpm, thereby forming about a 2 μm-thick resist film 12a on the glass substrate 11.

The substrate is pre-baked for about 30 minutes at about 100° C. Then, the photomask 13 of Example 1 (see FIG. 2) is placed over the glass substrate 11 as shown in FIG. 9B. Then, the substrate is exposed to light and developed with a developing solution (e.g., NMD-3: Tokyo Ohka Kogyo Co., Ltd.) (2.38%). Thus, as shown in FIG. 9C, portions of the resist film 12a which are not exposed to light form minute semi-circular portions 12b on the glass substrate 11. It should be noted that light-transmitting regions in the photomask 13 are represented by small rectangular blocks in FIG. 9B. The shape of each minute semi-circular portion 12b corresponds to the light-blocking region in -the photomask 13 shown in FIG. 2.

Then, as shown in FIG. 9D, the glass substrate 11 is irradiated with ion beams 21 from the arc side of the semi-circular portion 12b in a direction inclined from the surface of the substrate 11. For generating the ion beams 21, ion-milling and the like are applicable. As a result of the irradiation of the ion beams 21, portions of the glass substrate 11, which are not covered with the minute semi-circular portions 12b, are removed. On the other hand, portions of the glass substrate 11, which are covered with the minute semi-circular portions 12b, are not removed until the minute semi-circular portions 12b which protect those portions are completely removed. As a result, the shape of the glass substrate 11 becomes anisotropic as shown in FIG. 9E, where asymmetric concave portions 11c are formed around the portions of the glass substrate 11 which are covered with the minute semi-circular portions 12b. The diameter side of the resultant concave portion 11c is shallower than the other side thereof. The bottom periphery of the vertical cross section of the asymmetric concave portion 11c is curved.

Then, as shown in FIG. 9F, the thin metal film 14 is formed on the entire surface of the reflector 22. As the thin metal film 14, Al, Ni, Cr, Ag or the like can be used. Preferably, the thin metal film 14 is formed to be about 0.01 to 1.0 $\mu$m thick. In the present example, the thin metal film 14 is formed by vacuum evaporation of Al and the reflector 22 is thus obtained.

FIG. 10 shows the inclination distribution of the surface of the above-described reflector 22, the distribution being obtained through an observation in a direction perpendicular to the diameter direction of the concave portion 11c using the interference microscope; and FIG. 11 shows the reflection characteristic of the reflector 22, as a result of the measurement of Example 1 as shown in FIG. 4 (only difference is that concave portions are measured in the present example instead of convex portions).

As can be seen from FIGS. 10 and 11, the reflector 22 of Example 2 exhibits a high reflected light intensity in the inclination range of about −30 to +5° (more particularly in the inclination range of about −25 to 0°). Such a reflection characteristic is due to the shape of the concave portions of the reflector 22 which reflect light incident upon any position of the reflector in a particular direction.

Although, in Example 2, the resist is formed into the semi-circular portions 12b as ion-blocking portions, it is also applicable to form a resist film having semi-circular openings as ion-transmitting portions. Also, in such a case, the substrate 11 is irradiated with ion beams 21 as described above so as to form the concave portions 11c through the openings of the resist film with the bottom periphery of the concave portions having an asymmetric inclination distribution.

EXAMPLE 3

Example 3 of the present invention provides a reflective liquid crystal display device incorporating the reflector 15 of Example 1.

Figure 12:
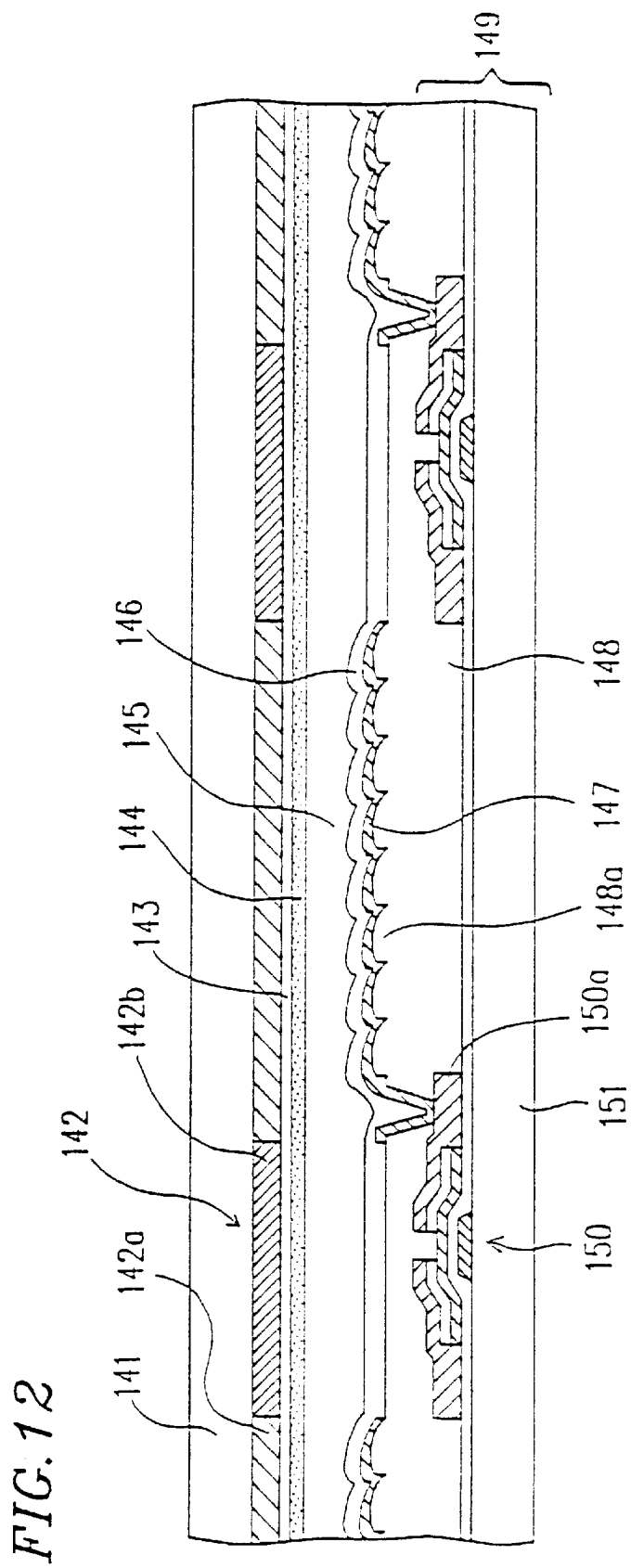
FIG. 12 is a cross-sectional view showing a configuration of a reflective liquid crystal display device according to Example 3.

FIG. 12 is a cross-sectional view showing a liquid crystal display device according to Example 3. The liquid crystal display device includes a glass substrate 141, a TFT (thin film transistor) panel substrate 149 and a liquid crystal layer 145 interposed therebetween. The TFT panel substrate 149 includes TFTs 150, source lines (not shown), gate lines (not shown) and the like provided on a glass substrate 151, over which a concave/convex layer 148 of a resist material is provided. A plurality of convex portions 148a as the asymmetric convex portions of Example 1 are provided on the upper surface of the concave/convex Layer 148. A thin metal film 147 to be part of a reflector is provided on the convex portions 148a of the concave/convex layer 148. The thin metal film 147 located above the convex portions 148a serves as a pixel electrode in this example. The convex portions 148a and the thin metal film 147 have the same function as the reflector 15 of Example 1. A contact hole is provided through the concave/convex layer 148 so as to be located above a drain electrode 150a of the TFT 150. The drain electrode 150a is electrically connected to the pixel electrode 147 provided on the concave/convex layer 148 via the contact hole. Thus, the TFT panel substrate 149 has a Pixel On Passivation structure. An alignment film 146 is provided on the TFT panel substrate 149 on the side of the liquid crystal layer 145.

Figure 13:
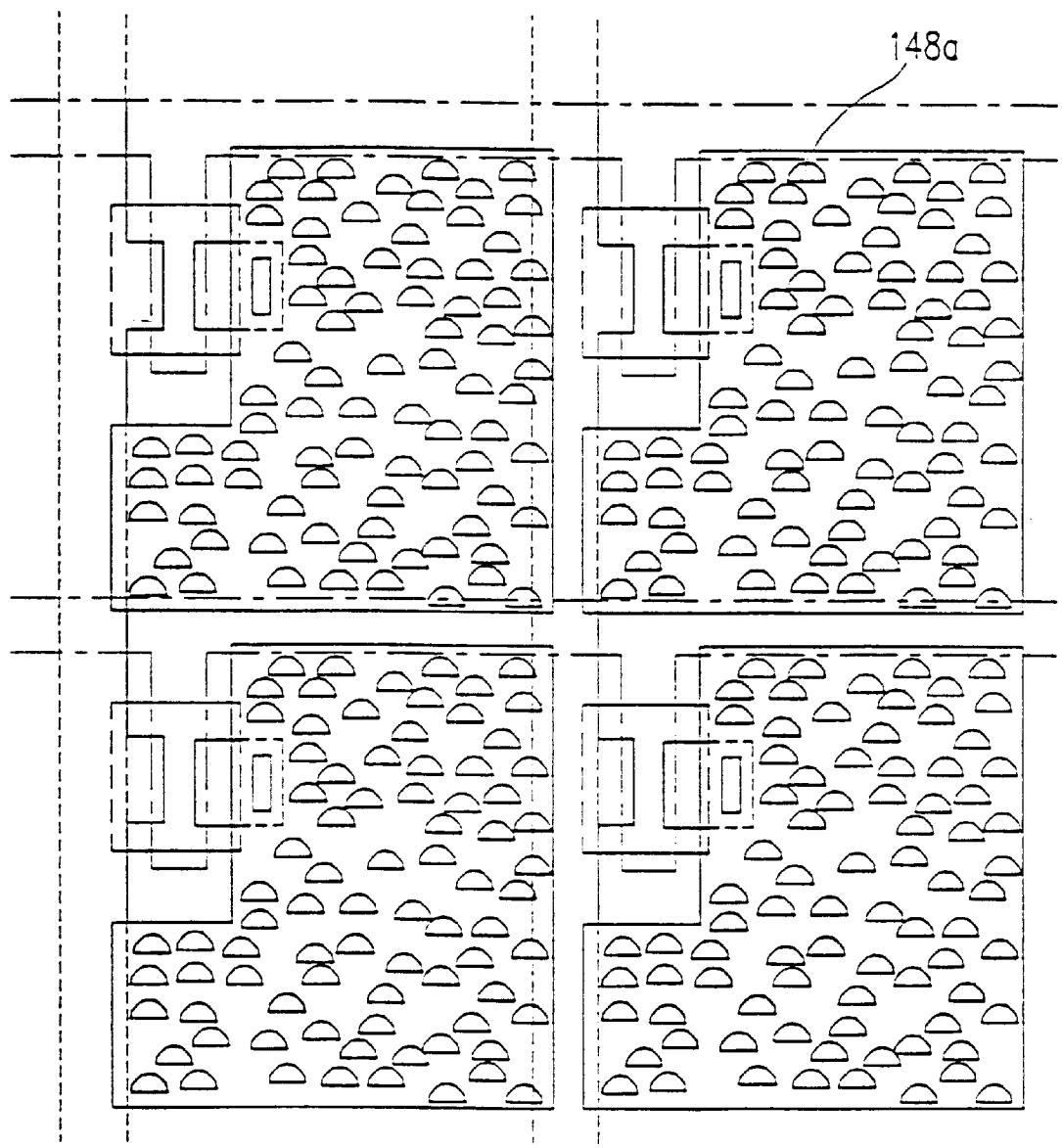
FIG. 13 is a schematic diagram showing an arrangement of concave and convex portions in each pixel of the reflective liquid crystal display device according to Example 3.

The above-described concave/convex layer 148 of a resist material is formed by a method of Example 1. The arrangement of the convex portions 148a of the concave/convex layer 148 is shown in FIG. 13. As shown in FIG. 13, the convex portions 148a are arranged in the same direction (i.e., the diameter sides thereof are parallel to one another). Due to such an arrangement, the concave/convex layer 148 directs the majority of the reflected light toward a particular viewing angle. Such an arrangement of the concave/convex layer 148, where the diameters of the convex portions 148a are in the same direction, can also be applicable to Example 2 described above and Example 4 below to obtain the same effects.

Provided on the upper glass substrate 141 are color filters 142, a transparent conductive film 143 and an alignment film 144. The color filters 142 include light-blocking portions 142b, which are located above the TFT 150, and color filter portions 142a.

The glass substrate 141 is attached to the TFT panel substrate 149, after which a liquid crystal material is injected therebetween, thereby forming the liquid crystal layer 145. The liquid crystal layer 145 is then sealed, thereby obtaining the liquid crystal display device. It should be noted that the configuration of the liquid crystal display device above is substantially the same as the configuration of the cell shown in FIG. 4.

As the liquid crystal material, a liquid crystal material of a guest-host type where a black dichroic dye is mixed as a guest material in a nematic liquid crystal material as a host material can be used. In Example 3, a nematic liquid crystal material (e.g., ZLI-4792: Merck 0.13 and a dichroic dye such as a mixed dye of an azo-containing dye and an anthraquinone-containing dye are used. A chiral agent (e.g., S-811: Merck & Co., Inc.) of 13% by weight is further added in the liquid crystal material. The twist pitch (p0) of the liquid crystal molecules is set to be about 5 $\mu$m due to the chiral agent, and the thickness d of the liquid crystal layer 145 is set to be about 4.5 $\mu$m due to a spacer. Accordingly, a value d/p0 is set to be about 0.9.

The alignment films 144 and 146 are formed of polyimide. The orientations of the alignment processes for the alignment films 144 and 146 are set to be opposite to each other. Accordingly, the orientation of the liquid crystal molecules undergoes a twist (rotation) of 360° between the substrates 141 and 149.

The reflective liquid crystal display device of Example 3 having such a configuration displays images based on an operational principle substantially the same as that of a white-tailor-type guest-host liquid crystal display device. Moreover, since the convex portions 148a of the concave/convex layer 148 have a uniform orientation as shown in FIG. 13, the liquid crystal display device of Example 3 provides a deviation in the directions to which the incident light is diffused. Therefore, in a practical use of such a liquid crystal display device, the reflected light is not directed to a direction irrelevant to the viewing angle of a user, but rather is primarily directed to the viewing angle of the user. Thus, the reflective liquid crystal display device with a highly-bright display is realized.

EXAMPLE 4

The fabrication process of a reflector 32 of Example 4 will now be described with reference to FIGS. 14A to 14D.

Figure 14A:
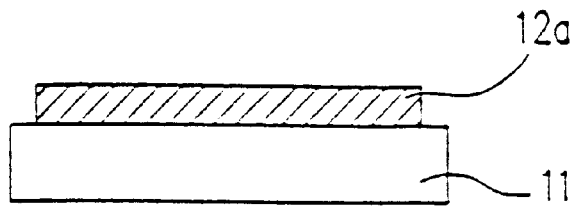
FIGS. 14A to 14D are cross-sectional views illustrating a fabrication process of a reflector according to Example 4.

As shown in FIG. 14A, a resist material (e.g., "SAL601 ER-7": manufactured by Siply) is spin-coated on one surface of a 1.1 mm-thick glass substrate (e.g., "7059": Corning Inc.) 11 at, preferably, about 500 to 3000 rpm. In the present example, the resist material is applied to the surface for about 20 seconds while spinning the glass substrate 11 at about 500 rpm, thereby forming about a 2 $\mu$m-thick resist film 12a on the glass substrate 11.

Figure 14B:
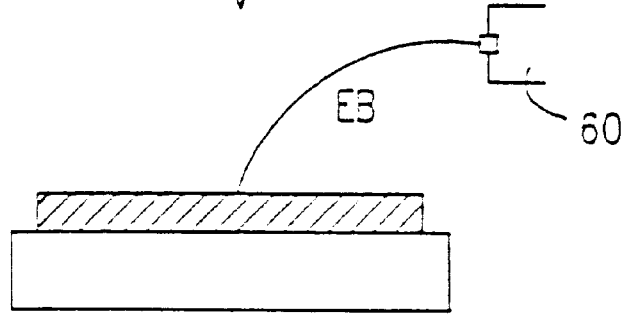
Figure 14C:
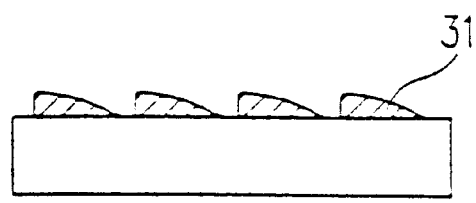

The substrate is pre-baked for about 30 minutes at about 100° C. Then, as shown in FIG. 14B, electron beams EB are irradiated onto a minute area (about 0.5 $\mu$m diameter in the present example) of the resist film 12a using an electron beam exposure 60. Thus, asymmetric convex portions 31 as shown in FIG. 14C are formed on the glass substrate 11. The specific shape of the convex portions 31 will be described below with reference to FIGS. 16A and 16B.

Figure 15:
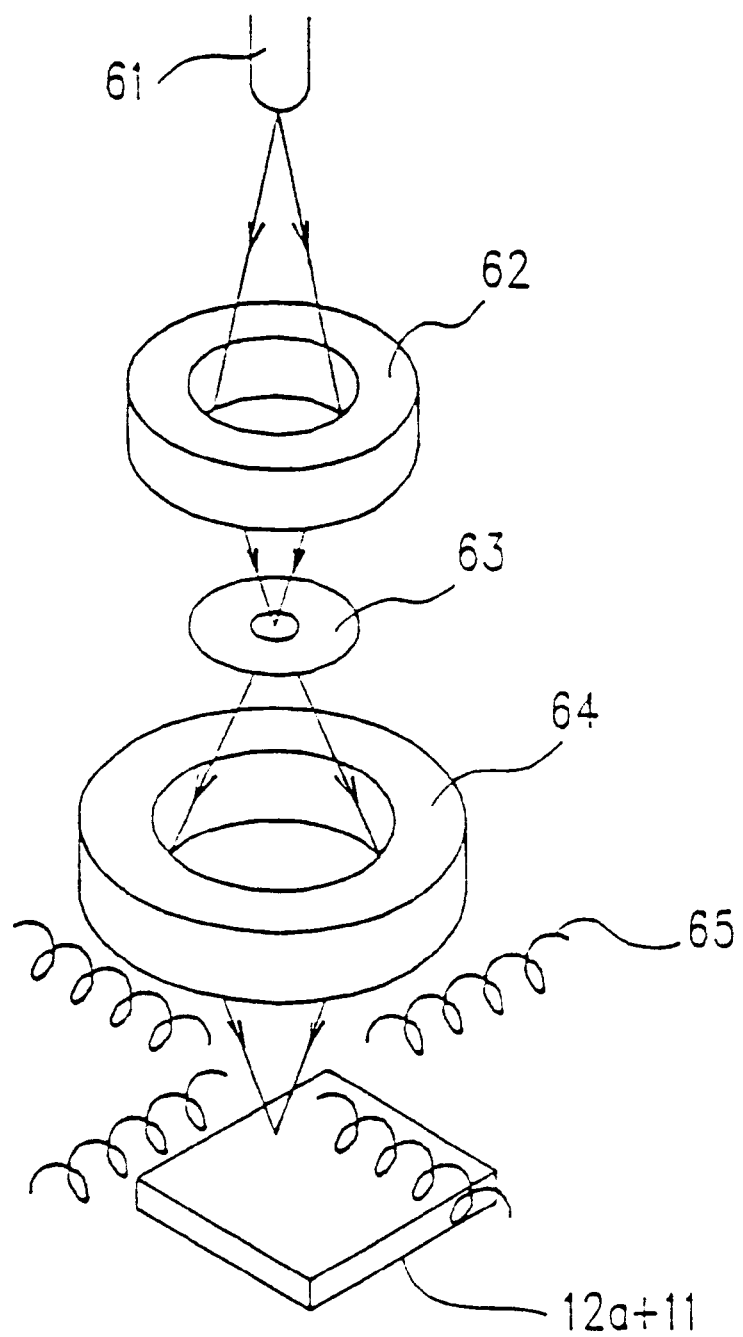
FIG. 15 is an isometric view showing an electron beam irradiation apparatus used in Example 4.
Figure 16A:
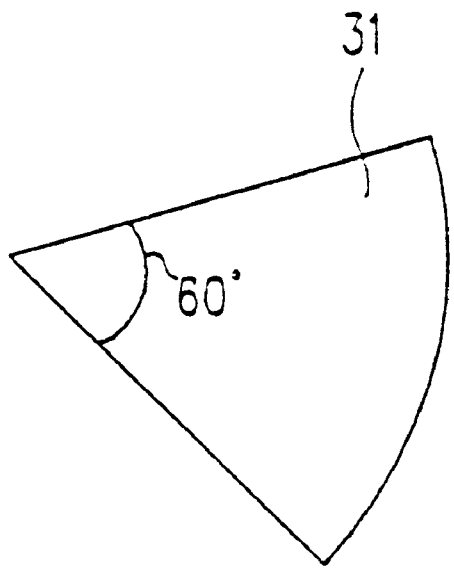
FIG. 16A is a plan view showing the shape of a convex portion on a reflector according to Example 4.
Figure 16B:
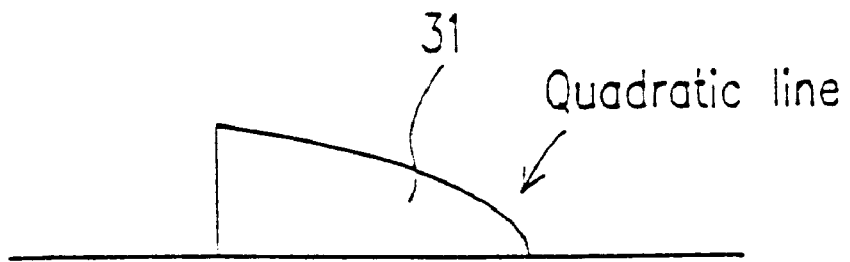
FIG. 16B is a cross-sectional view of the convex portion on the reflector according to Example 4.

As shown in FIG. 15, the electron beam exposure 60 includes an electron beam source 61, a condenser lens 62, a pin hole 63, a projection lens 64 and an deflection coil 65 as main components which are each supported by supporting means (not shown). The main components, the supporting means and the resist film 12a to be irradiated with the electron beams EB are all provided in a vacuum. Electrons emitted from the electron beam source 61 are accelerated by a potential difference, and converged to the pin hole 63 by the condenser lens 62. The electrons pass through the pin hole 63, and are then converged to a point on the resist film 12a by the projection lens 64. The path of the electrons can be controllably deflected by applying an electric current through the deflection coil 65. Thus, it is possible to control the electron beams to be incident within a particular region of the resist film 12a. Moreover, the depth of the resist removal can also be controlled by controlling the amount of irradiation of the electron beams EB. Therefore, the shape of the resultant resist film 12a after being exposed to the electron beams EB can be 3-dimensionally controlled by controlling the direction and the amount of the electron beam irradiation. FIGS. 16A and 16B show the shape of each resultant convex portion 31 of Example 4 as a plan view and as a cross-sectional view taken along the bisector of the interior angle of the fan shape shown in FIG. 16A, respectively. As shown in FIG. 16A, each convex portion 31 has a fan shape with about a 60° interior angle and, as shown in FIG. 16B, the sloped portion of each convex portion 31 has a quadratic line, with the interior angle side thereof being thicker than the arc portion thereof.

Figure 14D:
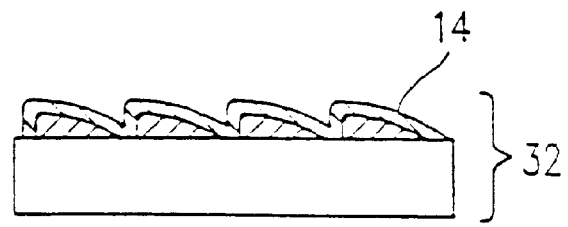

Then, as shown in FIG. 14D, the thin metal film 14 is formed on the entire surface of the substrate 11. As the thin metal film 14, Al, Ni, Cr, Ag or the like can be used. Preferably, the thin metal film 14 is formed to be about 0.01 to 1.0 $\mu$m thick. In the present example, the thin metal film 14 is formed by vacuum evaporation of Al and the reflector 32 is thus obtained.

FIG. 17 shows the inclination distribution of the surface of the above-described reflector 32, the distribution being obtained through an observation along the bisector of the interior angle of the fan shape of the convex portion 31; and FIG. 18 shows the reflection characteristic of the reflector 32, as a result of the measurement of Example 1 shown in FIG. 4.

As can be seen from FIGS. 17 and 18, the reflector 32 of Example 4 exhibits a high reflected light intensity in the inclination range of about −30 to +10°. Especially in the inclination range of about −25 to 0°, an extremely bright display can be viewed, which is even brighter than the reflectors of Examples 1 or 2. Such a reflection characteristic is obtained because the reflector 32 has fan-shaped convex portions, thereby directing more diffused light to the front direction while reducing the amount of light diffusing in the side directions.

Although a fan shape with the interior angle of about 60° is employed in Example 4, the present invention is not limited thereto. For example, the viewing angle to which the incident light is diffused can be controlled by adjusting the interior angle of the fan-shaped convex portions to be narrower or wider. Moreover, similar effects can be obtained by shaping the concave/convex portions on the reflector as shown in FIGS. 23A to 23F. The similar effects can be obtained as long as each convex portion has at least one axis on the substrate surface where the inclination distribution measured along the axis is asymmetric about the 0° inclination point of the axis (e.g., as in FIGS. 3A, 10 and 17), while the average convex portion of all the convex portions also has such an axis. Herein, the average convex portion is a hypothetical convex portion having the average surface shape of all the convex portions on the reflector. Instead of shaping the convex portions 31 of Example 4, it is also applicable to shave the reflector 32 to form concave portions having the fan shape the shapes shown in FIGS. 23A to 23F or the like in the reflector 32.

COMPARATIVE EXAMPLE

Hereinafter, a reflector according to a Comparative Example, a method for fabricating such a reflector and the reflection characteristic of such a reflector will be described.

The fabrication process of a reflector 141 of the Comparative Example will now be described with reference to FIGS. 19A to 19E.

Figure 19A:
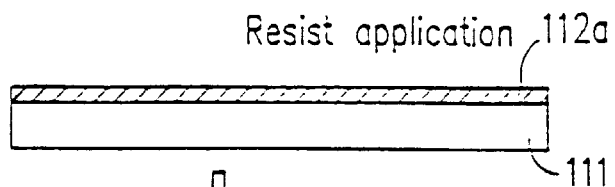
FIGS. 19A to 19E are cross-sectional views illustrating a fabrication process of e, reflector according to the Comparative Example.

First, as shown in FIG. 19A, a resist material (e.g., "OFPR-800": Tokyo Ohka Kogyo Co., Ltd.) is spin-coated on one surface of a 1.1 mm-thick glass substrate (e.g., "7059": Corning Inc.) 111 at, preferably, about 500 to 3000 rpm. In the Comparative Example, the resist material is applied onto the surface for about 30 seconds while spinning the glass substrate 111 at about 1000 rpm, thereby forming an about 1.2 $\mu$m-thick resist film 112a on the glass substrate 111.

Figure 19B:
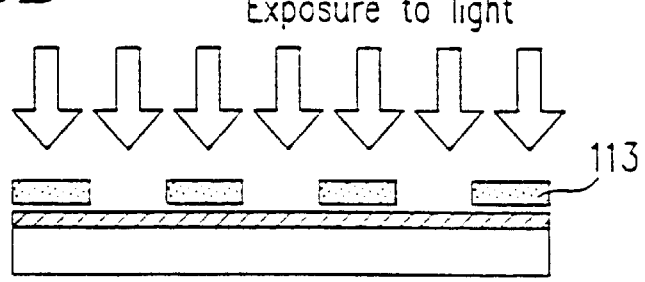
Figure 19C:
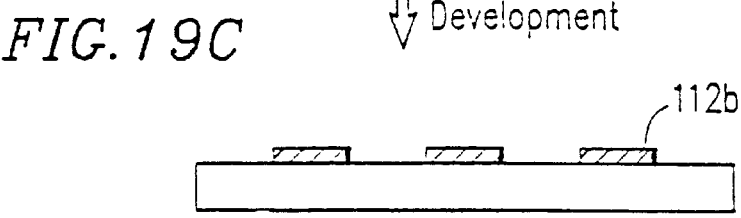
Figure 20:
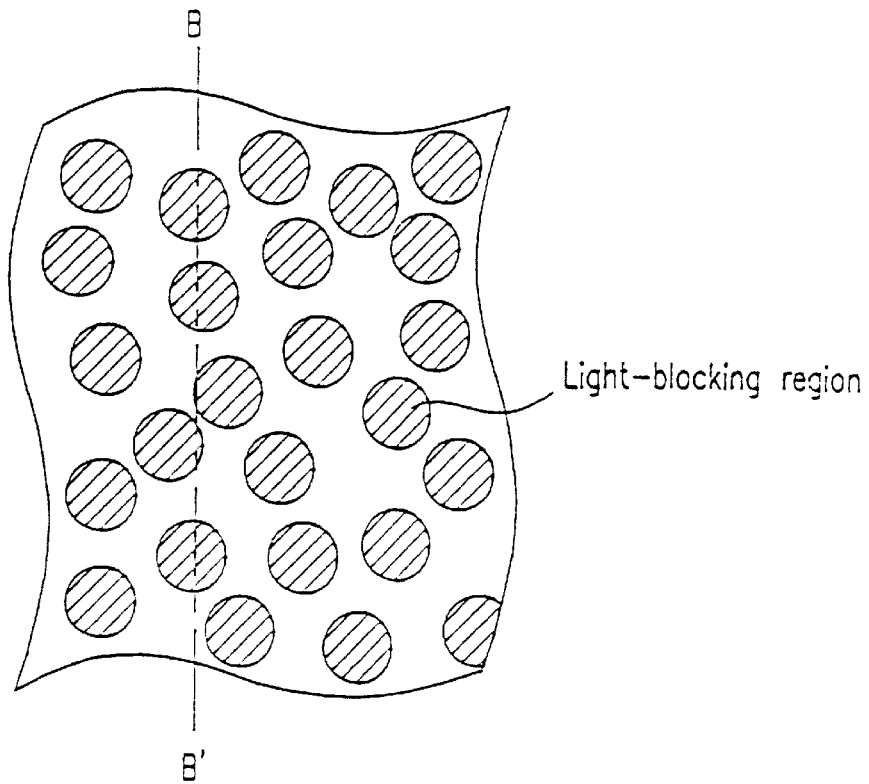
FIG. 20 is a plan view schematically showing a photomask used in the fabrication process shown in FIG. 19B.

The substrate is pre-baked for about 30 minutes at about 100° C. Then, the photomask 113 having a pattern of minute circular light-blocking regions (see FIG. 20) is placed over the glass substrate 11.1 as shown in FIG. 19B. Then, the substrate is exposed to light and developed with a developing solution (NMD-3: Tokyo Ohka Kogyo Co., Ltd.) (2.38%). Thus, as shown in FIG. 19C, minute circular portions 112b are formed on the glass substrate 111.

Figure 19D:
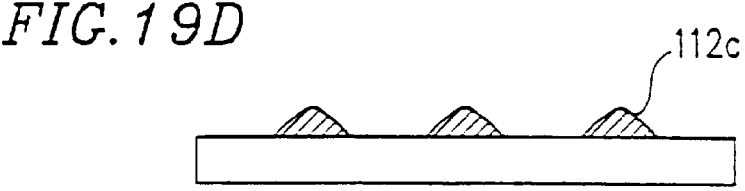

Then, the substrate including the minute circular portions 112b is subjected to a heat treatment at, preferably, about 120 to 250° C. In the Comparative Example, the substrate is subjected to a heat treatment at about 180° C for 30 minutes. As a result, as shown in FIG. 19D, surfaces of the circular portions 112b become smooth and rounded, thereby forming convex portions 112c having smooth surfaces. The substrate is then cured.

Figure 19E:
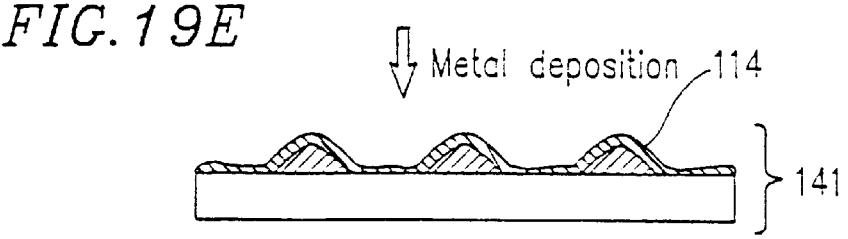

Next, as shown in FIG. 19E, a thin metal film 114 is formed on the entire surface of the reflector 141. As the thin metal film 114, Al, Ni, Cr, Ag or the like can be used.

Preferably the thin metal film 114 is formed to be about 0.01 to 1.0 μm thick. In the Comparative Example, the thin metal film 114 is formed by vacuum evaporation of Al. The reflector 141 of Comparative Example is thus obtained.

Figure 21:
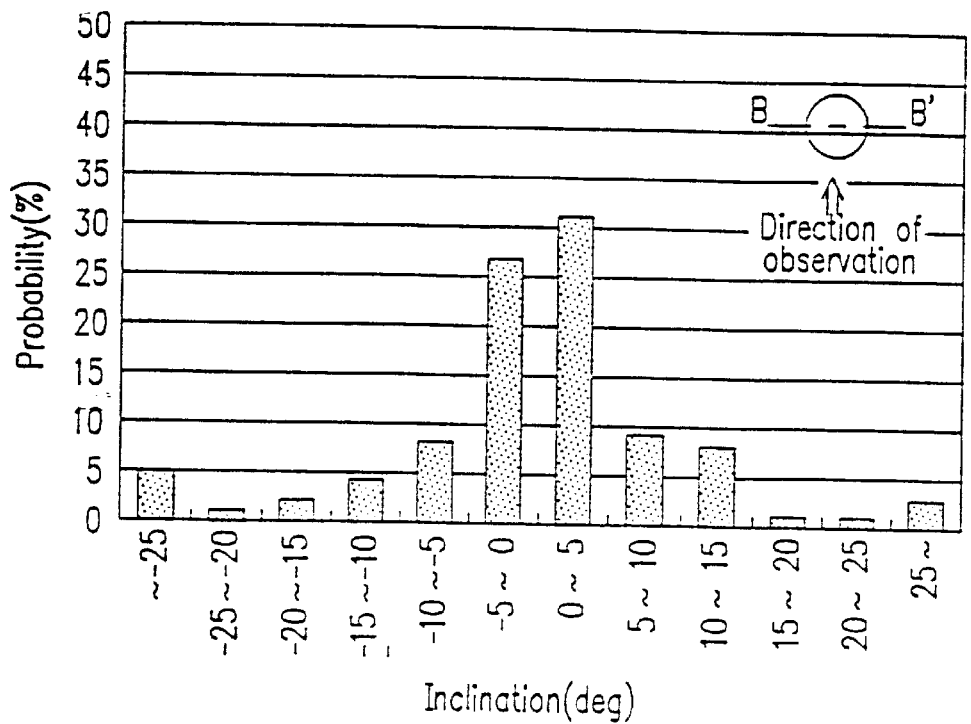
FIG. 21 is a graph showing the inclination distribution of the reflector according to the Comparative Example.
Figure 22:
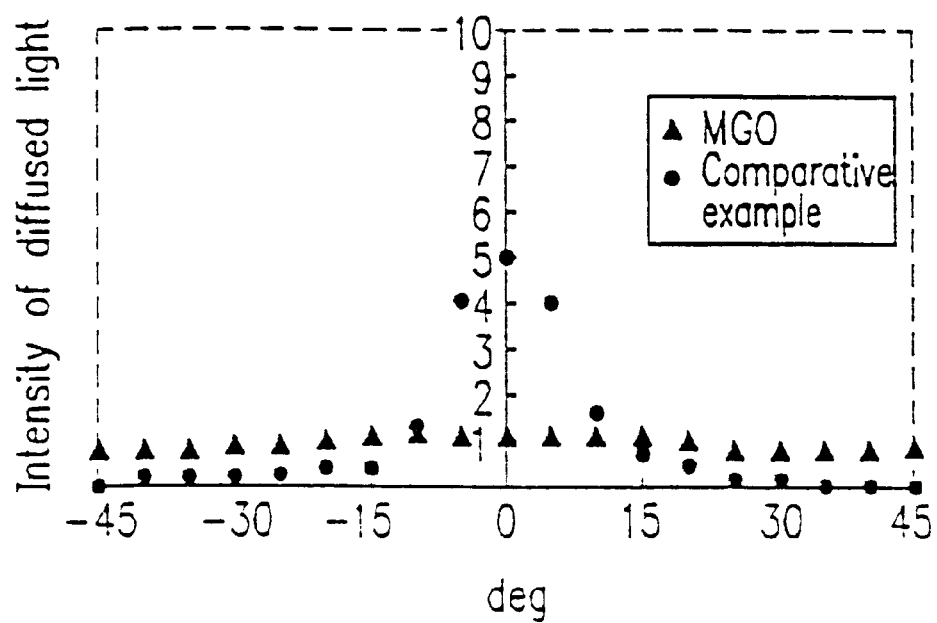
FIG. 22 is a graph showing the reflection characteristic of the reflector according to the Comparative Example.

FIG. 21 shows the inclination distribution of the surface of the reflector 141 according to the Comparative Example; and FIG. 22 shows the reflection characteristic of the reflector 141, as a result of the measurement of Example 1 shown in FIG. 4. As can be seen from FIG. 21, the inclination distribution is substantially symmetric about the 0° inclination point.

As can be seen from FIGS. 21 and 22, the reflector 141 of the Comparative Examples exhibits a high reflected light intensity only in a narrow viewing angle of about −10 to +10°, where a very bright display may be viewed. However, such a viewing angle substantially corresponds to the direction of regular reflection in which light from undesirable images (e.g., of objects within the panel environment) reflects at the panel surface. Display is therefore very unlikely to be viewed from this direction in practical use. Moreover, only a dark display can be viewed from directions other than the viewing angle of about −10 to +10°. Consequently, a liquid crystal display device using such a reflector 141 can only display dark images.

EXAMPLE 5

Hereinafter, a reflector 215 according to Example 5 of the present invention, a method for fabricating such a reflector and the reflection characteristic of such a reflector will be described.

The fabrication processes of the reflector 215 will now be described with reference to FIGS. 24A to 24E.

Figure 24A:
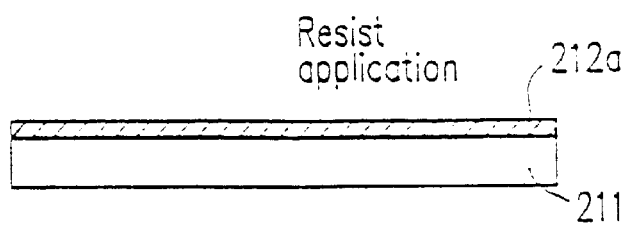
FIGS. 24A to 24E are cross-sectional views illustrating a fabrication process of a reflector according to Example 5.
Figure 24B:
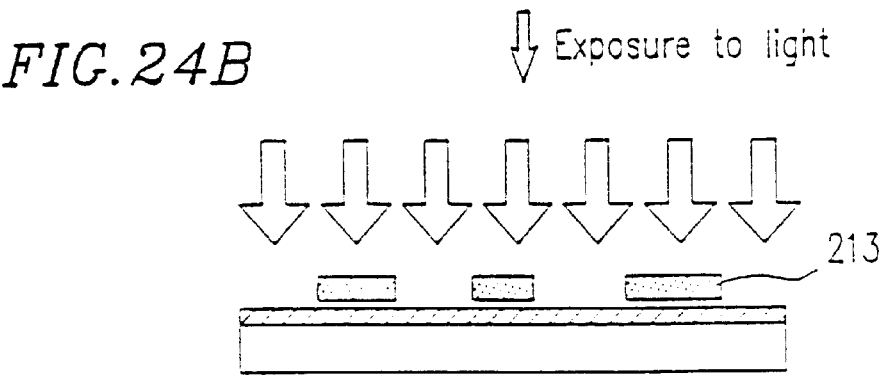

First, as shown in FIG. 24A, a resist material (e.g., "OFPR-800": Tokyo Ohka Kogyo Co., Ltd.) is spin-coated on one surface of a 1.1 mm-thick glass substrate (e.g., "7059": Corning Inc.) 211 at, preferably, about 500 to 3000 rpm. In the present example, the resist material is applied onto the surface for about 30 seconds while spinning the glass substrate 211 at about 1000 rpm, thereby forming about a 1.2 μm-thick resist film 212a on the glass substrate 211.

Figure 24C:
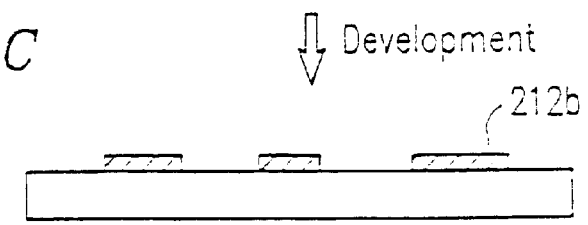
Figure 27A:
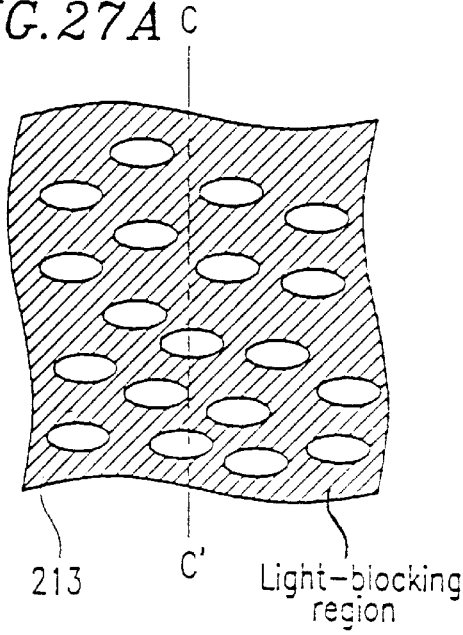
FIG. 27A is a plan view schematically showing a photomask used in Example 5.

The substrate is pre-baked for about 30 minutes at about 100° C. Then, a photomask 213 is placed over the glass substrate 211, which is then exposed to light (see FIG. 24B). A photomask having such a pattern as shown in FIG. 27A (where the hatched region represents the light-blocking region) can be used. The substrate is then developed with a developing solution (NMD-3: Tokyo Ohka Kogyo Co., Ltd.) (2.38%), thereby forming minute concave/convex (convex in Example 5) portions 212b on the substrate 211 as shown in FIG. 24C.

Figure 27B:
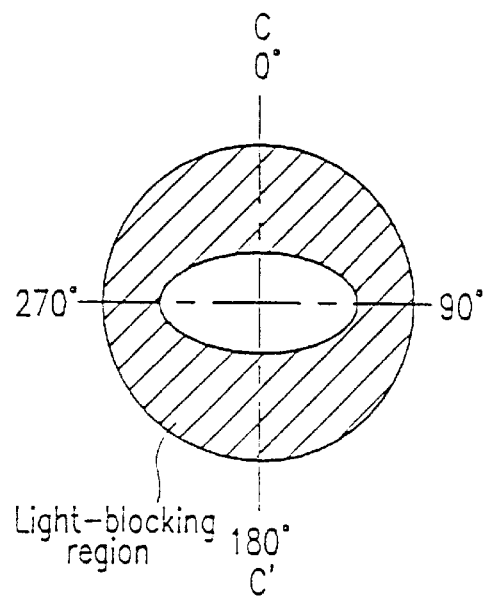
FIG. 27B is an enlarged view of the photomask.

As shown in FIG. 27A, the photomask 213 includes a plurality of minute elliptic light-transmitting regions each corresponding to the concave portion 212b on the substrate 211. Each of the minute elliptic light-transmitting regions has an asymmetric shape with respect to an arbitrary axis as shown in FIG. 27B. In other words, there exists an asymmetric axis in each elliptic region. Moreover, the elliptic regions are randomly disposed in the photomask 213 with all the asymmetric axes being parallel to one another.

Figure 24D:
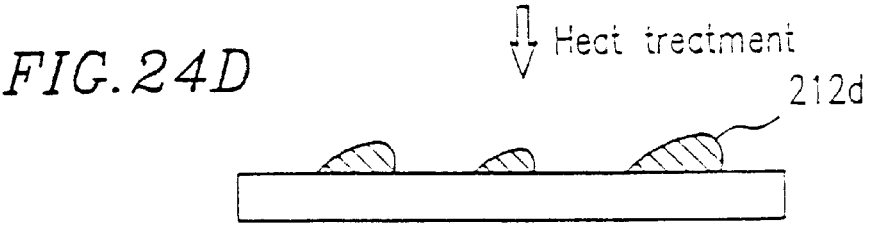

Then, the glass substrate 211 including the minute elliptic portions 212b is subjected to a heat treatment at, preferably, about 120 to 250° C. In Example 5, the substrate is subjected to a heat treatment at about 180° C for 30 minutes. As a result, as shown in FIG. 24D, surfaces of the elliptic portions 212b become smooth and rounded, thereby forming concave portions 212c having smooth surfaces. The substrate is then cured.

Figure 24E:
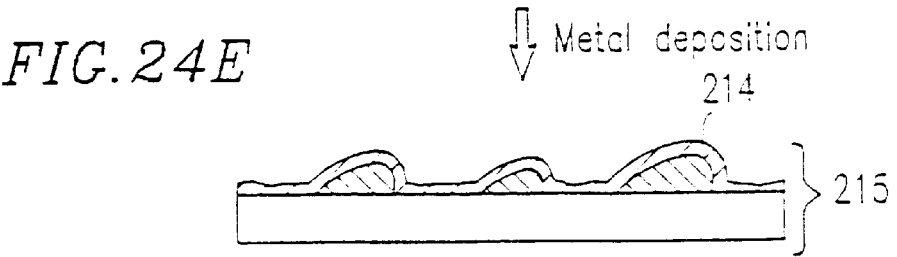

Next, as shown in FIG. 24E, a thin metal film 214 is formed on the entire surface of the substrate 211. As the thin metal film 214, Al, Ni, Cr, Ag or the like can be used. Preferably, the thin metal film 214 is formed to be about 0.01 to 1.0 μm thick. In Example 5, the thin metal film 214 is formed by vacuum evaporation of Al and the reflector 215 is thus obtained.

Figure 25:
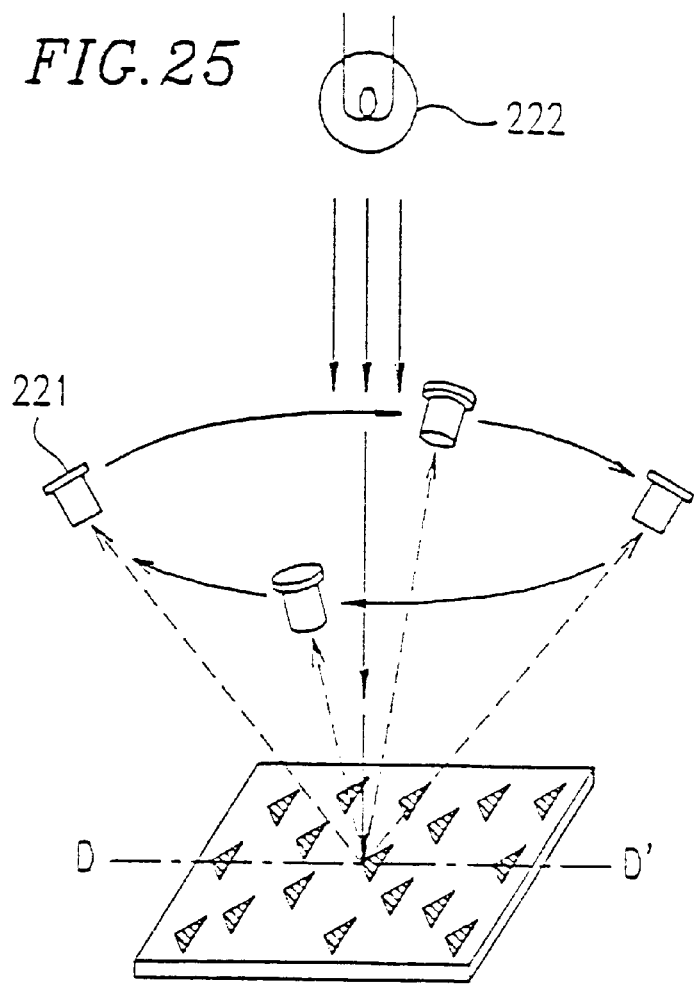
FIG. 25 is an isometric view schematically showing the measurement of a reflection characteristic of a liquid crystal display cell including a reflector of the present invention.

FIG. 25 is a schematic diagram showing how the reflection characteristic of the reflector 215 is measured. It is assumed herein that the reflector 215 is incorporated in a liquid crystal display device.

Figure 26:
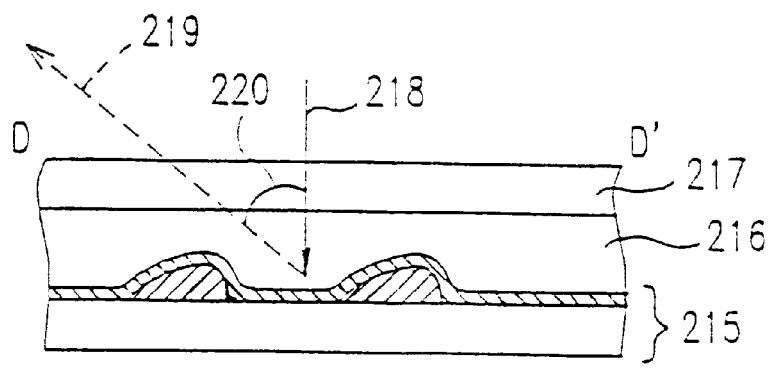
FIG. 26 is a cross-sectional view showing a configuration of the liquid crystal display cell used in the measurement of FIG. 25.

It is contemplated that this liquid crystal display device incorporating the reflector 215 includes the reflector 215 as a lower substrate, an upper glass substrate 217 and a liquid crystal layer interposed therebetween, the reflection layer of the reflector 215 being in contact with the liquid crystal layer. The refractive indices of the liquid crystal layer and the glass substrate 217 are both about 1.5. For measurement purposes, a UV-curable adhesive 216 having substantially the same refractive index of about 1.5 is substitutionally used in place of the liquid crystal layer. The reflector 215 thus adheres to the upper glass substrate 217 with the adhesive 216, thereby forming a cell, as shown in FIG. 26.

As shown in FIG. 25, light from a light source 222 is made to be incident upon the cell in the normal to the substrate 217. As shown in great detail in FIG. 26 (a cross-sectional view of the cell taken along the line D-D' of FIG. 25), light 218 which is incident upon the reflector 215 is reflected by the reflector 215 by an angle 220. The photomultimeter 221 is located so as to receive the reflected light 219 coming out from the cell at the angle 220, thereby measuring the intensity of the reflected light 219. As shown in FIG. 25, the photomultimeter 221 is rotated around a point at which the light 218 is incident upon the reflector 215, with the reflection angle 220 of the reflected light 219 to be received by the photomultimeter 221 being kept constant. During the measurement, the cell is fixed, with the intensity of the light from the light source 222 and the inclination of the photomultimeter 221 with respect to the normal to the substrate (i.e., the angle 220) being held constant. Herein, the measurement is performed with the angle 220 being about 50° from the normal to the substrate.

Figure 28:
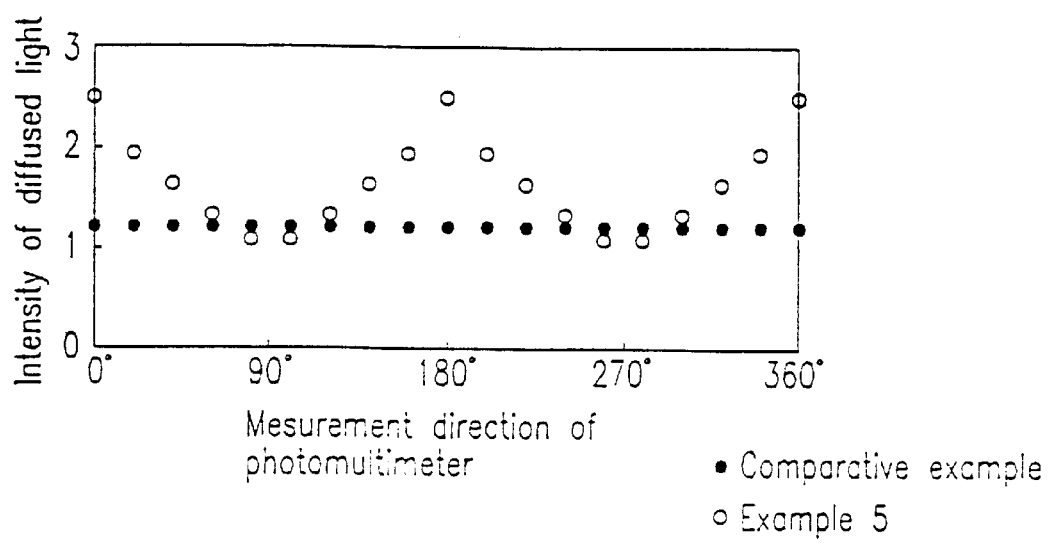
FIG. 28 is a graph showing the reflection characteristic of a reflector according to Example 5.

FIG. 28 shows the reflection characteristic of the reflector 215 of Example 5 as a result of the measurement above. The x-axis in FIG. 28 represents the measurement direction at which the photomultimeter 221 measures the intensity of the reflected light 219. Degrees (0° to 360°) representing the measurement direction in FIG. 28 correspond to the degrees (0° to 360°) in FIG. 27B, which is an enlarged view of FIG. 27A. The y-axis represents the intensity of the reflected light 219. In FIG. 28, the intensity of the reflected light is normalized with the intensity of the reflected light of the standard white plate of MgO (magnesium oxide) being 1. In FIG. 28, the white dots represent the reflection characteristic of the reflector 215 of Example 5, whereas the black dots represent the reflection characteristic of the reflector 141 of the Comparative Example. Each convex portion of the reflector 141 of the Comparative Example has a circular shape as viewed from above.

As can be seen from FIG. 28, the reflector 141 of the Comparative Example exhibits substantially the same reflected light intensity at any direction. On the other hand, the reflector 215 of Example 5 exhibits two light intensity peaks at directions of about 0° and about 180°, where a highly-bright display can be viewed. There are also two lower light intensity values at about 90° and about 270°, where only a dark display can be viewed.

EXAMPLES 6 TO 16

In each of Examples 6 to 16, a reflector is fabricated through the fabrication process shown in FIGS. 24A to 24E as in Example 5. The reflection characteristic of each resultant reflector is measured by the measurement shown in FIG. 25.

Figure 29A:
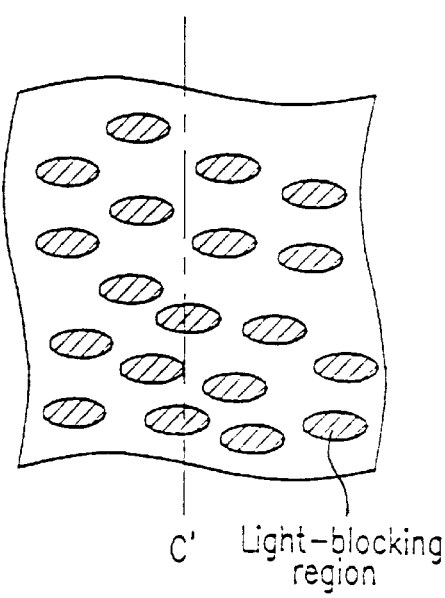
FIG. 29A is a plan view schematically showing a photomask used in Example 6.
Figure 29B:
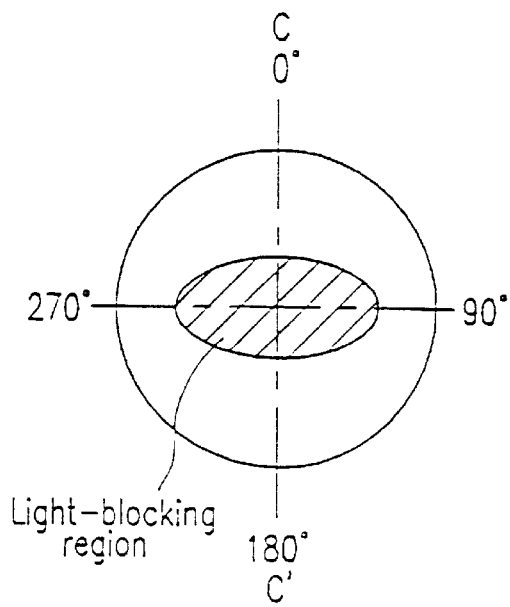
FIG. 29B is an enlarged view of the photomask.
Figure 30:
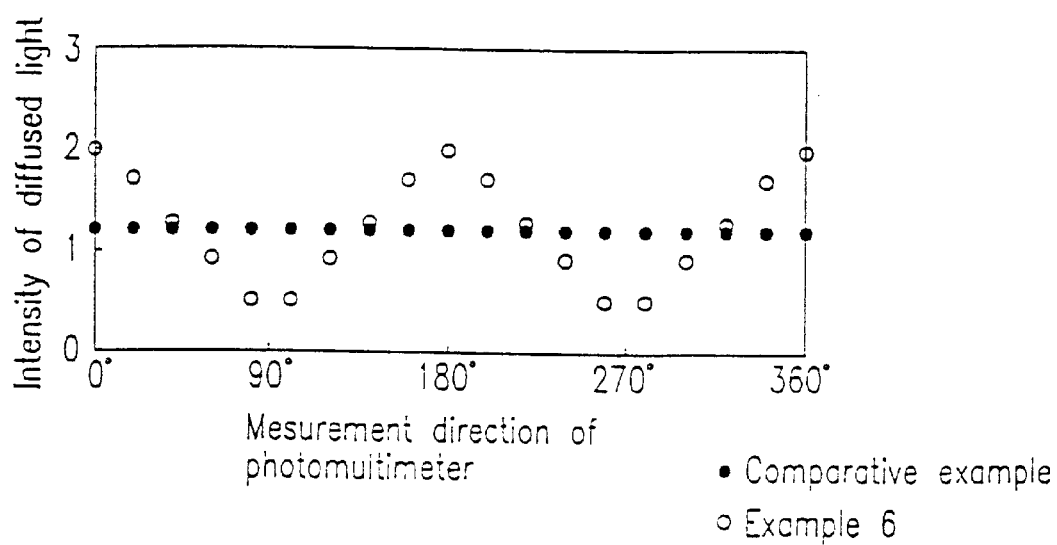
FIG. 30 is a graph showing the reflection characteristic of a reflector according to Example 6.
Figure 31A:
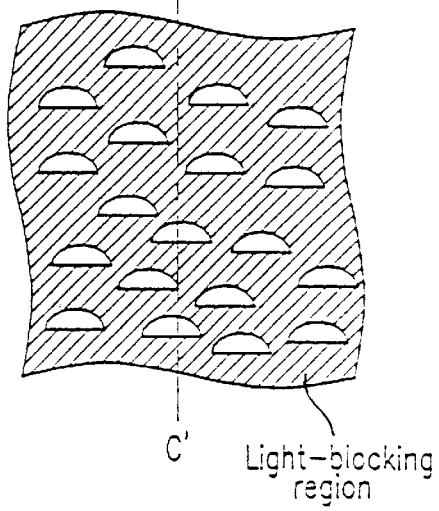
FIG. 31A is a plan view schematically showing a photomask used in Example 7.
Figure 31B:
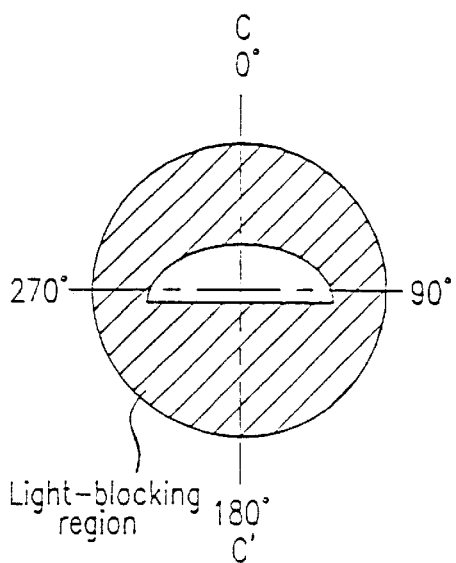
FIG. 31B is an enlarged view of the photomask.
Figure 32:
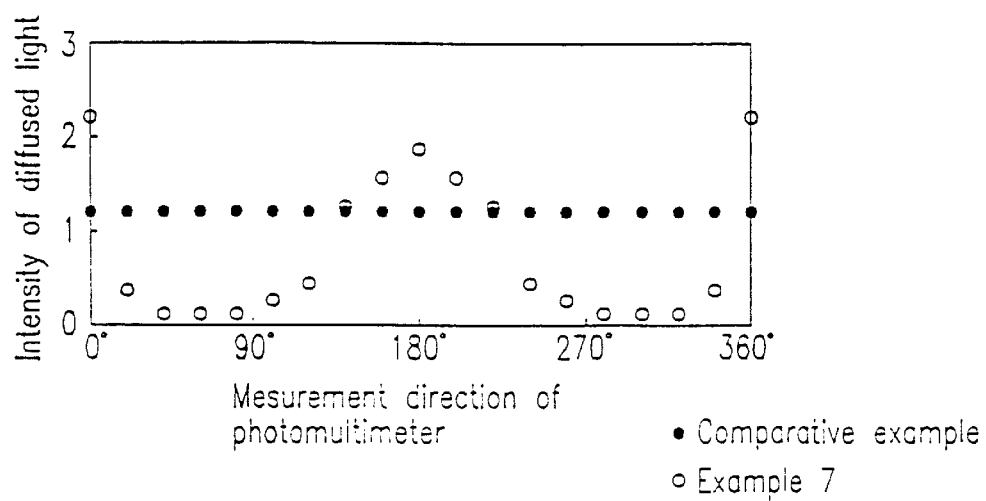
FIG. 32 is a graph showing the reflection characteristic of a reflector according to Example 7.
Figure 33A:
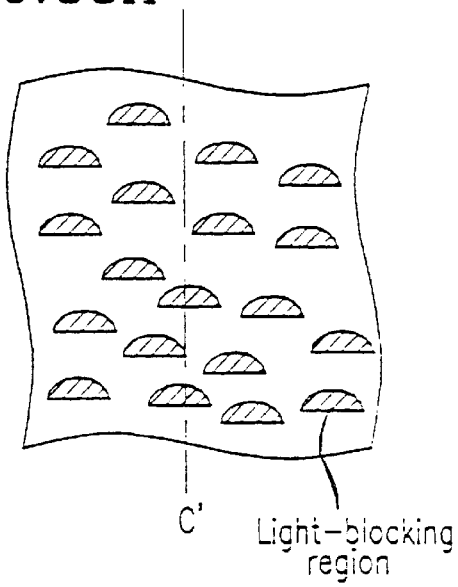
FIG. 33A is a plan view schematically showing a photomask used in Example 8.
Figure 33B:
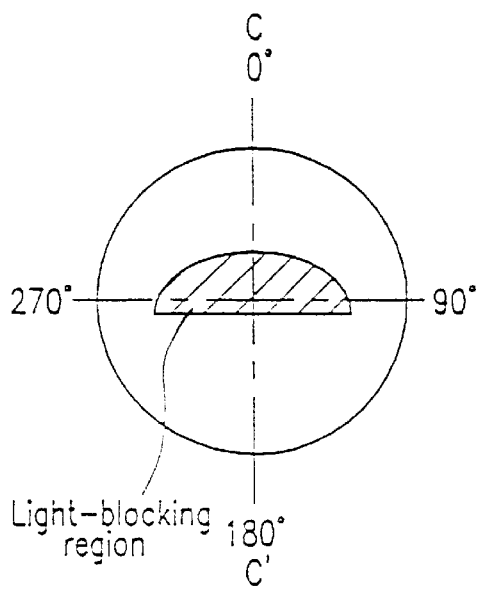
FIG. 33B is an enlarged view of the photomask.
Figure 34:
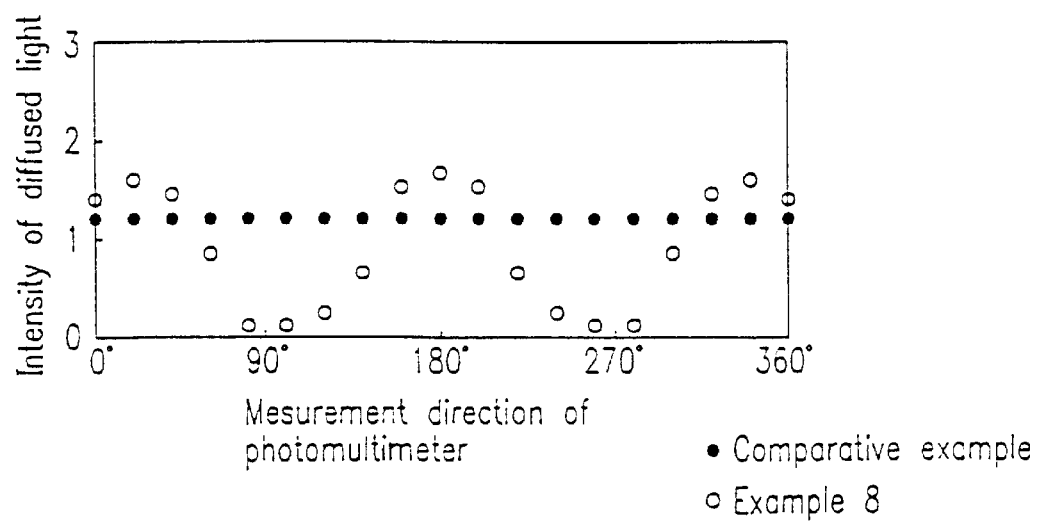
FIG. 34 is a graph showing the reflection characteristic of a reflector according to Example 8.
Figure 35A:
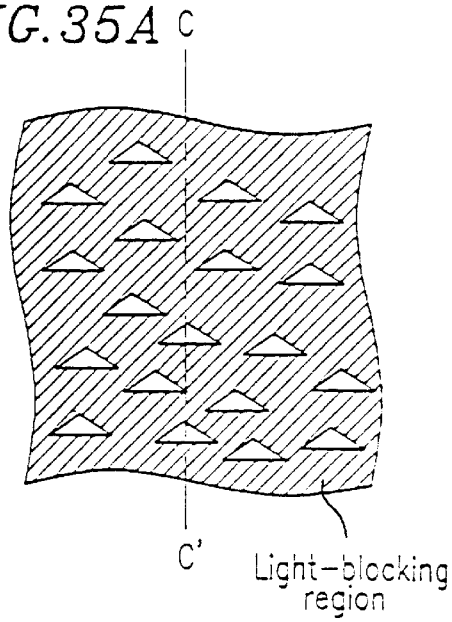
FIG. 35A is a plan view schematically showing a photomask used in Example 9.
Figure 35B:
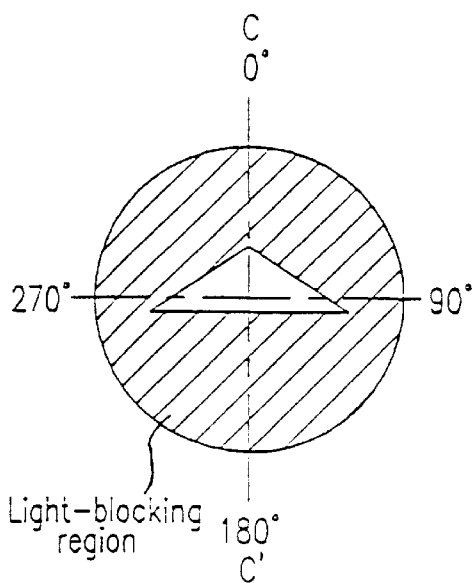
FIG. 35B is an enlarged view of the photomask.
Figure 36:
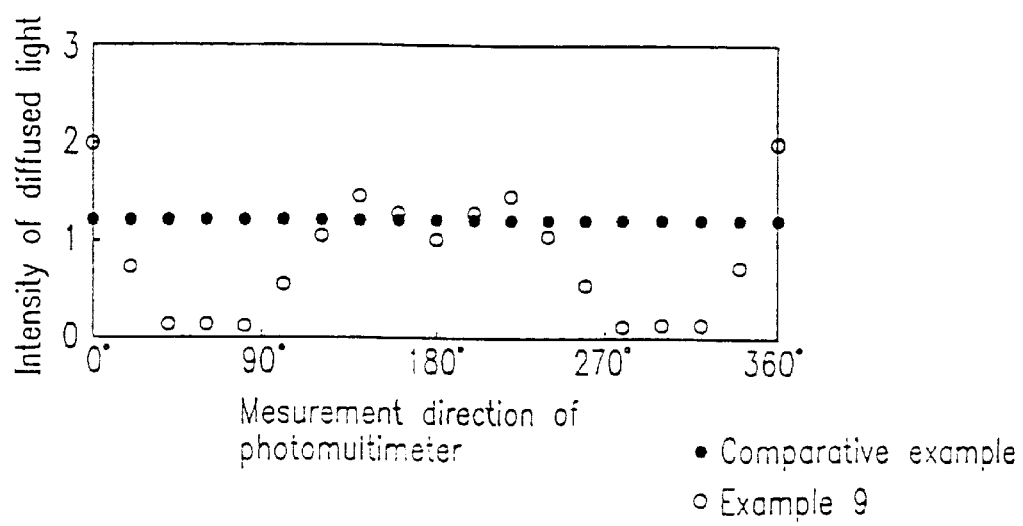
FIG. 36 is a graph showing the reflection characteristic of a reflector according to Example 9.
Figure 37A:
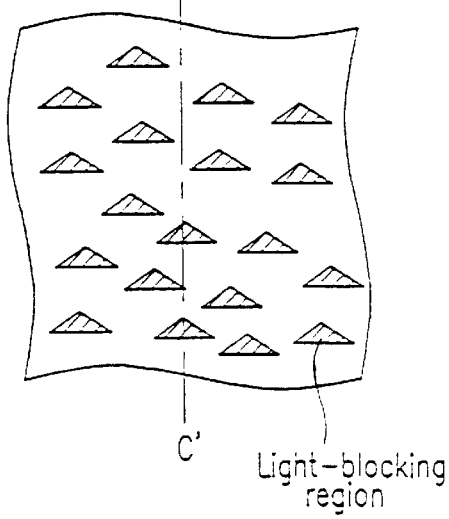
FIG. 37A is a plan view schematically showing a photomask used in Example 10.
Figure 37B:
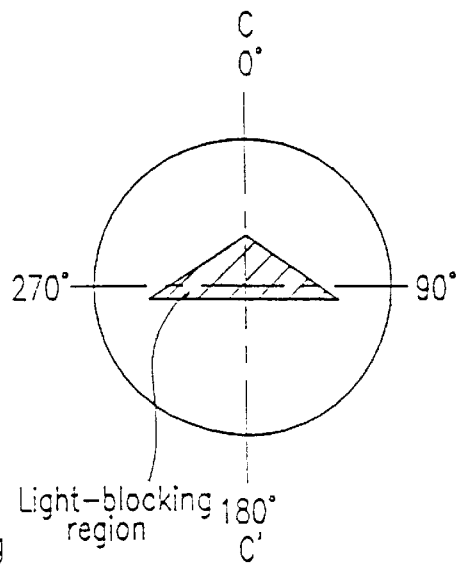
FIG. 37B is an enlarged view of the photomask.
Figure 38:
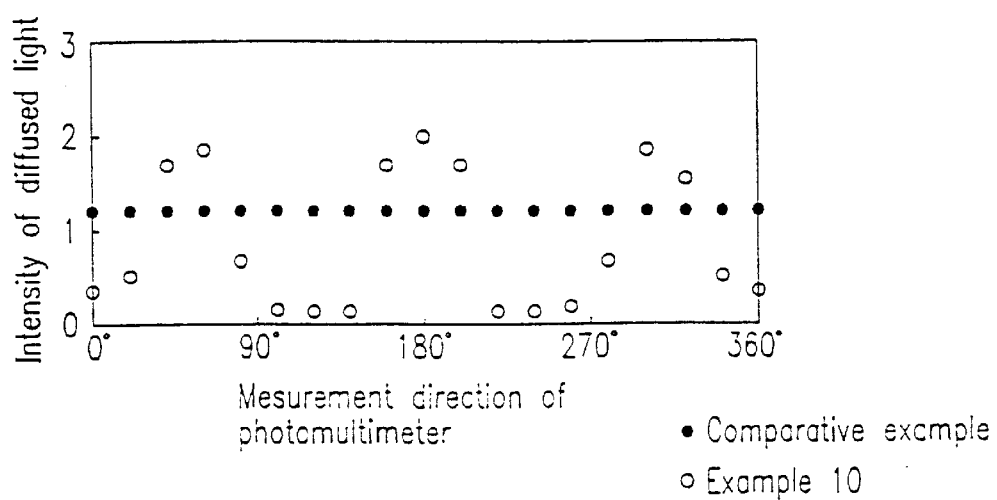
FIG. 38 is a graph showing the reflection characteristic of a reflector according to Example 10.
Figure 39A:
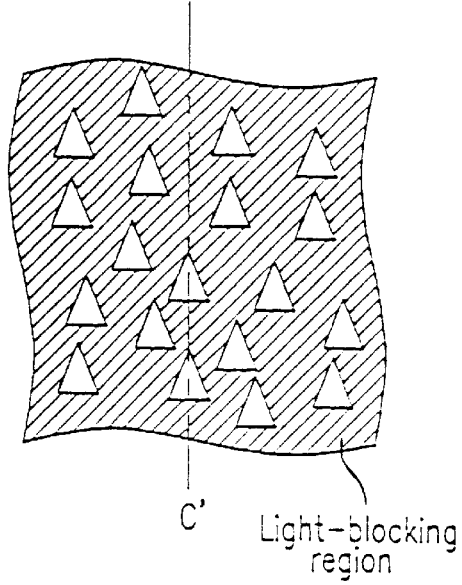
FIG. 39A is a plan view schematically showing a photomask used in Example 11.
Figure 39B:
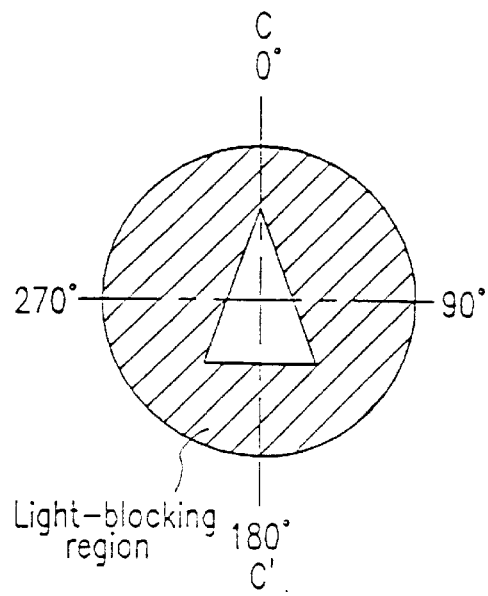
FIG. 39B is an enlarged view of the photomask.
Figure 40:
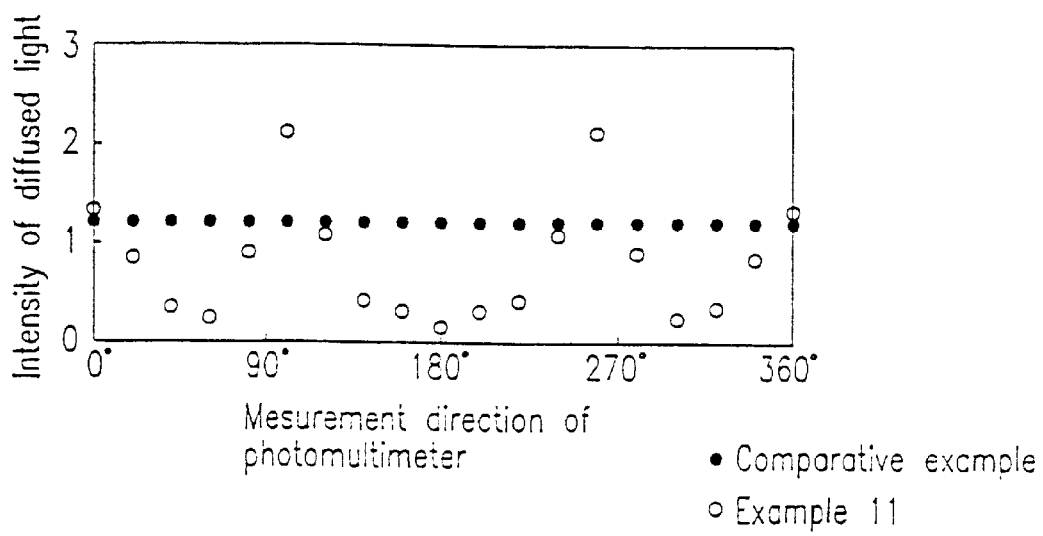
FIG. 40 is a graph showing the reflection characteristic of a reflector according to Example 11.
Figure 41A:
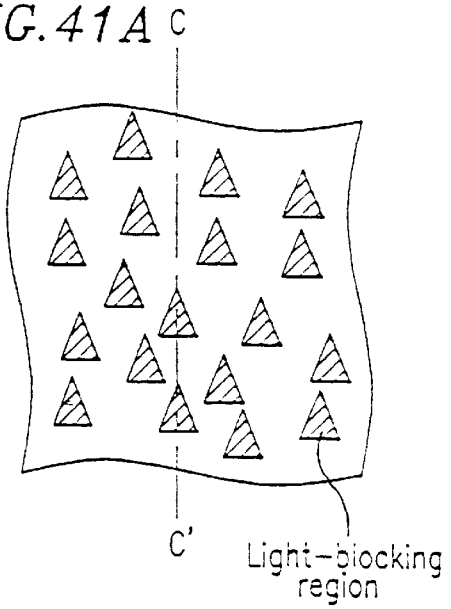
FIG. 41A is a plan view schematically showing a photomask used in Example 12.
Figure 41B:
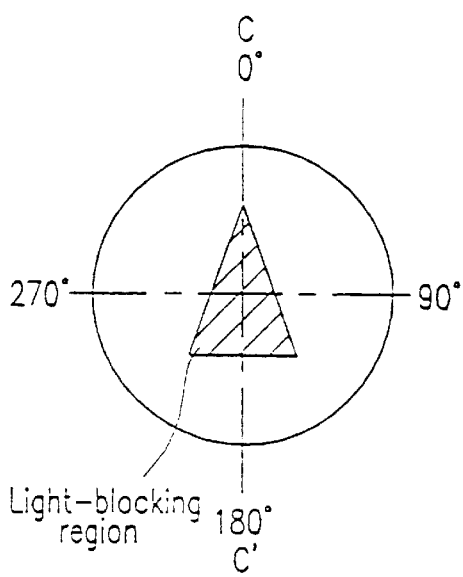
FIG. 41B is an enlarged view of the photomask.
Figure 42:
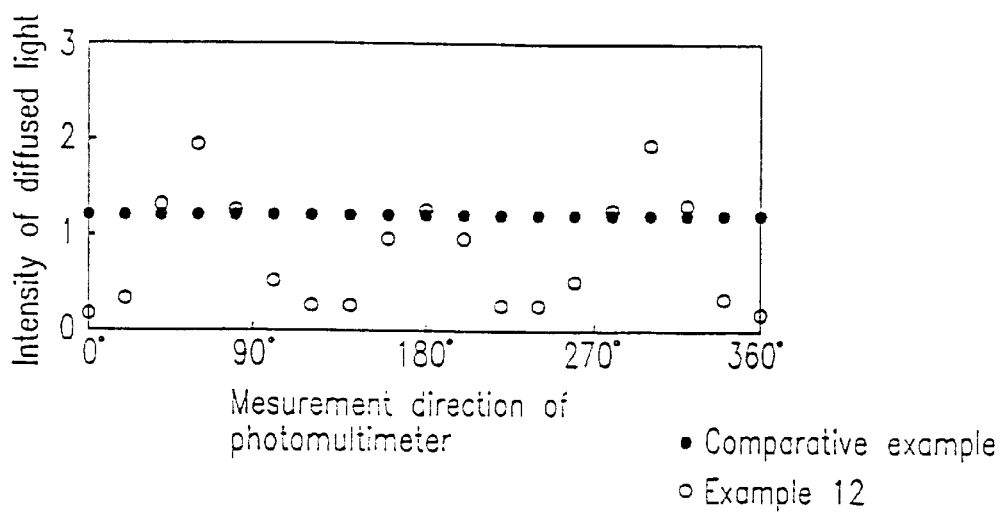
FIG. 42 is a graph showing the reflection characteristic of a reflector according to Example 12.
Figure 43A:
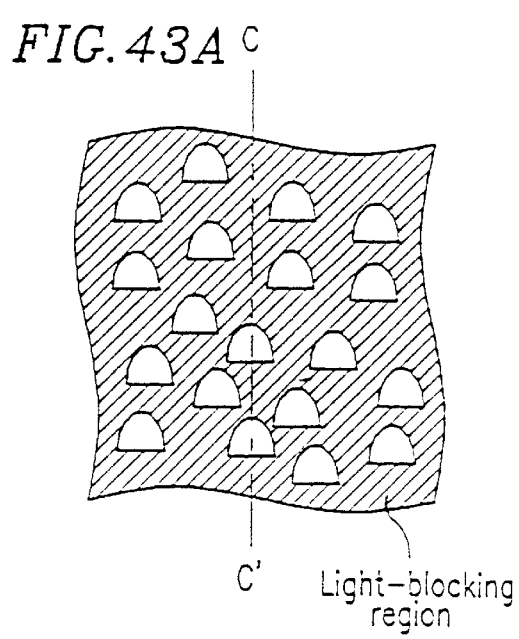
FIG. 43A is a plan view schematically showing a photomask used in Example 13.
Figure 43B:
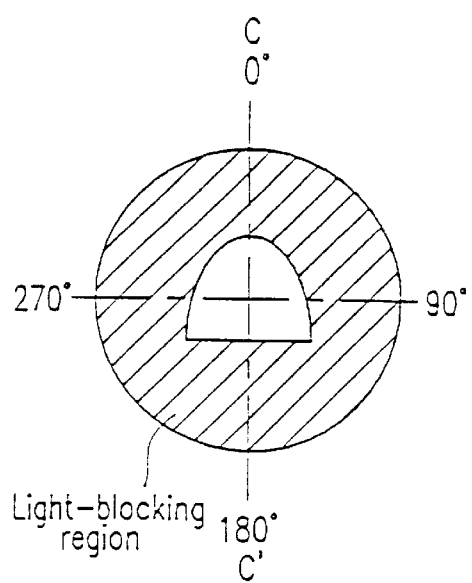
FIG. 43B is an enlarged view of the photomask.
Figure 44:
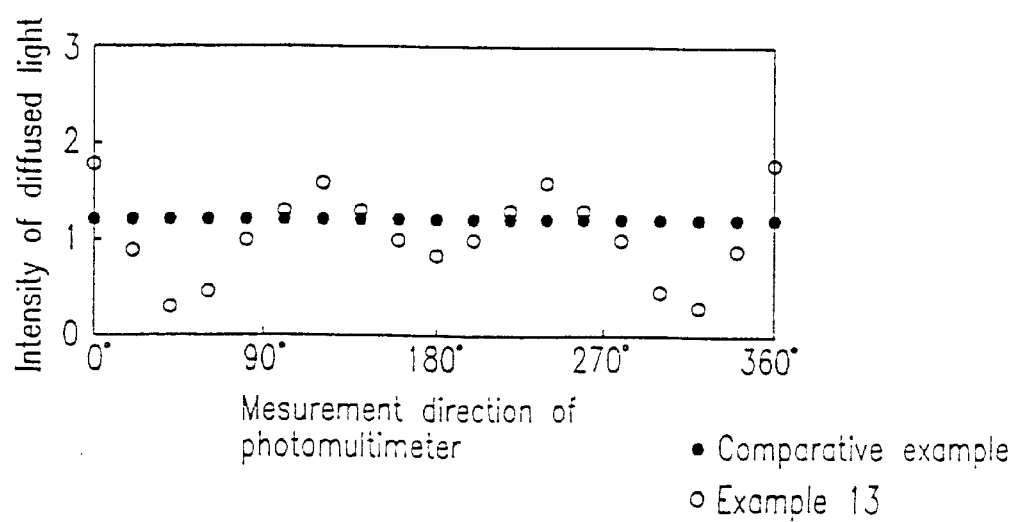
FIG. 44 is a graph showing the reflection characteristic of a reflector according to Example 13.
Figure 49A:
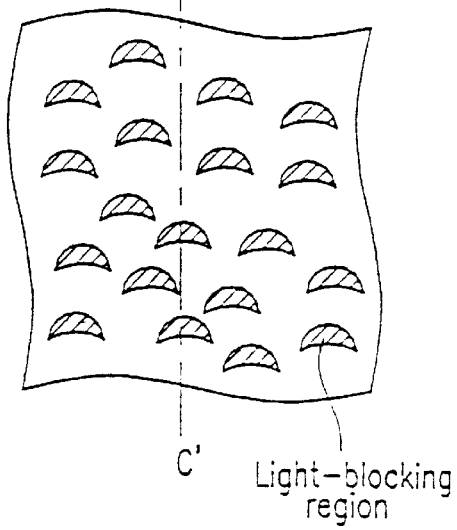
FIG. 49A is a plan view schematically showing a photomask used in Example 16.
Figure 49B:
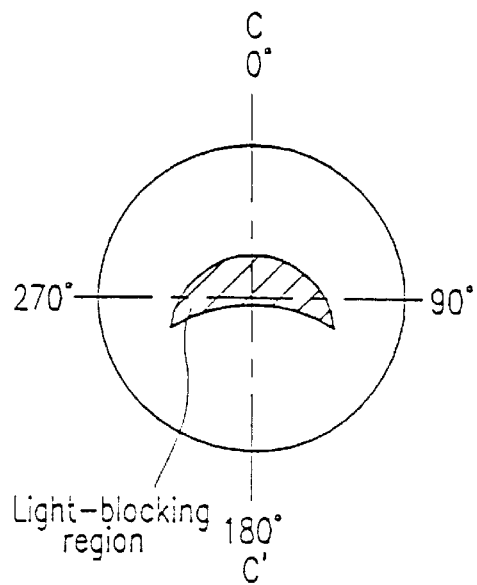
FIG. 49B is an enlarged view of the photomask.
Figure 50:
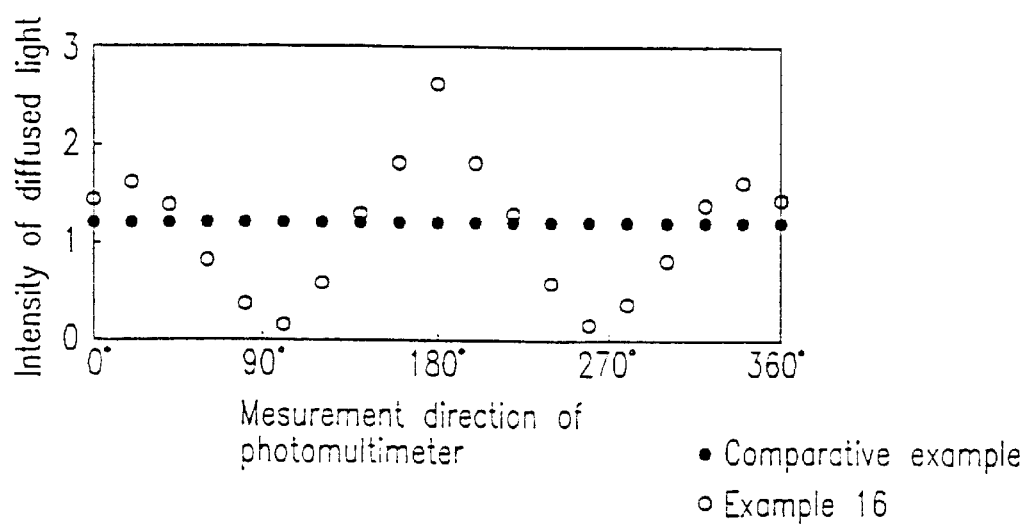
FIG. 50 is a graph showing the reflection characteristic of a reflector according to Example 16.

FIGS. 29A and 29B show a photomask used in Example 6; and FIG. 30 shows the reflection characteristic of a reflector according to Example 6. FIG. 31A and 31B show a photomask used in Example 7; and FIG. 32 shows the reflection characteristic of a reflector according to Example 7. FIGS. 33A and 33B show a photomask used in Example 8; and FIG. 34 shows the reflection characteristic of a reflector according to Example 8. FIGS. 35A and 35B show a photomask used in Example 9; and FIG. 36 shows the reflection characteristic of a reflector according to Example 9. FIGS. 37A and 37B show a photomask used in Example 10; and FIG. 38 shows the reflection characteristic of a reflector according to Example 10. FIGS. 39A and 39B show a photomask used in Example 11; and FIG. 40 shows the reflection characteristic of a reflector according to Example 11. FIGS. 41A and 41B show a photomask used in Example 12; and FIG. 42 shows the reflection characteristic of a reflector according to Example 12. FIG. 43A and 43B show a photomask used in Example 13; and FIG. 44 shows the reflection characteristic of a reflector according to Example 13. FIGS. 45A and 45B show a photomask used in Example 14; and FIG. 46 shows the reflection characteristic of a reflector according to Example 14. FIGS. 47A and 47B show e photomask used in Example 15; and FIG. 48 shows the reflection characteristic of a reflector. according to Example 15. FIG. 49A and 49B show a photomask used in Example 16; and FIG. 50 shows the reflection characteristic of a reflector according to Example 16.

As can be seen from the figures listed above, each of the reflectors according to Examples 6 to 16 exhibits intensity peaks of reflected light at particular directions, where a highly-bright display can be viewed, and also lower peaks of reflected light at other directions, where only a dark display can be viewed.

The reflectors according to Examples 6 to 16 exhibit various reflection characteristics. Such reflectors make it possible to direct the reflected light to a particular direction depending on the shape of concave/convex portions, thereby intensifying reflected light in a particular direction. It is thus possible to realize a very bright display in a particular direction.

EXAMPLE 17

Figure 51A:
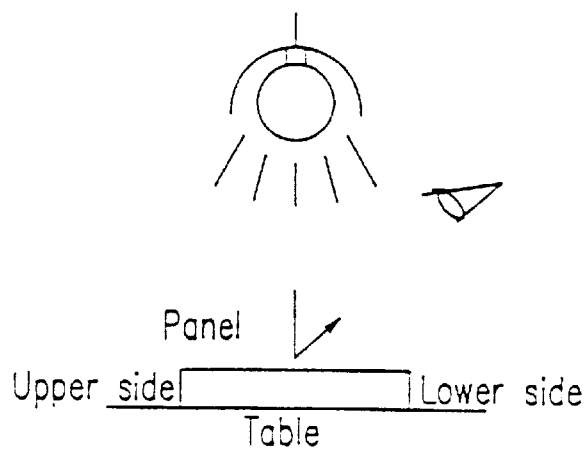
FIGS. 51A and 51B are schematic diagrams showing a liquid crystal display panel according to Example 17 using a reflector of the present invention.
Figure 51B:
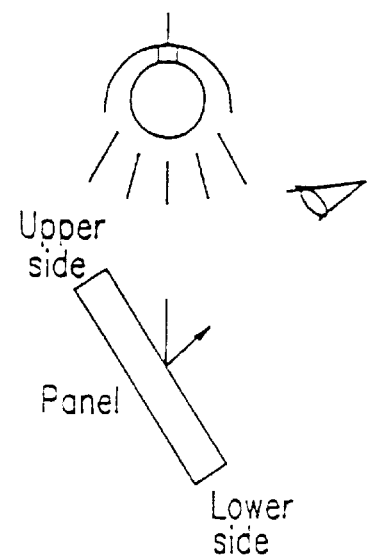

FIGS. 51A and 51B are schematic diagrams for illustrating a reflective liquid crystal display device of Example 17 using a reflector of the present invention.

In many cases, a reflective liquid crystal display panel or the like as a portable communication apparatus is used in such an arrangement as shown in FIGS. 51A or 51B. FIG. 51A illustrates the case where the display panel is placed on a desk or the like when used. As shown in FIG. 51A, assuming that light is incident upon the display panel in a direction perpendicular to the desk surface on which the display panel is placed (i.e., a direction perpendicular to the display panel), a user views the reflected light at a viewing angle which is inclined from a direction normal to the panel toward the lower side of the display panel. On the other hand, FIG. 51B illustrates the case where the display panel is held in the user's hand when used. As shown in FIG. 51B, assuming that light is incident upon the display panel in a direction normal to the desk surface on which the display panel is placed, the user views the reflected light in a viewing angle which is inclined from a direction normal to the panel toward the upper side of the display panel.

Figure 52:
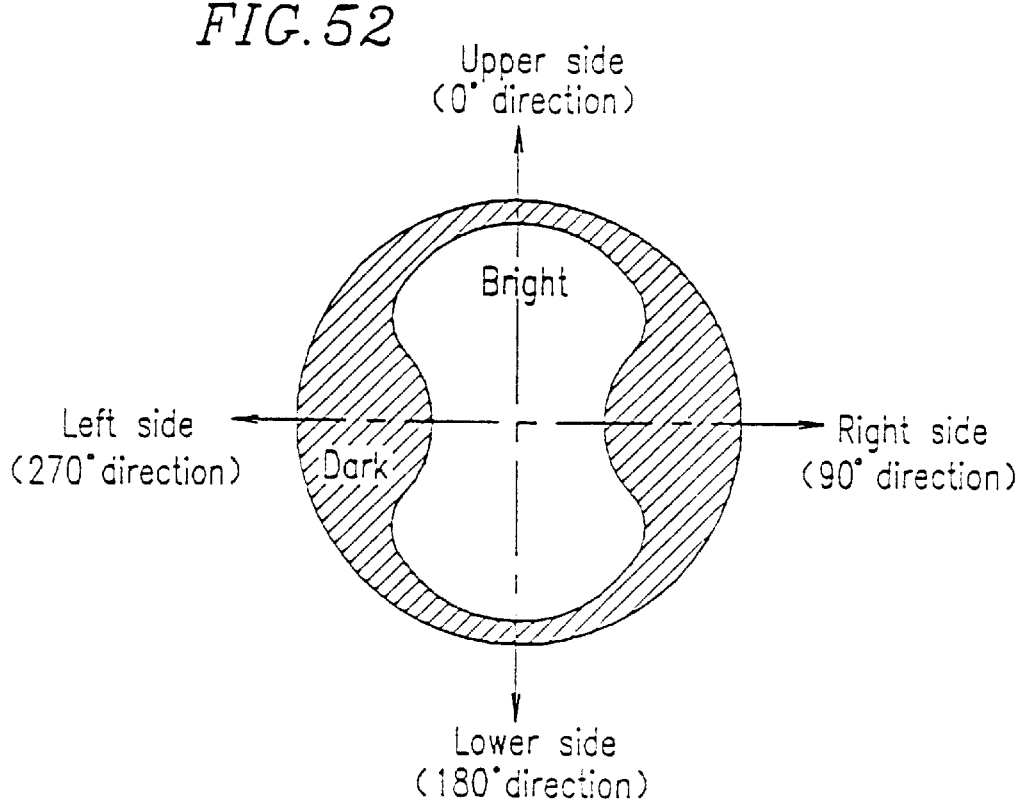

Therefore, the reflective liquid crystal display panel as a display portion of a portable communication apparatus is required to provide such a reflection characteristic as shown in FIG. 52, where there are relatively bright regions toward the upper and the lower sides of the display panel. It is not a critical problem to have relatively dark regions toward the left and the right sides of the display panel.

For example, the photomask 213 of Example 5 can be used to form concave portions on a substrate of a reflector which suitably provides such a reflection characteristic as shown in FIG. 52. As shown in FIG. 28, the reflector of Example 5 provides relatively bright regions in the directions of about 0 and 180°, i.e., toward the upper and the lower sides of the display panel, and provides relatively dark regions in directions of about 90 and 270°, i.e., toward the left and the right sides of the display panel. Thus, the requirement for display panels used as a display portion of a portable communication apparatus or the like can be satisfied.

EXAMPLE 18

Figure 53:
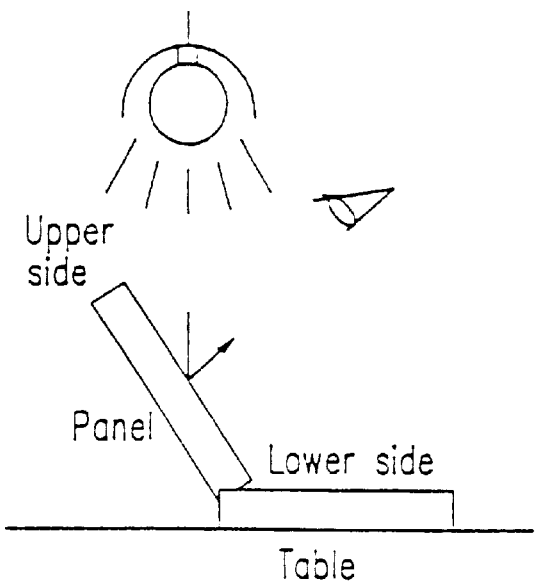
FIG. 53 is a schematic diagram showing a liquid crystal display panel according to Example 18 using a reflector of the present invention.

FIG. 53 is a schematic diagram for illustrating a reflective liquid crystal display device of Example 18 using a reflector of the present invention.

In many cases, a liquid crystal display panel or the like in a lap-top computer or a palm-top (hand-held) computer is placed on a desk or the like when used as shown in FIG. 53.

As shown in FIG. 53, assuming that light is incident upon the display panel in a direction normal to the surface of the desk, the user views reflected light distributed exclusively in a direction inclined from a direction normal to the panel toward the upper side of the display panel.

Figure 54:
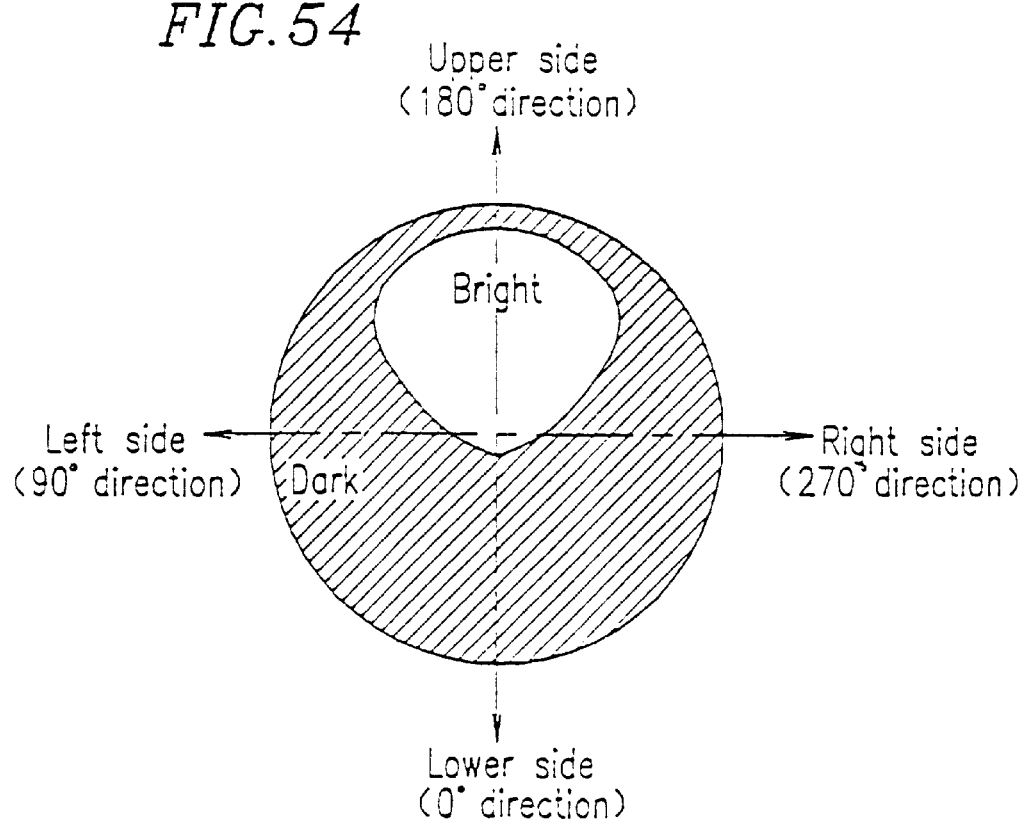

Therefore, the liquid crystal display panel is required to provide such a reflection characteristic as shown in FIG. 54, where there is a relatively bright region only toward the upper side of the display panel.

For example, the photomask of Example 7 or 15 (shown in FIGS. 31A, 31B, 47A and 47B, respectively) can be used to make concave portions on a reflector which suitably provides such a reflection characteristic as shown in FIG. 54. As shown in FIGS. 32 and 48, the reflector of Example 7 or 15 provides a relatively bright region only in a direction of about 180°, i.e., toward the upper side of the display panel. Thus, the requirement for display panels used in a lap-top computer, a palm-top computer or the like can be satisfied.

EXAMPLE 19

Figure 55A:
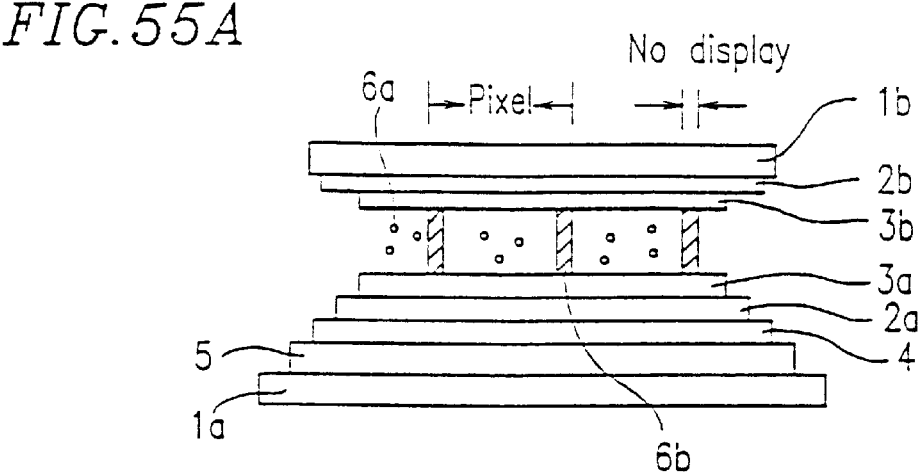
FIG. 55A is a cross-sectional view showing a configuration of a reflective liquid crystal display device according to Example 19.

Referring to FIGS. 55A to 57D, a reflective liquid crystal display device according to Example 19 will be described. FIG. 55A is a cross--sectional view schematically showing a configuration of the reflective liquid crystal display device according to Example 19. As shown in FIG. 55A, the reflective liquid crystal display device of Example 19 includes a pair of substrates 1a and 1b. A rigid transparent substrate of glass, plastic or the like is used as the substrates 1a a and 1b. A plurality of display electrodes 2b, which are strips of a transparent material such as ITO or SnO, are provided in parallel to each other on the upper substrate 1b. An alignment film 3b is provided on the display electrodes 2b. To form the alignment film 3b, polyimide, nylon or the like is spin-coated or printed and is then subjected to a rubbing treatment as required.

On the lower substrate 1a, a resist layer (not shown) is formed in a similar manner to that described in any one of the previous examples, so that a plurality of minute concave or convex portions each having an asymmetric inclination distribution are formed on the surface thereof. A thin metal film 5 is provided on the lower substrate 1a. The thin metal film 5 may be formed by coating a metal such as Al, Ni, Cr, Ag or the like over the entire surface of the resist layer. Thus, the thin metal film 5, the resist layer and the lower substrate 1a together form a reflector of the present invention. An insulating film 4 is provided on the reflector so as to be an insulator between the reflector and a plurality of display electrodes 2a which are formed on the insulating film 4. The display electrodes 2a, each of which is formed of a transparent material such as ITO and SnO to have a strip shape, are arranged in parallel, so that the display electrodes 2a cross the display electrodes 2b formed on the upper substrate 1b when the substrates 1a and 1b are attached to each other, as shown in FIG. 55C. The regions A where the display electrodes 2a and 2b overlap serve as pixel portions. An alignment film 3a is formed on the display electrodes 2a and is then subjected to a rubbing treatment as required. The same materials as the alignment film 3b are used for the alignment film 3a.

Figure 55B:
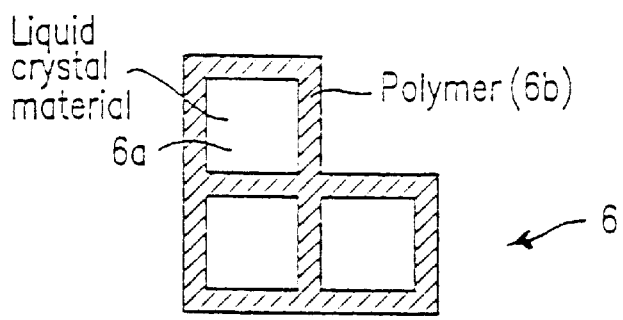
FIG. 55B is a plan view schematically showing a display medium used in the reflective liquid crystal display device shown in FIG. 55A.
Figure 55C:
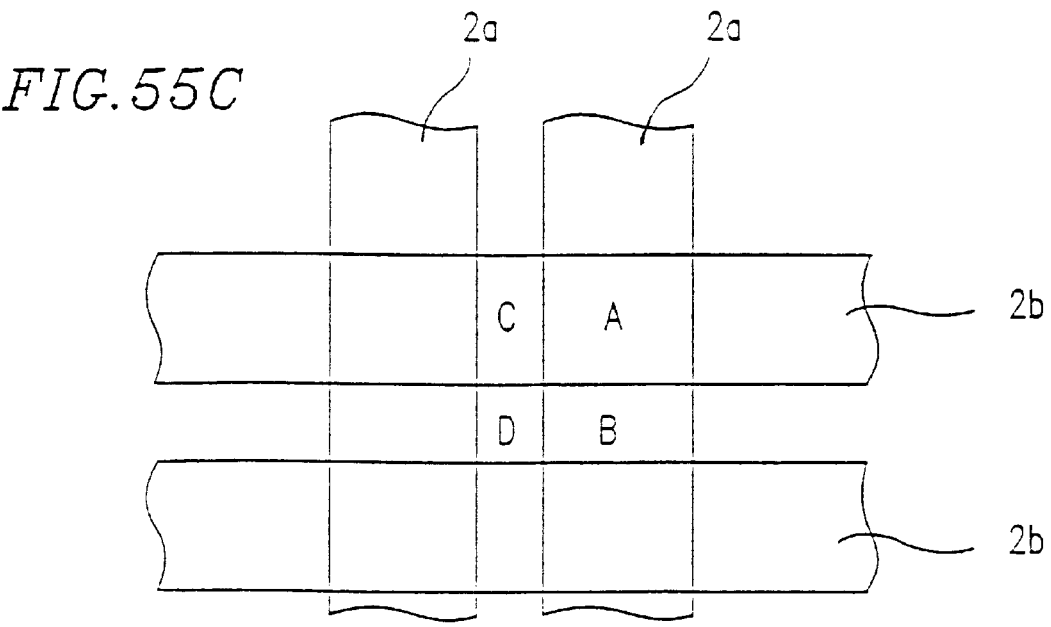
FIG. 55C is a plan view showing display electrodes which overlap each other.

FIG. 55B is a plan view schematically showing a layer of display medium 6 interposed between the substrates 1a and 1b. The display medium 6 includes a liquid crystal material 6a and polymer walls 6b. The reflective liquid crystal display of the present example provides a display by applying a voltage across the display electrodes 2a and 2b to change the orientations of liquid crystal molecules of the liquid crystal material 6a located in the pixel portions in accordance with the voltage. As the liquid crystal material 6a, a liquid crystal material of a suitable display mode such as a TN display mode, an STN display mode or the like can be used. The polymer walls 6b are wall-like rigid structures of polymer material for separating pixels and adhering the substrates 1a and 1b together. Other components such as a sealing member are not shown in FIGS. 55A and 55B.

The fabrication process of the display medium will now be described.

First, a mixture of the liquid crystal material 6a and a photo-polymerizable precursor is injected into a liquid crystal cell formed by arranging the substrate 1b and the reflector including the substrate 1a and the reflection film 5 so as to opposite each other. An acrylate-containing or methacrylate-containing monomer is used as the photo-polymerizable precursor in view of reactivity and solubility in a liquid crystal material. A bifunctional resin and a monofunctional resin are further added therein in an appropriate proportion so as to adjust the polymerization rate and the solubility.

After the mixture is injected into the cell, the cell is selectively irradiated with UV rays using a photomask. An ordinary photomask of metal or the like may be placed on the substrate 1b of the cell. Alternatively, in order to facilitate the fabrication process, the display electrodes 2a and 2b may be used for creating the intensity distribution of the UV rays. According to the intensity distribution of the UV rays, the polymerizable precursor is polymerized only in regions receiving intense UV rays, thereby taking a wall-like form.

Figure 56A:
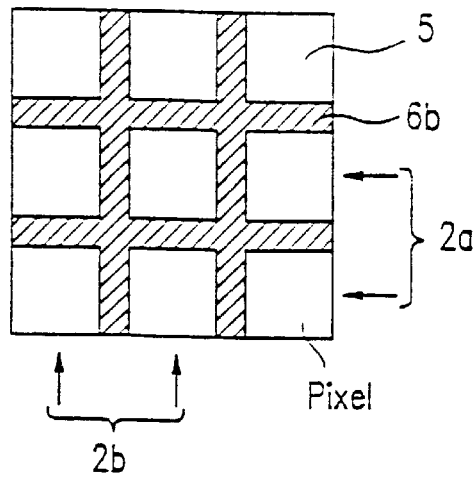
FIG. 56A is a plan view schematically showing a reflector and display electrodes of the liquid crystal display device shown in FIG. 55A.
Figure 56B:
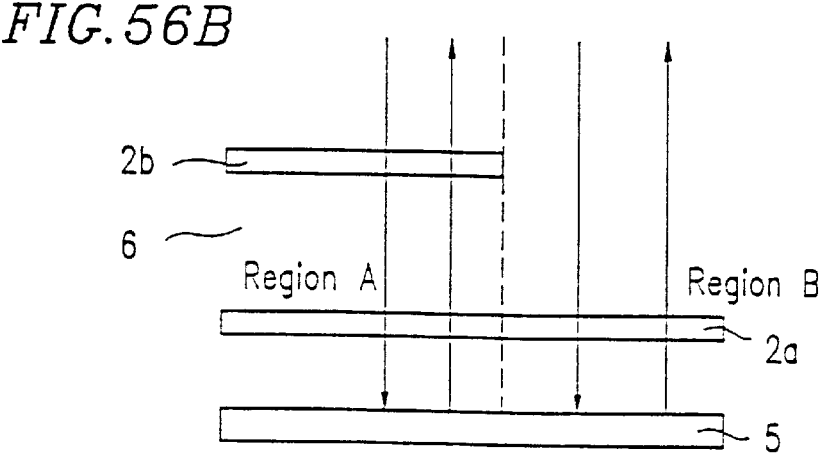
FIGS. 56B and 56C are schematic diagrams for illustrating light incident upon the liquid crystal display device shown in FIG. 55A.
Figure 56C:
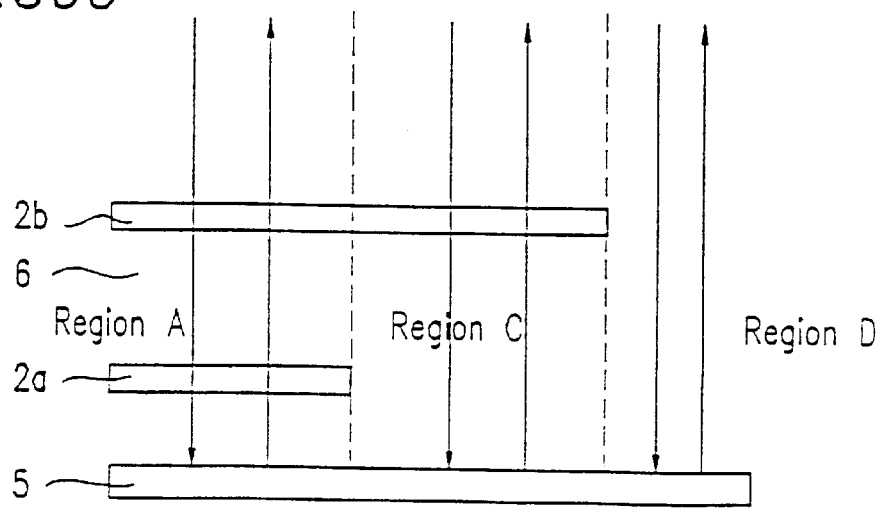

In the present example, the UV irradiation is performed by using the display electrodes 2a and 2b as a mask. Referring to FIGS. 56A to 56C, the UV irradiation of the present example will be described.

FIG. 56A is a plan view schematically showing the cell in which the substrates 1a and 1b are attached to each other; and FIGS. 56B and 56C are schematic diagrams for illustrating the UV rays incident upon the cell from the upper substrate 1b side.

As shown in FIG. 56B, in the pixel region A, the display electrode 2b overlaps the display electrode 2a. Therefore, the UV light, which enters the cell from the upper substrate 1b, reaches the mixture 6 of the liquid crystal material and a photo-polymerizable precursor after passing through the transparent film serving as the display electrode three times, i.e., once through the display electrode 2b and twice through the display electrode 2a. On the other hand, in the region B, only the display electrode 2a is disposed. Therefore, the UV light reaches the mixture of the liquid crystal material and the photo-polymerizable precursor after passing through the transparent film only once. Similarly, as shown in FIG. 56C, only the display electrode 2b formed on the upper substrate 1b exists in the region C while no display electrode exists in the region D. Therefore, the number of times that the UV light entering the cell from the upper substrate 1b passes through the transparent film is one and zero in the regions C and D, respectively. In this way, the UV light, which reaches the mixture of the liquid crystal material and the photo-polymerizable precursor, is provided with the intensity distribution in accordance with the number of times that the UV light passes through the transparent film. Accordingly, the smallest intensity of the UV light is obtained in the region A, whereas the largest intensity of the UV light is obtained in the region D. Owing to such a difference in the irradiation intensity, it is possible to form the polymer walls 6b which form the polymer matrix. The liquid crystal display panel may be heated or gradually cooled so as to facilitate the phase separation of the composition.

Owing to the reflector including the thin metal film 5, the reflective liquid crystal display device of Example 19 efficiently reflects light incident thereupon. Moreover, owing to the polymer walls 6b, the reflective liquid crystal display device is also well-fortified against pressure. Therefore, the reflective liquid crystal display device is highly suitable for use as a portable communication apparatus or the like.

An applicable modification of Example 19 will now be described.

Figure 57A:
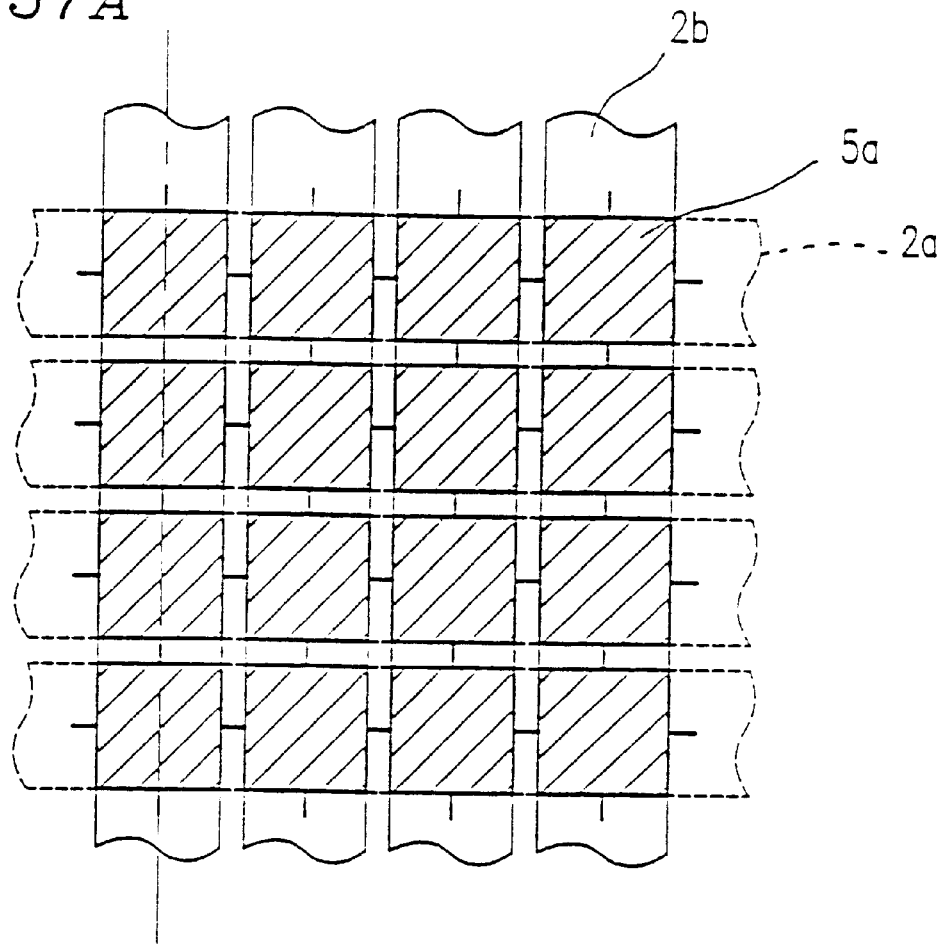
FIG. 57A is a plan view schematically showing a pattern in which a metal film is formed.

In Example 19, the thin metal film 5 serving as a part of the reflector is formed to cover the entire surface of the resist layer (not shown) on the lower substrate 1a. However, the thin metal film 5 may be patterned so as to correspond to the pixel portions, as shown in FIG. 57A. In such a case, the patterned metal film 5 can be used as a mask when the display medium is irradiated with light for the phase separation. This makes possible an easy and accurate formation of the polymer walls 6b.

Figure 57B:
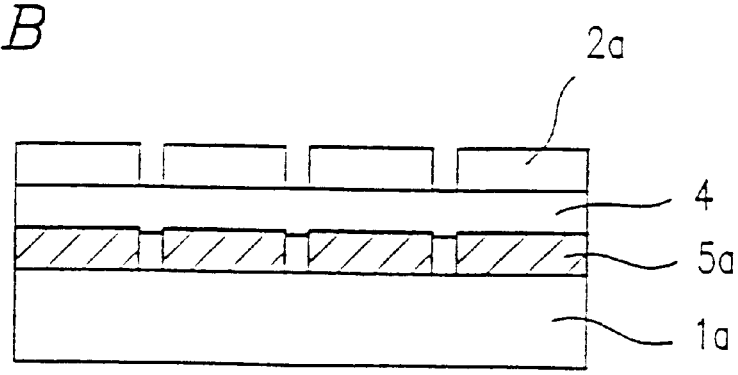
FIG. 57B is a cross-sectional view illustrating the connection between the patterned metal film.

In addition, preferably, portions 5a of the patterned metal film 5 each corresponding to one pixel portion are electrically connected to one another, as shown in FIG. 57A and 57B. In general, in the case where the metal film is located under the display electrodes, capacitances are generated betwEen the metal film and the display electrode so as to vary the dielectric constant among pixels, thereby causing non-uniformity in display. However, by electrically connecting the portions 5a of the patterned metal film 5 to one another, as shown in FIGS. 57A and 57B, electric potentials become uniform, thereby making the display quality uniform over the entire display panel.

Figure 57C:
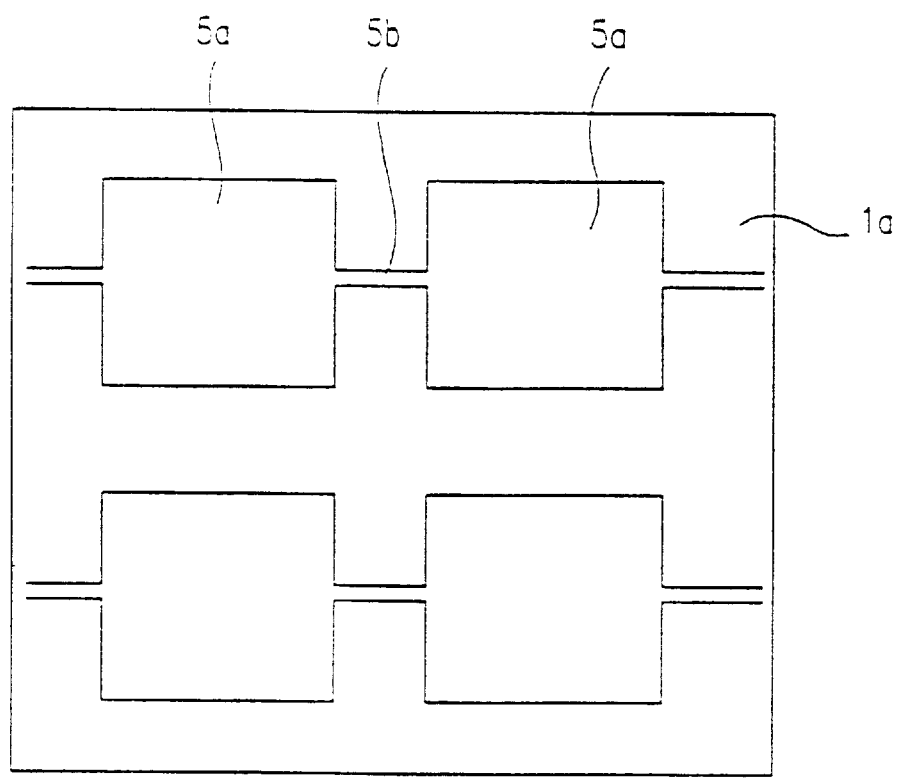
FIG. 57C is an enlarged plan view of the substrate on which the metal film is formed.

Alternatively, the portions 5a of the patterned metal film, which are included in the same row or the same column, may be electrically connected to one another, as shown in FIG. 57C, so as to serve as a display electrode extending the row or the column as a whole. In this case, the display electrodes 2a formed of a transparent material and an insulating film which insulates the display electrodes 2a and the metal film 5 in Example 19 can be omitted and the rows or the columns of the portions 5a of the metal film are used for applying a voltage to the display medium 6 together with the display electrodes 2b. In this modification, the regions where the display electrodes 2b overlap the portions 5a of the patterned metal film 5 correspond to the pixel portions.

Figure 57D:
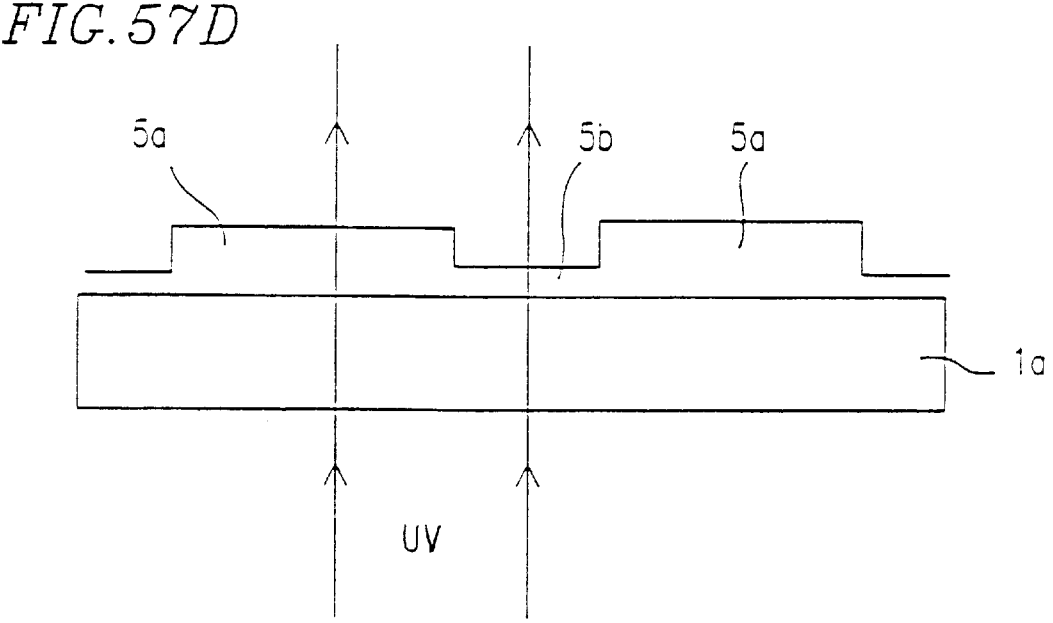
FIG. 57D is a schematic diagram for illustrating the UV irradiation.

Also, in this modification, the portions 5a of the patterned metal film 5 can be used as a mask when the UV light is incident on the lower substrate 1b, as shown in FIG. 57D. Therefore, in order to reduce the adverse effect of connecting portions 5b, each of which connects adjacent portions 5a of the patterned metal film 5, on the formation of the polymer walls 6b, it is preferable to make the widths of connecting portions 5b for connecting adjacent two portions 5a narrower in the case where the connecting portions 5b are also formed of a metal material. The connecting portions 5b may be formed of a transparent material.

In the reflective liquid crystal display device of Example 19, a plurality of strips of a transparent film as display electrodes are formed on the upper and the lower substrates so that the display electrodes on one substrate cross the display electrodes on the other substrate. Alternatively, a plurality of signal lines may be formed on each of the substrates so that the signal lines on one substrate cross the signal lines on the other substrate and a plurality of switching elements are provided for the respective overlap regions as the pixel regions. As the switching elements, MIM elements each having an metal-insulator-metal structure may be used. Alternatively, a plurality of pixel electrodes arranged in a matrix and a counter electrode may be respectively formed on the substrates. In this case, a plurality of switching elements, such as TFTS, are provided for the respective pixel electrodes.

EXAMPLE 20

Example 20 provides an input system including a reflective liquid crystal display device as a display and a pen or a pen-like member as an input device (Hereinafter, such an input system is simply referred to as a pen-based input system).

Figure 58A:
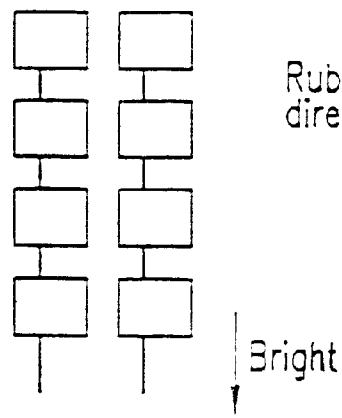
FIG. 58A is a schematic diagram showing the connection among portions of a reflector used in a liquid crystal display device according to Example 20.

First, one of a pair substrates constituting the reflective liquid crystal display device, which includes a reflector, is fabricated. Using the technique as described in any one of the previous examples, a reflector whose surface has a number of minute concave/convex portions is formed by depositing a thin metal film of, for example, Al on a transparent substrate, such as a plastic substrate. The Al film is not deposited on the entire surface of the transparent substrate, but instead is formed so that portions of the Al film are arranged in a matrix and the Al film portions included in the same column are connected to each other, as shown in FIG. 58A. Thus, each column of the Al film portions serves as a display electrode. In this example, the reflector is designed so as to provide a bright display in a direction inclined from the panel normal toward the lower side of the panel by about −10° to 30°. Herein, "the lower side" refers to the side in the 6 o'clock direction, whereas "the upper side" refers to the side in the 12 o'clock direction.

Then, a counter substrate is fabricated by forming a plurality of strips extending in parallel, which is formed of a transparent material, such as ITO or SnO on a transparent substrate. The strips also serve as display electrodes and are arranged so as to cross the display electrodes of the Al metal film when the counter substrate is attached to the above-mentioned substrate. The counter substrate may be fabricated prior to the fabrication of the above-mentioned substrate including the reflector.

Figure 58B:
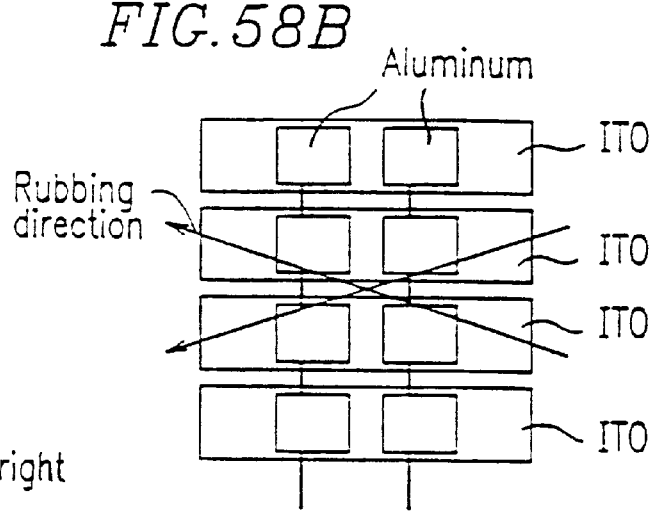
FIG. 58B is a schematic diagram showing rubbing directions of alignment films of the liquid crystal display device according to Example 20.

An alignment film of, for example, polyimide, is formed on each substrate and rubbed with a cloth of rayon or the like in such directions that the resultant alignment films provide a 240° twist angle as shown in FIG. 58B. The substrates are then attached together so that the display electrodes on the pair of substrates cross each other, thereby obtaining a liquid crystal cell.

Then, a mixture as shown in Table 1 containing a liquid crystal material and a polymerizatle precursor is injected (e.g., by vacuum injection) into the liquid crystal cell, thereby obtaining a liquid crystal display panel. In Table 1, Irg651 is Irgacure 651 manufactured by Chibagaigy Co., Ltd, R684 is a bifunctional acrylate manufactured by Nippon Kayaku K.K., Compound 2 is an LC monofunctional acrylate, and LC is SP4862 manufactured by Chisso Corp.

TABLE 1

| | Irg 651<br>0.5% | R 684<br>4% | Compound 1<br>3% |
|---|---|---|---|
| Structure | (benzophenone with O—CH$_3$, C(=O)—C, O—CH$_3$ groups) | A CH$_2$(C$_{10}$H$_{14}$)CH$_2$A | A—(biphenyl)—CN |
| | | Compound 2<br>3% | LC<br>89.5% |
| Structure | | A—(phenyl)—C≡C—(phenyl)—C$_5$H$_{11}$ | SP4862 (Chisso Corp) |

$$\begin{pmatrix} \text{A-acrylate group} \\ \text{CH}_2\!=\!\text{CHCOO}\!- \end{pmatrix}$$

The entire liquid crystal display panel is then heated to about 100° C. and irradiated with UV rays (light intensity: about 8 mW, Wavelength: about 365 nm) from the side of the substrate including the reflector for about 200 seconds. Since the Al thin film is formed in a matrix so that each portion corresponds to one pixel portion, as described above, polymerization starts in regions surrounding the pixel portions so as to form polymer walls. It is noted that connecting portions of the Al portions are formed to have as narrow width as possible. Therefore, the connecting portions have substantially no effect on the polymerization.

Figure 58C:
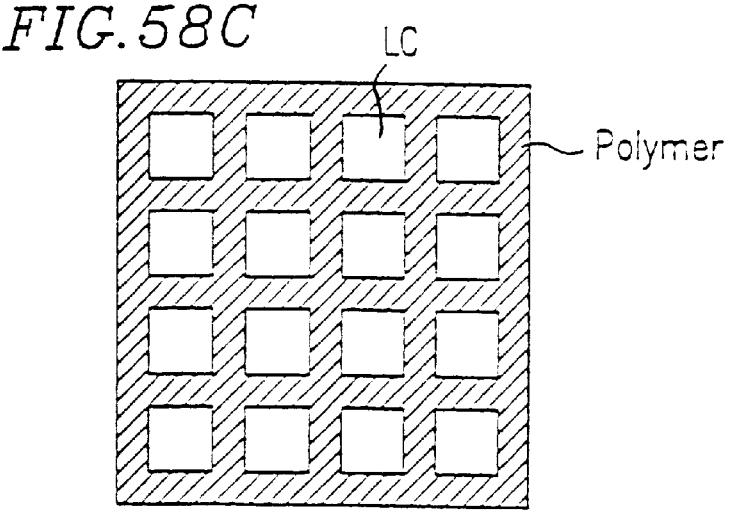
FIG. 58C is a schematic diagram showing a liquid crystal display panel of Example 20.

Then, the liquid crystal display panel is gradually cooled (about −6° C./hour) in an oven. When the panel temperature reaches about 20° C., the display panel is taken out of the oven. Then, the liquid crystal display panel is irradiated with light from the side of the counter substrate (light intensity: about 8 mW, wavelength: about 365 nm) for about 600 seconds, thereby terminating the polymerization. Thus, the liquid crystal display panel in which the polymer walls are formed to surround liquid crystal portions LC as shown in FIG. 58C, is obtained. The liquid crystal portions LC correspond to the pixel portions, and the orientation of the liquid crystal molecules in the liquid crystal portions LC undergoes a 240°-twist between the substrates.

The orientation of the liquid crystal molecules may be partially disturbed. In such a case, the liquid crystal display panel is again heated and. then gradually cooled, whereby a desirable orientation is obtained.

A touch panel film is directly attached to the liquid crystal display panel, thereby obtaining the pen-based input system.

Figure 59:
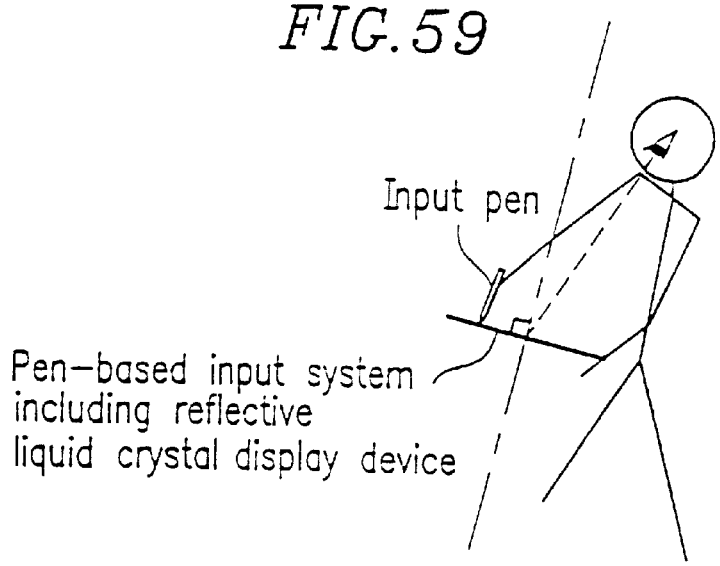
FIG. 59 is a schematic diagram showing a user using a pen-based input system including a reflective liquid crystal display device of Example 20.

A writing test on the pen-based input system as shown in FIG. 59 confirmed that a sufficiently bright display with high contrast can be viewed from a direction slightly inclined from a direction normal to the panel toward the lower side of the display panel. Moreover, only a dark display can be viewed from a direction other than the viewing angle of the user, which conveniently obviates an undesirable exposure of information.

Furthermore, since the polymer waLls (FIG. 58C) existing between the substrates are satisfactorily rigid, the display on the display panel is not disturbed until the pressure applied via the input pen exceeds 1 kg/mmΦ even in the case where the touch panel is closely attached to the display panel. It is thus confirmed that the liquid crystal display panel of Example 20 can display images which are comfortably viewed.

EXAMPLE 21

Example 21 provides a liquid (crystal display device with a reflector having ridged portions surrounding pixel portions so as to separate pixel portions from one another. Except for the design of the reflector and the formation of the polymer matrix between the substrates, the reflective liquid crystal display device is fabricated in a similar manner to that described in Example 20. Therefore, the detailed description of the reflective liquid crystal display device is omitted.

Figure 60:
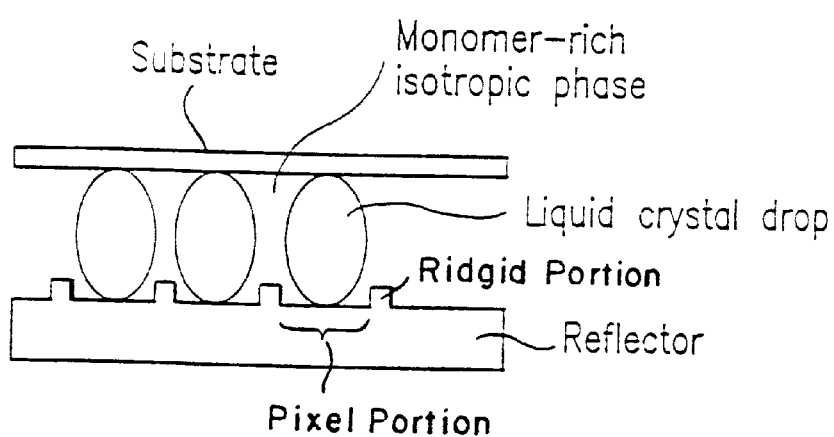
FIG. 60 is a cross-sectional view showing a configuration of a reflective liquid crystal display device according to Example 21.

FIG. 60 is a cross-sectional view showing the reflective liquid crystal display device according to Example 21. The reflector of Example 21 is designed to have ridged portions of a matrix-like pattern and low flat portions being surrounded by the ridged portions, as shown in FIG. 60. The low flat portions of the reflector each correspond to one pixel portion, with the ridged portions surrounding the pixel portions.

Figure 61A:
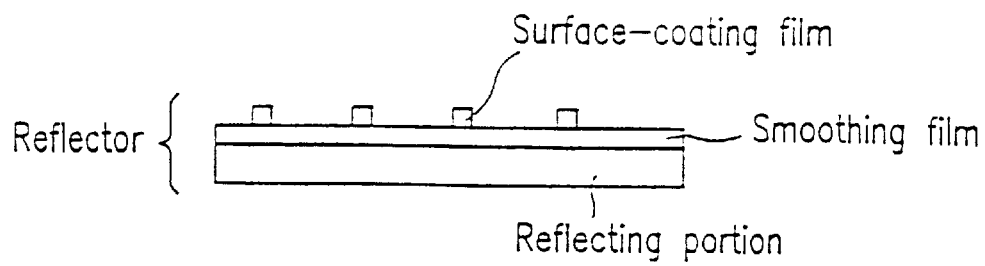
FIGS. 61A to 61D are cross-sectional view of a reflector included in the reflective liquid crystal display device according to Example 21.

As shown in FIG. 61A, the reflector includes a reflecting portion, a smoothing film and a surface-coating film. The reflecting portion is fabricated by the technique as described in any one of the previous examples so that the surface thereof has a number of minute concave/convex portions to provide a bright display in particular directions. As a reflective film of the reflecting portion, a thin metal film of, for example, Al may be used.

The smoothing film is formed of a transparent material on the reflecting portion, in order to flatten the minute concave/convex portions of the surface of the reflective film. This is because the minute concave/convex portions of the surface of the reflective film may adversely affect the optical properties of the liquid crystal display device. Then, the surface-coating film is formed on the smoothing film except for the portions corresponding to the pixel portions. Thus, the surface-coating film corresponds to the ridged portions in this example. Moreover, display electrodes may be formed on the reflector.

The thus fabricated reflector including the smoothing film and the surface-coating film is attached to a counter substrate having transparent electrodes formed thereon. Then, a mixture of a liquid crystal material and a polymerizable monomer material is injected into a gap between the attached substrates. It is preferable that a photopolymerizable material is used as the polymerizable monomer material. The mixture becomes isotropic at a certain temperature (the isotropic temperature) or more and separates into two phases at a temperature lower than the isotropic temperature. One phase is a phase which includes a monomer as a main component (i.e., the monomer rich phase) and the other is a phase which includes a liquid crystal as a main component (i.e., the liquid crystal rich phase). By polymerizing the monomer, the phase separation is completed and the polymer walls are formed. In this example, the mixture having a range of temperature in which the two phases coexist of about 10° or more is used.

Then, the display panel is gradually cooled (about 0.01 to 0.3° C./min) after the isotropic temperature, thereby generating liquid crystal drops. Due to the surface tension, the liquid crystal drops aggregate and grow in the portions corresponding to low flat portions of the reflector. When the liquid crystal drops fill out the portions, the UV light irradiation is performed. Thus, the monomer rich phase located on the ridged portions of the reflector is cured to form the polymer walls. In this way, the reflective liquid crystal display device of Example 21 is completed.

Figure 61B:
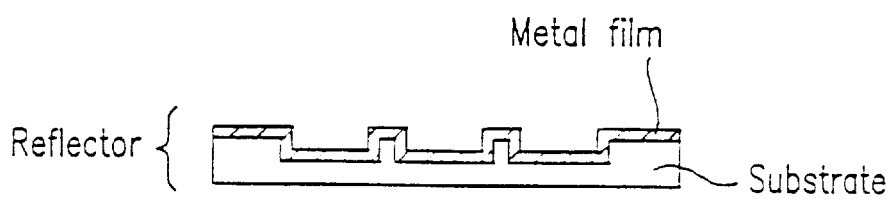
Figure 61C:
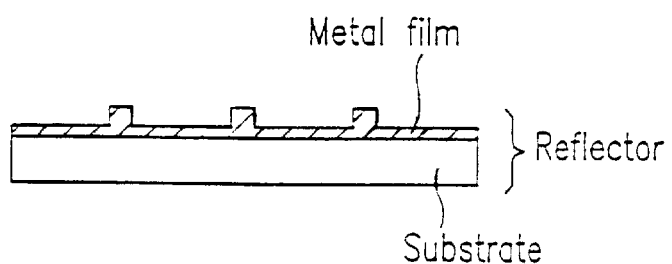
Figure 61D:
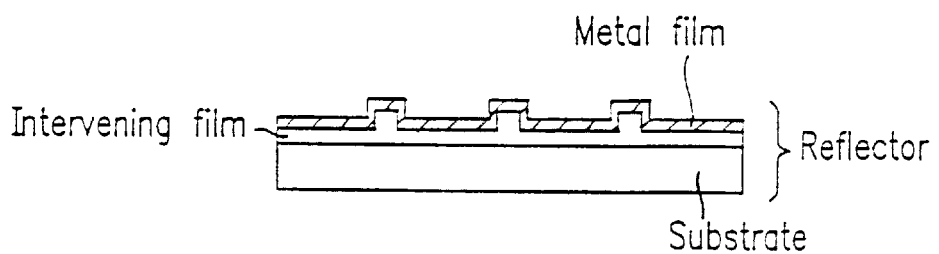

As described above, such polymer walls can easily be formed by modifying the shape of the reflector in the thickness direction thereof, as shown in FIG. 60. In this example, the shape of the reflector is modified by forming the reflecting portion on an additional film (i.e., the surface-coating film), as shown in FIG. 61A. Alternatively, the shape of the reflector can be modified by modifying the shape of the substrate in the thickness direction (FIG. 61B), by modifying the shape of the thin metal film in the thickness direction (FIG. 61C), or by selectively intervening other materials between the substrate and the thin metal film (FIG. 61D).

Moreover, a polarizing film may be provided on the counter substrate and an additional polarizing film may be formed on the side of the reflector which is close to the liquid crystal drops. Also, alignment films, each of which is rubbed in a predetermined direction, may be formed on the substrates so that the orientations of the liquid crystal molecules in the liquid crystal drops twists by a predetermined angle between the substrates.

Figure 62:
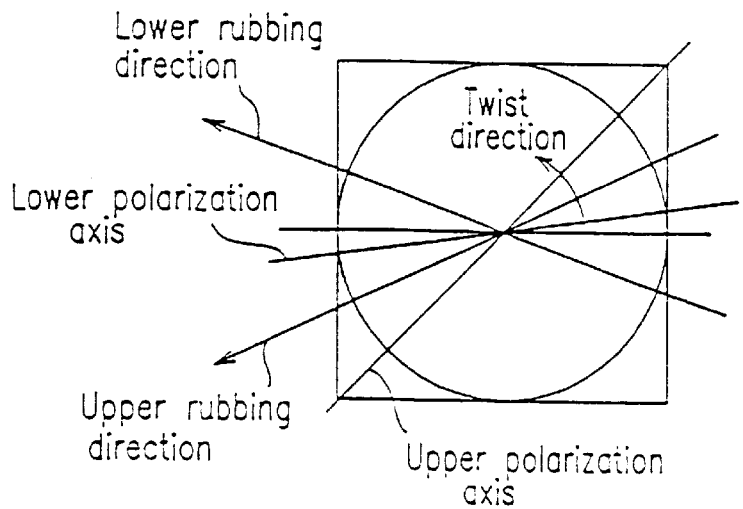
FIG. 62 shows an arrangement according to Example 21 for making the bright-reflection direction of the reflector identical to the high-contrast viewing angle of an STN liquid crystal display device.

FIG. 62 shows an arrangement for making the direction to which the reflector provides a bright display identical to the direction to which a reflective liquid crystal display device provides a high-contrast display, in the case where the polarizing films and the alignment films are provided as mentioned above. The rubbing direction of the alignment film on the counter substrate and that of the alignment film on the reflector correspond to the upper rubbing direction and the lower rubbing direction, respectively. As shown in FIG. 62, the twist angle of the orientation of the liquid crystal molecules is more than 180°, that is, the reflective liquid crystal display device conducts a display in the STN mode. In accordance with the arrangement as shown in FIG. 62, high-contrast images can be viewed in the viewing angle of a user while making the images invisibly dark in other directions. Therefore, the arrangement is suitable for private use as an electronic organizer or the like.

EXAMPLE 22

Figure 63:
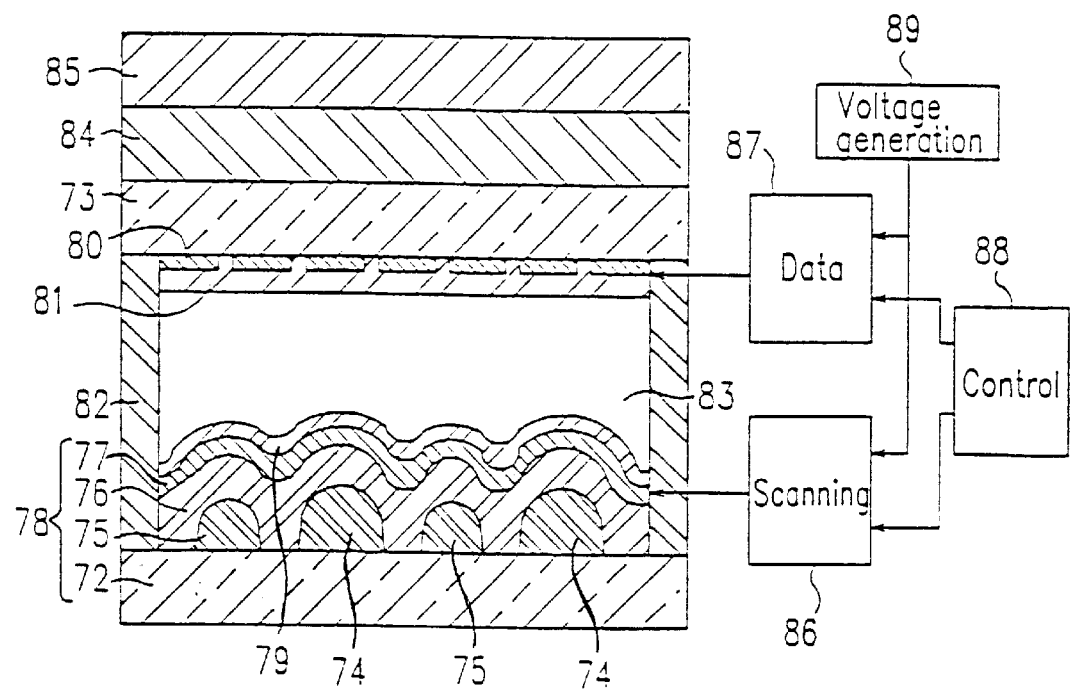
FIG. 63 is a cross-sectional view showing a configuration of an exemplary reflective liquid crystal display device according to Example 22.

FIG. 63 shows a cross section of an exemplary reflective liquid crystal display device according to Example 22.

The reflective liquid crystal display device includes a substrate 73, a reflector 78 and a liquid crystal layer 83 interposed therebetween. The reflector 78 includes a substrate 72, mounds 74 and 75 each having a different size from the other and provided on the substrate 72. A smoothing film 76, a reflector metal film 77 and an alignment film 79 are provided in this order covering the surface of the substrate 72 and the mounds 74 and 75. The reflector metal film 77 is applied with a gate signal which is output from a scanning circuit 86 based on a voltage output from a voltage generation circuit 89 and a signal output from a control circuit 88.

In the reflector 78, the mounds 74 and 75 are deformed so that there is at least one arbitrary line such that the cross section of each mound taken along the line has an asymmetric inclination distribution, as described in the previous example. Due to the shape of the mounds 74 and 75, the reflector 78 reflects light toward particular directions so as to provide a bright display in the particular directions.

Still referring to FIG. 63, a transparent electrode 80 is provided on the substrate 73. An alignment film 81 is provided covering the surface of the substrate 73 and the transparent electrode 80. The transparent electrode 80 is applied with a data signal which is output from a data circuit 87 based on a voltage output from a voltage generation circuit 89 and a signal output from a control circuit 88. A phase compensator 84 and a polarizer 85 are further provided on the upper surface of the substrate 73.

The reflector 78 and the substrate 73 are arranged so as to oppose each other and are attached together with a sealing member 82. The liquid crystal layer 83 provided between the reflector 78 and the substrate 73 has a very high viewing angle dependence of a contrast of the displayed image. That is, a high contrast image can be viewed in particular viewing directions. In Example 22, the direction in which a high contrast image is viewed is made to coincide with the direction toward which the reflector 78 reflects the light.

EXAMPLE 23

Example 23 provides a reflective liquid crystal display device with the display medium including a liquid crystal layer and a polymer matrix.

Figure 64:
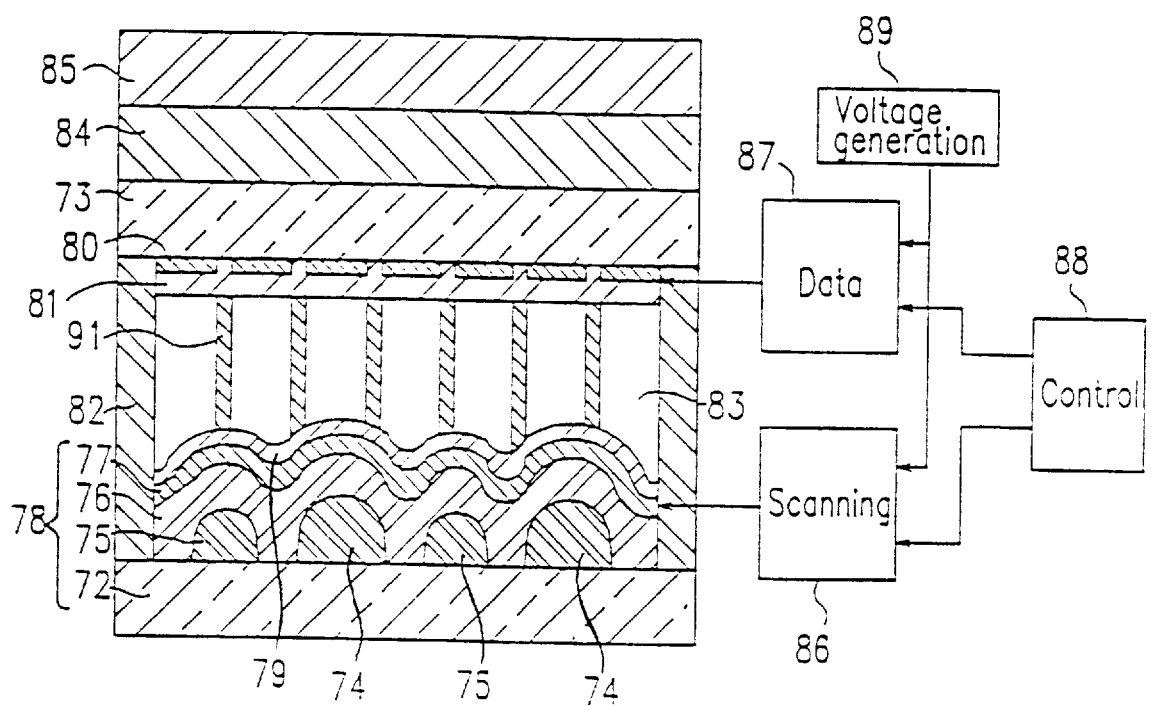
FIG. 64 is a cross-sectional view showing a configuration of a reflective liquid crystal display device according to Example 23.

FIG. 64 shows a cross section of the reflective liquid crystal display device according to Example 23; and FIG. 65 is a plan view of the liquid crystal display device. Similar members in FIGS. 63, 64 and 65 are denoted by the same reference numeral and the description thereof is omitted.

The liquid crystal display device according to Example 23 includes a display medium interposed between the reflector 78 and the substrate 73. The display medium includes a liquid crystal layer 83 and a polymer matrix 91. The polymer matrix 91 is formed by irradiating. a mixture including at least a liquid crystal material and a polymerizable precursor with patterned light having different intensities therein, while separating the phases so that the portions irradiated with higher-intensity light form the polymer matrix and the portions irradiated with lower-intensity light form the liquid crystal layer 83. The polymer matrix 91 is formed so as to correspond to the periphery of each pixel. The pixels are formed by the transparent electrode 80 and the reflector metal film 77.

As in Example 22, the direction toward which the reflector 78 reflects light is made to coincide with the direction to which a high contrast image can be obtained and which is dependent on the characteristics of the liquid crystal layer 83.

Even when data is input via an input pen onto a touch panel (not shown) provided on the polarizer 85, disturbance in the display due to the pressure applied thereto by a user via the input pen is extremely small. Therefore, the liquid crystal display device of Example 23 is most suitable for input-device integrated applications.

Various other embodiments of the present invention can be realized by optimizing the characteristics of the liquid crystal layer for each of the reflectors in Examples 22 and 23.

EXAMPLE 24

In this example, a reflective liquid crystal display device including an STN liquid crystal layer in which the orientation of liquid crystal molecules is twisted by 180° will be described.

The reflective liquid crystal display device of Example 24 includes at least a transparent substrate, a reflector and a liquid crystal layer interposed between the substrate and the reflector. The reflector is formed by using the technique described in any one of the previous examples so as to reflect light toward particular directions.

Alignment films are formed on the substrate and the reflector, respectively; and a pair of polarizing films are provided on both sides of the liquid crystal layer. Each alignment film is rubbed in a predetermined direction so that liquid crystal molecules in contact with the alignment film are aligned in the predetermined direction. FIG. 66 shows the arrangement of the rubbing directions of the alignment films and polarization axes of the polarizing films. As shown in FIG. 66, the rubbing directions of the alignment film formed on the transparent substrate (i.e., the upper alignment film) and that formed on the reflector (i.e., the lower alignment film) are set so as to rotate the orientation of the liquid crystal molecules by 180°. The polarizing films are arranged so that the polarization axes are perpendicular to each other and the polarization axis of the polarizing film on the transparent substrate is at an angle of 45° with respect to the rubbing directions of the alignment films.

Figure 67:
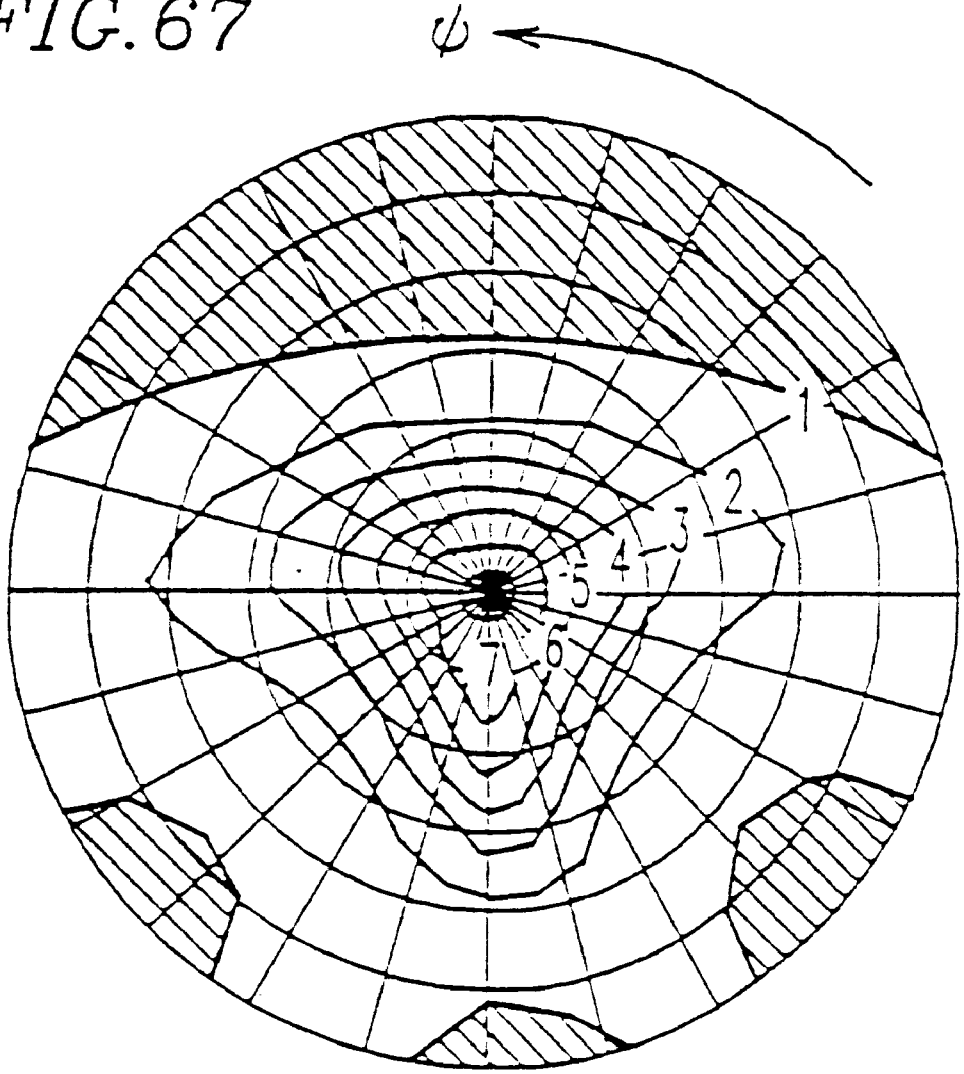
FIG. 67 is an iso-contrast diagram showing the viewing angle dependence of a reflective liquid crystal display device according to Example 24.

FIG. 67 is an iso-contrast diagram showing the viewing angle dependence of the reflective liquid crystal display device of Example 24. In this figure, regions where the contrast is considerably low and contrast inversion occurs are indicated as hatched regions. In Example 24, the reflector is optimized so that the directions, toward which the reflector reflects light and therefore a bright display can be obtained, are not included in the hatched regions. In other words, the reflector is optimized so that the amount of reflected light toward the viewing directions corresponding to the hatched regions is small. Therefore, the liquid crystal display device of Example 24 can display images which are comfortably viewed.

EXAMPLE 25

In Example 25, a 270° SBE yellow mode reflective liquid crystal display device will be described.

The reflective liquid crystal display device of Example 25 includes at least a transparent substrate, a reflector and a liquid crystal layer interposed between the substrate and the reflector. The reflector is formed by using the technique described in any one of the previous examples so as to reflect light: toward particular directions.

Figure 68:
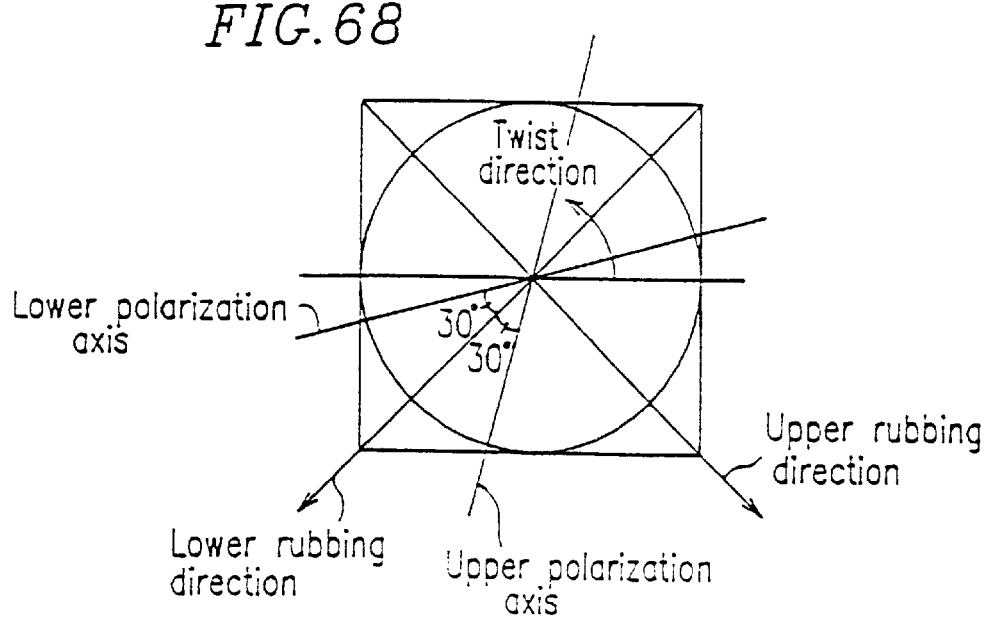
FIG. 68 shows the arrangement of rubbing directions of the alignment films and polarization axes of the polarizing films in the reflective liquid crystal display device including a 270° SBE yellow mode liquid crystal layer according to Example 25.

Alignment films are formed on the substrate and the reflector, respectively; and a pair of polarizing films are provided on both sides of the liquid crystal layer. Each alignment film is rubbed in a predetermined direction so that liquid crystal molecules contact in the alignment film are aligned in the predetermined direction. FIG. 68 shows the arrangement of the rubbing directions of the alignment films and polarization axes of the polarizing films. As shown in FIG. 68, the polarization axes of the upper polarizing film and the lower polarizing film are arranged to be at 30° in the counter clock-wise direction and at 30° in the clock-wise direction with respect to the rubbing direction of the lower alignment film.

In Example 25, the liquid crystal layer also has the viewing angle dependence of contrast of a displayed image. However, directions from which a high contract image can be viewed are made to coincide with the directions toward which the reflector reflects light.

Figure 69:
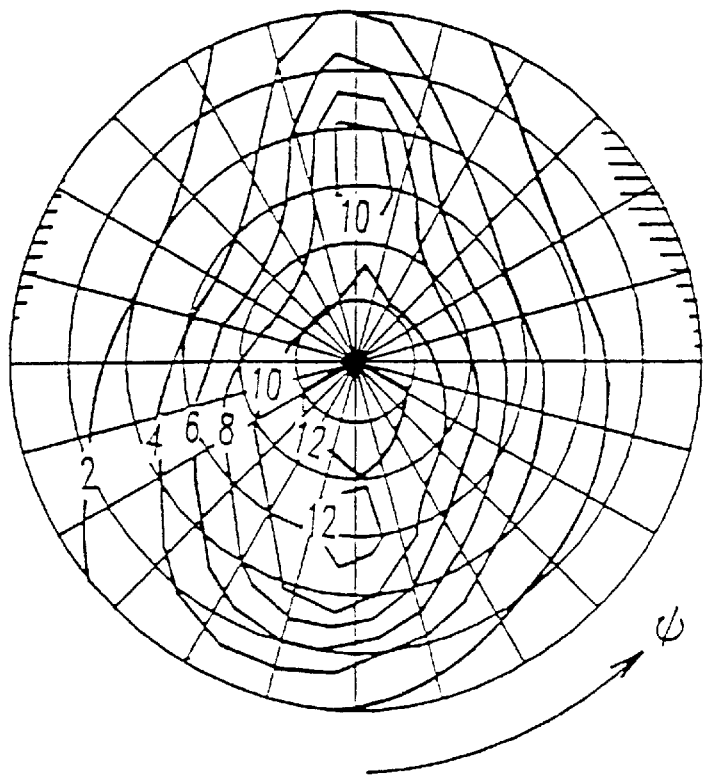
FIG. 69 an iso-contrast diagram showing the viewing angle dependence of a reflective liquid crystal display device according to Example 25.

FIG. 69 is an iso-contrast diagram showing the viewing angle dependence of the reflective liquid crystal display device according to Example 25. As shown in FIG. 69, since the directions toward which the reflector reflects light and the directions from which a high contrast image can be viewed coincide with each other, light incident on the reflective liquid crystal display device can be efficiently utilized for conducting a display.

EXAMPLE 26

In Example 26, a reflective liquid crystal display device of a single polarizer system (an ECB mode) will be described.

The reflective liquid crystal display device of Example 26 includes at least a transparent substrate, a reflector and a liquid crystal layer interposed between the substrate and the reflector. The reflector is formed by using the technique described in any one of the previous examples so as to reflect light: toward particular directions.

Figure 70:
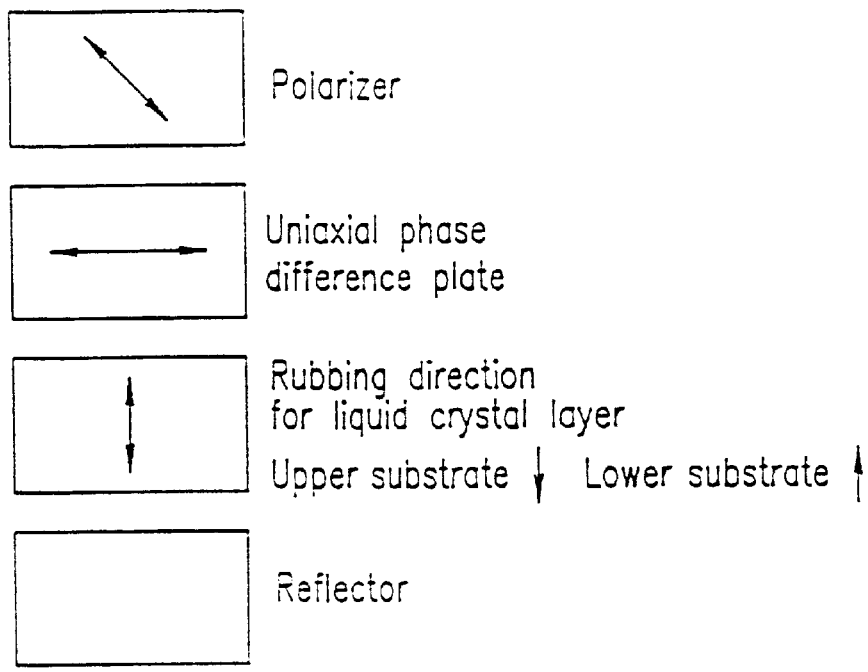
FIG. 70 is a schematic diagram showing axis directions of components included in a reflective liquid crystal display device according to Example 26.
Figure 71:
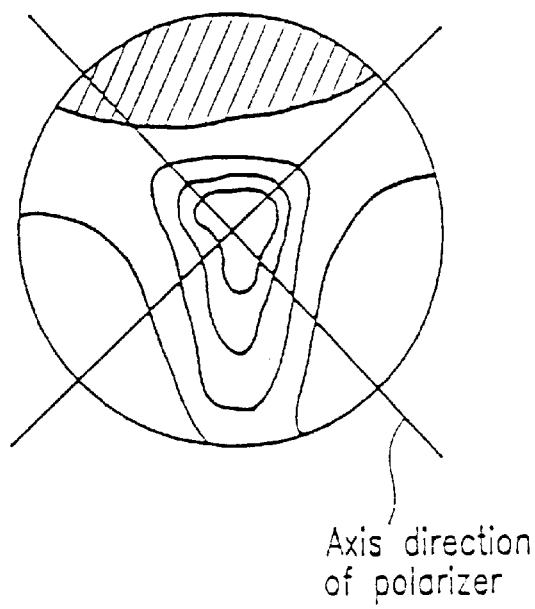
FIG. 71 is a schematic iso-contrast diagram of a reflective liquid crystal display device according to Example 26.

Alignment films are formed on the substrate and the reflector, respectively; and a single polarizing film and a phase plate are provided on the transparent substrate. Each alignment film is rubbed in a predetermined direction so that liquid crystal molecules contact in the alignment film are aligned in the predetermined direction. FIG. 70 shows the arrangement of the orientation of the liquid crystal molecules in the liquid crystal layer, polarization axis of the polarizing film and an optic axis of the phase plate. FIG. 71 is a schematic iso-contrast diagram of a reflective liquid crystal display device according to Example 26.

As shown in FIG. 70, the liquid crystal molecules in the liquid crystal layer are aligned in a direction substantially perpendicular to the optic axis of the phase plate. The polarization axis of the polarizing film may be set at any angle with respect to the director of the liquid crystal layer as long as the angle is in the range from 30° to 60°. In order to most efficiently utilize the birefringence effect of the liquid crystal layer, it is preferable to set the angle of the polarization axis of the polarizer with respect to the director of the liquid crystal layer to be about 450.

Moreover, in Example 26, the retardation represented by $\Delta n_1 d_1$ of the liquid crystal layer and the retardation $\Delta n_2 d_2$ of the phase plate are set to satisfy the Expression 1 when the display appears dark and to satisfy the Expression 2 when the display appears bright.

Expression 1

$$\frac{|\Delta n_1 d_1 - \Delta n_2 d_2|}{\lambda} = \frac{m}{2} (m = 0, 1, 2, 3, \ldots)$$

Expression 2

$$\frac{|\Delta n_1 d_1 - \Delta n_2 d_2|}{\lambda} = \frac{1}{4} (m = 0, 1, 2, \ldots)$$

where the liquid crystal layer has a refractive anisotropy of $\Delta n_1$ and the thickness of $d_1$, and the phase plate has a refractive anisotropy of $\Delta n_2$ and the thickness of $d_2$. Due to such a setting, the Reflective liquid crystal display device in Example 26 can display a high contrast image.

EXAMPLE 27

Figure 74:
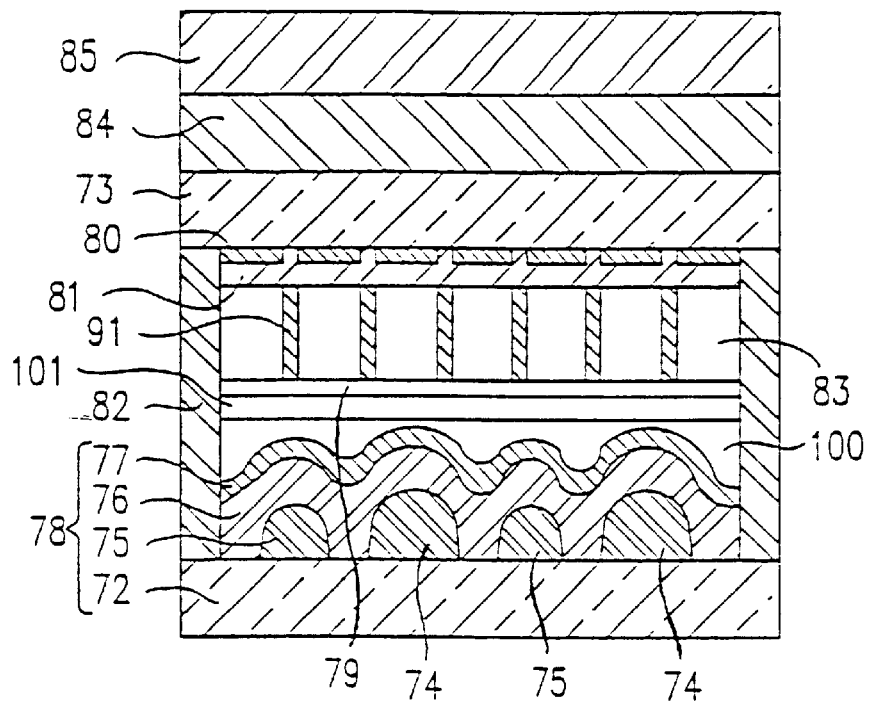
FIG. 74 is a cross-sectional view showing a configuration of a reflective liquid crystal display device according to Example 27.

Referring to FIG. 74, a reflective liquid crystal display device according to Example 27 will be described. The reflective liquid crystal display device is a modification of that described in Example 23. In FIG. 74, the same components of the reflective liquid crystal display device are designated by the same reference numerals and the description thereof is omitted.

The reflective liquid crystal display device of this example further includes a smoothing film 100 and a plurality of strips 101 of a transparent material, such as ITO formed on the reflective metal film 77 which are formed on the entire surface of the substrate 72. The strips 101 serve as display electrodes and are arranged to cross counter electrodes 80, which are also formed of a transparent material, such as ITO, on the counter substrate 73 at a right angle when the reflector 78 is attached to the counter substrate 73. The portions where the display electrodes 101 and the counter electrodes 80 overlap each other are used as pixel portions.

According to Example 27, the polymer walls 91 can be formed without using a photomask because the counter electrodes 80 and the display electrodes 101 also serve as a mask for the UV light irradiation. Thus, the reflective liquid crystal display device can be simplified compared to the case where the photomask needs to be used.

Figure 75:
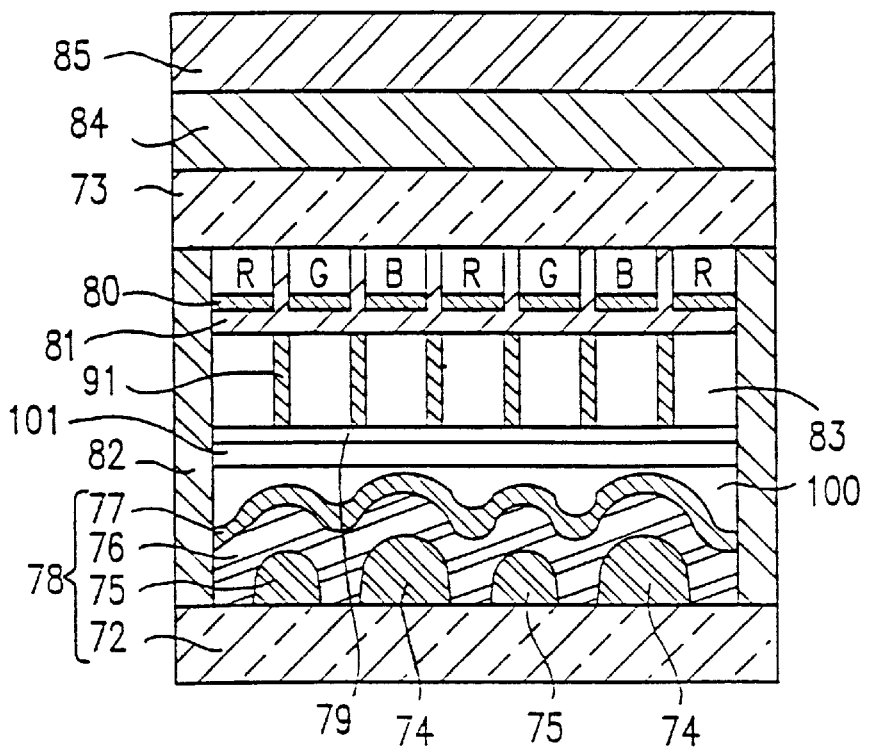
FIG. 75 is a cross-sectional view showing a configuration of a reflective liquid crystal display device according to a modification of Example 27.

In order to perform a multi-color display, color filters including a plurality of colored portions may further provided on the counter substrate 73. In FIG. 75, an example where the color filters consists of red portions R, green portions G and blue portions B is illustrated. The colored portions of the color filters are formed to have strip-like shapes and are arranged so as to correspond to the counter electrodes 80. Thus, each strips of the color filters crosses to the display electrodes 101 on the reflector 78.

It is a known technique to employ color filters to obtain a multi-color display device. However, a display inevitably becomes dark due to the existence of the color filters. Therefore, improving the brightness of a display is a vital requirement for a color display device. In view of this, employing the reflector of the present invention is highly beneficial. In other words, it is much more beneficial to improve the brightness of a color liquid crystal panel than to improve that of other types of liquid crystal panels.

In the case where the color filters are provided, as shown in FIG. 75, the polymer walls 91 are formed by irradiating the mixture of the liquid crystal material 83 and the polymerizable precursor with the UV light incident from the counter substrate 73, using the counter electrodes 80 and the display electrodes 101 as the mask. Therefore, the color filters are required to transmit at least a part of the UV light. In order to form the polymer walls 91, at least 30% of the UV light needs to be transmitted through the color filters. Otherwise, the intensity of the UV light is insufficient for completely polymerizing the polymerizable precursor. Therefore, in the case where the color filters are provided in the reflective liquid crystal display device of Example 27, the color filters having the UV light transmittance of 30% or more.

A plurality of switching elements may be provided so as to drive each pixel independently. In this case, the display electrodes, which are connected to the respective switching elements, are formed in a matrix using a metal film, for example, so that portions surrounding the display electrodes are light-transmissive. Also, the display electrodes are located on the switching elements and the associated wirings with an insulating layer interposed therebetween.

In any examples, the smoothing film may be additionally formed on the reflector. In the case where the smoothing film is formed on the reflector, it is possible to reduce the adverse effect of the minor concave/convex portions formed on the surface of the reflector on the characteristics of the reflective liquid crystal display device. As described above, when the surface which is in contact with the liquid crystal material has the concave/convex portions, there may arise some problems, for example, disorder of the orientations of the liquid crystal molecules. In order to avoid such problems, the smoothing film is provided, if necessary.

Figure 72A:
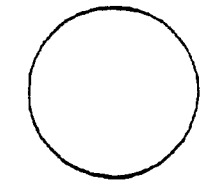
FIGS. 72A to 72C each show a shape of a concave/convex portion which is not suitable for the present invention.
Figure 72B:
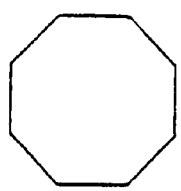
Figure 72C:
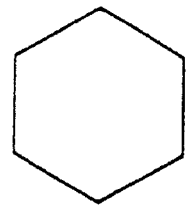

In addition, in any examples mentioned above, the surface deformity portion such as the concave/convex portion, has at least one cross section taken along a plane parallel to the substrate, whose shape is different from a circle and any one of equilateral polygons having more than four sides. In such a case, the shape of the surface deformity portion as projected onto a surface perpendicular to a direction from which the surface deformity portion is viewed varies depending on the viewing direction. Light incident upon the concave/convex portion is reflected in a particular direction depending on the shape of the concave/convex surface. Thus, the reflected light intensity varies depending on the viewing direction. As a result, the reflector provides a particularly bright display in particular directions. For the shape of such a concave/convex portion, those shown in FIGS. 72A to 72C are not suitable. FIGS. 72A to 72C show a circle, an octagon, a hexagon, respectively.

Figure 73A:
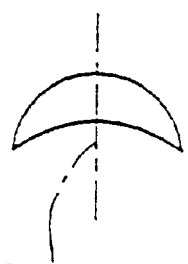
FIGS. 73A and 73B each show a shape of a concave/convex portion which has a symmetric axis and is therefore suitable for the present invention.
Figure 73B:
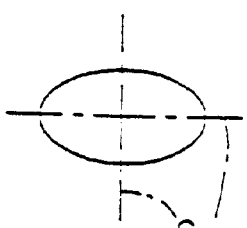
Figure 73C:
FIG. 73C shows a shape of a concave/convex portion which does not have a symmetric axis and is therefore not suitable for the present invention.

Moreover, in any examples, the surface deformity portion formed in the reflector has at least one cross section are symmetric. As such an axis of symmetry, those shown in FIGS. 73A and 73B are suitable. Such a concave/convex portion as shown in FIG. 73C does not have the axis of symmetry. Such a shape is not suitable.

As described above, according to the present invention, a reflector includes at least a substrate and a thin metal film. A plurality of surface deformity portions are formed between the substrate and the thin metal film and have asymmetric cross sections. The surface deformity portions are concave/convex portions. Due to such a structure, it is possible to reflect light from the thin metal film toward particular directions.

Each of the cross sections of the surface deformity portions has a profile inclined with respect to the substrate. An inclination distribution of the profile along an axis on the substrate is asymmetric; and an average inclination distribution of all the surface deformity portions is asymmetric as viewed from the axis on the surface of the substrate. In such a case, it is possible to provide a reflector which reflects light incident upon any position of the substrate with a high reflected light intensity toward particular directions. When the reflector is used in a display device so that the particular directions coincide with the direction in which a display is viewed by a viewer, reflected light is directed toward the viewer. Therefore, a bright and comfortably-viewed display is obtained.

In addition, the cross sections of the surface deformity portions have curved portions, and the thin metal film located on the curved portions reflects the light toward the particular directions. In such a case, the reflected light intensity becomes uniform in a region where reflected light with a high reflected light intensity reach. Therefore, a substantially uniformly bright display can be viewed in the particular directions. Moreover, since the convex/concave portions which reflect light toward particular directions are not straight, it is possible to prevent interference of reflected light. Accordingly, reflected light with a more uniformed light intensity can be obtained.

Moreover, the surface deformity portions include further cross sections taken along a plane which is parallel to the substrate, and each of the further cross sections has a shape different from a circle and any one of equilateral polygons having more than four sides. In such a case, the shape of a concave/convex portion as projected onto a surface perpendicular to a direction from which the concave/convex portion is viewed varies depending on the viewing direction. Light incident upon the concave/convex portion is reflected in a particular direction depending on the shape of the concave/convex surface. Thus, the reflected light intensity varies depending on the viewing direction. As a result, the reflector provides a particularly bright display in particular directions.

The further cross sections of the surface deformity portions are symmetric, and the surface deformity portions are arranged so that an axis, with respect to which the further cross sections of the surface deformity portions are symmetric, is parallel to a vertical direction of the substrate. Herein, the vertical direction is a direction extending in the 6 o'clock and 12 o'clock directions. In such a case, the distribution of reflected light intensity becomes symmetric about the vertical axis of the substrate. Such a reflector provides an excellent visibility for a viewer.

In the reflector of the present invention, the surface deformity portions are randomly arranged on the substrate and are oriented toward the same direction. Therefore, the intensity distribution of reflected light from one concave/convex portion coincides with that of reflected light from another concave/convex potion. Therefore, the distribution of the reflected light intensity provided by the entire substrate is similar to that provided by one concave/convex portion. As a result, it is possible to reflect light toward particular directions, thereby realizing a reflector which provides a highly-bright display.

Moreover, a reflective liquid crystal display device of the present invention with such a reflector provides a deviation in the directions to which the incident light is diffused. Therefore, the reflected light is not directed to a direction irrelevant to the viewing angle of a user, but rather is primarily directed to the viewing angle of the user. Thus, the reflective liquid crystal display device with a highly-bright display is realized.

The reflective liquid crystal display device of the present invention may includes the display medium having polymer walls dividing the liquid crystal material into a plurality of portions corresponding to a plurality of pixels which perform a display. Thus, pressure tightness of the device is improved.

The reflective liquid crystal display device of the present invention may have an insulating layer and a transparent electrode layer are formed on the reflector. In such a case, with such an integrated reflector, loss of light owing to the substrate can be minimized, while facilitating the fabrication of the reflector.

In the reflective liquid crystal display device of the present invention, the reflector may have ridged portions surrounding each of the plurality of pixels. In such a case, the phase separation is easily achieved.

In the reflective liquid crystal. display device of the present invention, the reflector may have the patterned metal film to form a plurality of metal portions each corresponding to one of the plurality of pixels. In such a case, light can be efficiently utilized. In addition, when adjacent metal portions are connected to each other, non-uniformity of electric potentials on the reflector is eliminated. Accordingly, an excellent display can be viewed. Alternatively, the metal portions of the thin metal film may be arranged in rows and columns, and adjacent metal portions in each row or column may be connected to each other. In this case, the rows or the columns of the metal portions serve as display electrodes.

The reflective liquid crystal display device of the present invention may further includes an alignment film formed on the reflector including the thin metal film. The thin metal film is patterned to comprise a plurality of metal portions arranged in rows and columns, and adjacent metal portions in each row or column are connected to each other. In such a case, the configuration of the device is simplified.

In the reflective liquid crystal display device of the present invention, the display medium may include an STN liquid crystal material. In this case, a high contrast image can be displayed in predetermined viewing directions. The predetermined viewing directions coincide with the particular directions toward which the reflector reflects the light. Therefore, an STN liquid crystal material can be effectively employed in the device in terms of the viewing angle characteristic.

The reflective liquid crystal display device of the present invention may further includes a touch panel through which data is input using a pen-type input device. In such a case, with a polymer matrix being provided in the liquid crystal panel, the stability of the device can be positively enforced. That is, not only can the device be made fortified and safe, but also can offer a comfortable use for a user. In addition, the predetermined viewing directions are arranged to include an actual viewing direction from which a user views the reflective liquid crystal display device when the data is input using the pen-type input device. Therefore, there is offered a more comfortable and personal use.

According to the present invention, in order to fabricate a reflective liquid crystal display device having a liquid crystal material and polymer walls interposed between a substrate and a reflector mentioned above, transparent electrodes formed on the substrate and the reflector are used as a mask for causing the phase separation to form the polymer walls by a UV irradiation. The transparent electrodes on the substrate are arranged to cross those on the reflector so as to define pixels arranged in a matrix. Thus, it is unnecessary to use an additional mask dedicated to this UV irradiation, thereby simplifying the fabrication of the reflective liquid crystal display device. Alternatively, in the case where the thin metal film of the reflector is patterned to correspond to the pixels, the patterned metal film can be used as the mask, instead of the transparent electrodes. In this case, the pixels to be surrounded by the polymer walls are more clearly defined, so that providing a more fortified and desirable wall for the phase separation.

Alternatively, according to the present invention, the polymer walls may be formed by gradually cooling a mixture containing the liquid crystal material and a polymerizable precursor to separate phases of the mixture, prior to a light-irradiation process. In such a case, the fabrication process is simplified.

The reflective liquid crystal display device of the present invention may further includes a phase plate and a polarizer. The liquid crystal material includes uniaxially aligned liquid crystal molecules and has such characteristics that a high contrast image is displayed in predetermined viewing directions. The predetermined viewing directions are made to coincide with the particular directions toward which the reflector reflects the light. In such a case, owing to the single polarizer system, the brightness of a display can be improved. Moreover, in the reflective liquid crystal display device, a display of images is not viewed in regions where a display would otherwise be viewed with the least quality. Therefore, it is possible to obviate a contrast inversion which is likely to occur in such a single polarizer system due to the excessive viewing angle dependence. As a result, a comfortable use can be offered.

Furthermore, the retardation of the liquid crystal layer and the retardation of the phase plate are set to satisfy the predetermined conditions when the display appears bright and dark. Thus, the reflective liquid crystal display device of the present invention can display a high contrast image.

The reflective liquid crystal display device of the present invention may include the STN liquid crystal material having a twist angle in a range of about 180° to 270° as the display medium. In such a case, it is possible to compensate a contrast inversion which is likely to occur in an STN mode. Moreover, the brightness of a display can be improved with a low cost.

The reflective liquid crystal display device of the present invention may further includEs color filters having a UV transmittance of 30% or more. Therefore, the brightness of the display can be improved. In addition, due to such a UV transmittance of the color filters, the mixture of the liquid crystal material and the polymerizable precursor can receive the sufficient intensity of the UV light for polymerizing the polymerizable precursor in the case where the polymer walls surrounding the pixels are formed by the UV light irradiation.

As described above, according to the present invention, the angle to which light is diffused by the reflector can be limited; the amount of light diffused in undesirable directions can be reduced; and brightness in the viewing angle can be considerably improved, thereby obtaining the desirable reflection characteristic. Thus, it is possible to fabricate with high repeatability a reflector for a reflective liquid crystal display device which can provide a highly-bright display.

Moreover, with such a desirable reflector of the present invention, it is possible to realize a pen-based input system including a reflective liquid crystal display device which displays images with high contrast particularly in the viewing angle. Furthermore, with the fabrication technique of a polymer matrix, it is possible to provide a reflective liquid crystal display device whose display is not disturbed even when an input pen is pressed onto the display panel.

Various other modifications will be apparent to and can be readily made by those skilled in the art without departing from the scope and spirit of this invention. Accordingly, it is not intended that the scope of the claims appended hereto be Limited to the description as set forth herein, but rather that the claims be broadly construed.

What is claimed is:

1. A reflector comprising at least a substrate and a thin reflective metal film, wherein:
   a plurality of surface deformity portions, each defining a curved portion, are located between the substrate and the thin reflective metal film, each of said curved portions having an asymmetric cross section; and,
   the surface deformity portions are randomly arranged on the substrate, such that incident light from one direction is reflected by said thin reflective metal film over a wide range, with the greatest intensity thereof being directed toward particular directions.

2. A reflector according to claim 1, wherein the surface deformity portions include at least one of convex portions and concave portions.

3. A reflector according to claim 1, wherein the surface deformity portions are oriented toward the same direction.

4. A reflective liquid crystal display device, comprising: a substrate; the reflector according to claim 1; and a display medium including a liquid crystal material, the display medium being interposed between the substrate and the reflector.

5. A reflective liquid crystal display device according to claim 4, wherein the display medium includes polymer walls dividing the liquid crystal material into a plurality of portions corresponding to a plurality of pixels which perform a display.

6. A reflective liquid crystal display device according to claim 5, wherein the reflector has ridged portions surrounding each of the plurality of pixels.

7. A reflective liquid crystal display device according to claim 5, wherein the thin metal film of the reflector is patterned to comprise a plurality of metal portions each corresponding to one of the plurality of pixels.

8. A reflective liquid crystal display device according to claim 7, wherein adjacent metal portions are connected to each other, and connecting portions between the adjacent metal portions are formed of a transparent conductive material.

9. A reflective liquid crystal display device according to claim 7, wherein adjacent metal portions are connected to each other, and connecting portions between the adjacent metal portions are formed of the thin metal film.

10. A reflective liquid crystal display device according to claim 7, wherein the metal portions of the thin metal film are arranged in rows and columns, and adjacent metal portions in each row or column are connected to each other, such that the rows or the columns of the metal portions serve as display electrodes.

11. A reflective liquid crystal display device according to claim 5, further comprising an alignment film formed on the reflector including the thin metal film, wherein the thin metal film is patterned to comprise a plurality of metal portions arranged in rows and columns, and adjacent metal portions in each row or column are connected to each other.

12. A reflective liquid crystal display device according to claim 4, wherein an insulating layer and a transparent electrode layer are formed on the reflector.

13. A reflective liquid crystal display device according to claim 4, wherein the display medium includes an STN liquid crystal material, thereby displaying a high contrast image in predetermined viewing directions, and wherein the predetermined viewing directions coincide with the particular directions toward which the reflector reflects the light.

14. A reflective liquid crystal display device according to claim 13, further comprising a touch panel through which data is input using a pen-type input device.

15. A reflective liquid crystal display device according to claim 14, wherein the predetermined viewing directions are arranged to include an actual viewing direction from which a user views the reflective liquid crystal display device when the data is input using the pen-type input device.

16. A reflective liquid crystal display device according to claim 13, wherein a twist angle of the STN liquid crystal material is in a range of about 180° to 270°.

17. A reflective liquid crystal display device according to claim 4, further comprising a phase plate and a polarizer,
   wherein the liquid crystal material includes uniaxially aligned liquid crystal molecules and has such characteristics that a high contrast image is displayed in predetermined viewing directions, and
   wherein the predetermined viewing directions are made to coincide with the particular directions toward which the reflector reflects the light.

18. A reflective liquid crystal display device according to claim 17, wherein a retardation $\Delta n_1 d_1$ of the liquid crystal layer and a retardation $\Delta n_2 d_2$ of the phase plate are set to satisfy the following relationship when the display appears dark:

$$\frac{|\Delta n_1 d_1 - \Delta n_2 d_2|}{\lambda} = \frac{m}{2} + \frac{1}{4} (m = 0, 1, 2, \ldots)$$

where the liquid crystal layer has a refractive anisotropy of $\Delta n_1$ and the thickness of $d_1$, and the phase plate has a refractive anisotropy of $\Delta n_2$ and the thickness of $d_2$.

19. A reflective liquid crystal display device according to claim 18, wherein the retardation $\Delta n_1 d_1$ of the liquid crystal layer and the retardation $\Delta n_2 d_2$ of the phase plate are set to satisfy the following relationship when the display appears bright:

$$\frac{|\Delta n_1 d_1 - \Delta n_2 d_2|}{\lambda} = \frac{m}{2} (m = 0, 1, 2, 3, \ldots)$$

20. A reflective liquid crystal display device according to claim 4, further comprising color filters.

21. A reflective liquid crystal display device according to claim 20, wherein the color filters have a UV transmittance of 30% or more.

22. A method of fabricating a reflector comprising the steps of:
   forming a plurality of surface deformity portions on a substrate so as to define a plurality of curved portions randomly arranged on the substrate, each of the surface deformity portions having an asymmetric cross section; and forming a thin reflective metal film on the substrate covering the surface deformity portions, whereby the thin reflective metal film will reflect incident light from one direction over a wide range, with the greatest intensity of the reflected light being directed toward particular directions.

23. A method of fabricating a reflector according to claim 22, wherein the step of forming the surface deformity portions includes the steps of:

coating a surface of said substrate with a resist film;

patterning the resist film into a plurality of tiny portions; and deforming each of the tiny portions to have an asymmetric cross section.

24. A method of fabricating a reflective liquid crystal display device including a reflector, a substrate opposed to the reflector and a display medium interposed between the reflector and the substrate, wherein the reflector is fabricated by the method according to claim 22.

25. A method of fabricating a reflective liquid crystal display device according to claim 24, wherein the display medium includes a liquid crystal material and polymer walls dividing the liquid crystal material into a plurality of portions corresponding to a plurality of pixels.

26. A method of fabricating a reflective liquid crystal display device according to claim 25, further comprising the step of forming a first transparent electrode layer on the reflector and forming a second transparent electrode layer on the opposing substrate, wherein the polymer walls are formed by light irradiation using the transparent electrode layers as a mask.

27. A method of fabricating a reflective liquid crystal display device according to claim 25, further comprising the step of patterning the thin metal film to be divided into a plurality of metal portions corresponding to the pixels, wherein the polymer walls of the display medium are formed by light irradiation using the metal portions as a mask.

28. A method of fabricating a reflective liquid crystal display device according to claim 25, further comprising the step of gradually cooling a mixture containing the liquid crystal material and a polymerizable precursor to separate phases of the mixture, prior to a light-irradiation process, thereby forming the polymer walls.

29. A method of fabricating a reflective liquid crystal display device according to claim 28, further comprising the steps of:

forming a transparent electrode layer on the substrate; and patterning the thin reflective metal film such that the film is divided into a plurality of thin metal portions corresponding to pixels of the display device.

30. A reflector comprising at least a substrate and a thin reflective metal film, wherein a plurality of surface deformity portions define a plurality of curved portions located between the substrate and the thin reflective metal film, said curved portions having asymmetric cross sections such that incident light from one direction is reflected by said thin reflective metal film over a wide range with the greatest intensity thereof being directed in particular directions, each of the cross sections of the surface deformity portions has a profile inclined with respect to the substrate, wherein an inclination distribution of the profile along an axis on the substrate is asymmetric, and an average inclination distribution of all the surface deformity portion cross sections is asymmetric as viewed from the axis on the surface of the substrate.

31. A reflector comprising at least a substrate and a thin reflective metal film, wherein:

a plurality of surface deformity portions define a plurality of curved portions located between the substrate and the thin reflective metal film, said curved portions having asymmetric cross sections such that incident light from one direction is reflected by said thin reflective metal film over a wide range with the greatest intensity thereof being directed in particular directions, the surface deformity portions include further cross sections taken along a plane which is parallel to the substrate, and each of the further cross sections has a shape different from a circle and any one of equilateral polygons having more than four sides.

32. A reflector according to claim 31, wherein the further cross sections of the surface deformity portions are symmetric.

33. A reflector according to claim 32, wherein the surface deformity portions are arranged so that an axis, with respect to which the further cross sections of the surface deformity portions are symmetric, is parallel to a vertical direction of the substrate.

* * * * *